US011443646B2

(12) United States Patent
German

(10) Patent No.: US 11,443,646 B2
(45) Date of Patent: Sep. 13, 2022

(54) E-READER INTERFACE SYSTEM WITH AUDIO AND HIGHLIGHTING SYNCHRONIZATION FOR DIGITAL BOOKS

(71) Applicant: Fathom Technologies, LLC, Mt. Pleasant, SC (US)

(72) Inventor: Lee B. German, Mt. Pleasant, SC (US)

(73) Assignee: FATHOM TECHNOLOGIES, LLC, Mount Pleasant, SC (US)

( * ) Notice: Subject to any disclaimer, the term of this patent is extended or adjusted under 35 U.S.C. 154(b) by 26 days.

(21) Appl. No.: 16/887,856

(22) Filed: May 29, 2020

(65) Prior Publication Data

US 2020/0293266 A1 Sep. 17, 2020

Related U.S. Application Data

(63) Continuation-in-part of application No. 15/852,350, filed on Dec. 22, 2017, now Pat. No. 10,671,251.

(51) Int. Cl.

| | |
|---|---|
| ***G09B 5/06*** | (2006.01) |
| ***G06F 3/16*** | (2006.01) |
| ***G06F 16/435*** | (2019.01) |
| ***G10L 13/08*** | (2013.01) |
| ***G06Q 20/12*** | (2012.01) |
| ***G06Q 50/20*** | (2012.01) |
| ***G06F 3/0483*** | (2013.01) |
| ***G10L 13/00*** | (2006.01) |
| ***G10L 15/00*** | (2013.01) |

(52) U.S. Cl.

CPC ............... *G09B 5/06* (2013.01); *G06F 3/162* (2013.01); *G06F 16/435* (2019.01); *G10L 13/08* (2013.01); *G06F 3/0483* (2013.01); *G06Q 20/123* (2013.01); *G06Q 50/20* (2013.01); *G10L 13/00* (2013.01); *G10L 15/00* (2013.01)

(58) Field of Classification Search

CPC ...... G06F 3/162; G06F 16/435; G06F 3/0483; G06F 3/0485; G06F 15/0291; G10L 13/08; G06Q 50/20; G09B 5/06

See application file for complete search history.

(56) References Cited

U.S. PATENT DOCUMENTS

| | | | | |
|---|---|---|---|---|
| 5,275,569 A * | 1/1994 | Watkins | ................. | G09B 19/06 434/156 |
| 5,278,943 A | 1/1994 | Gasper et al. | | |
| 5,732,216 A | 3/1998 | Logan et al. | | |
| 5,737,725 A | 4/1998 | Case | | |

(Continued)

OTHER PUBLICATIONS

Apple, Inc. Kids A-Z iPad Application App Store Webpage. Webpage . . . Date Accessed: Oct. 12, 2018.

(Continued)

*Primary Examiner* — Justin R. Blaufeld
*Assistant Examiner* — Kenny Nguyen
(74) *Attorney, Agent, or Firm* — Neo IP

(57) ABSTRACT

The present invention is directed to systems and methods for providing an improved interactive and educational eBook platform through an improved eReader. The system provides a platform through which a book is transformed into an interactive, multi-language, assisted reading, read-aloud eBook and is displayed in an eReader with an improved graphical user interface that provides features which enhance the effectiveness of eBook learning.

20 Claims, 48 Drawing Sheets

(56) References Cited

U.S. PATENT DOCUMENTS 5,842,167 A 11/1998 Miyatake et al.
5,860,064 A 1/1999 Henton
5,890,117 A 3/1999 Silverman
6,052,663 A 4/2000 Kurzweil et al.
6,068,487 A 5/2000 Dionne
6,076,059 A 6/2000 Glickman et al.
6,081,780 A 6/2000 Lumelsky
6,151,576 A 11/2000 Warnock et al.
6,199,042 B1 3/2001 Kurzweil
6,199,076 B1 3/2001 Logan et al.
6,260,011 B1 7/2001 Heckerman et al.
6,263,308 B1 7/2001 Heckerman et al.
6,282,511 B1 8/2001 Mayer
6,370,498 B1 4/2002 Flores et al.
6,397,213 B1 5/2002 Cullen et al.
6,442,523 B1 8/2002 Siegel
6,446,041 B1 9/2002 Reynar et al.
6,633,741 B1 10/2003 Posa et al.
6,810,378 B2 10/2004 Kochanski et al.
6,826,530 B1 11/2004 Kasai et al.
6,961,700 B2 11/2005 Mitchell et al.
6,970,820 B2 11/2005 Junqua et al.
7,110,945 B2 9/2006 Cogliano
7,174,295 B1 2/2007 Kivimaki
7,185,289 B1 2/2007 Taima
7,349,848 B2 3/2008 Akabane et al.
7,363,232 B2 4/2008 Megeid et al.
7,464,028 B2 12/2008 Singhal
7,483,832 B2 1/2009 Tischer
7,483,834 B2 1/2009 Naimpally et al.
7,693,719 B2 4/2010 Chu et al.
8,027,994 B2 9/2011 Drissi et al.
8,036,894 B2 10/2011 Neeracher et al.
8,065,142 B2 11/2011 Imoto et al.
8,073,695 B1 12/2011 Hendricks et al.
8,073,697 B2 12/2011 Cross et al.
8,150,695 B1 4/2012 Killalea et al.
8,224,652 B2 7/2012 Wang et al.
8,238,566 B2 8/2012 Choi et al.
8,316,315 B2 11/2012 Portnoy et al.
8,346,557 B2 1/2013 Kurzweil et al.
8,352,269 B2 1/2013 Kurzweil et al.
8,364,488 B2 1/2013 Kurzweil et al.
8,498,867 B2 7/2013 Kurzweil et al.
8,504,369 B1* 8/2013 Chigier .................. G10L 15/26 704/270
8,890,827 B1* 11/2014 Nordstrom ............ G06F 16/954 345/173
9,081,529 B1 7/2015 Joshi et al.
9,240,178 B1 1/2016 Nadolski et al.
9,542,927 B2 1/2017 Agiomyrgiannakis et al.
9,569,080 B2 2/2017 Lee
9,582,913 B1 2/2017 Kraft et al.
9,684,641 B1* 6/2017 Hamaker .............. G06F 40/197
9,800,941 B2* 10/2017 Evans ............ H04N 21/440236
9,875,734 B2* 1/2018 Agrawal .................. G07C 9/37
10,139,780 B2* 11/2018 Rinker .................... G06T 15/80
10,348,916 B2* 7/2019 Nagata .................... G06F 9/451
2002/0099552 A1 7/2002 Rubin et al.
2002/0184189 A1 12/2002 Hay et al.
2003/0011643 A1 1/2003 Nishihata
2003/0014252 A1 1/2003 Shizuka et al.
2003/0028377 A1 2/2003 Noyes
2003/0028380 A1 2/2003 Freeland et al.
2003/0212559 A1 11/2003 Xie
2004/0024582 A1 2/2004 Shepard et al.
2004/0080532 A1* 4/2004 Cragun .................. G06F 16/34 715/745
2004/0090555 A1 5/2004 Megeid
2005/0091056 A1 4/2005 Surace et al.
2005/0096909 A1 5/2005 Bakis et al.
2005/0256716 A1 11/2005 Bangalore et al.
2006/0069567 A1 3/2006 Tischer et al.
2006/0074672 A1 4/2006 Allefs
2006/0111902 A1 5/2006 Julia et al.
2007/0043574 A1 2/2007 Coffman et al.
2007/0094330 A1 4/2007 Russell
2007/0118378 A1 5/2007 Skuratovsky
2007/0166683 A1* 7/2007 Chang .................. G09B 21/009 434/307 R
2007/0192105 A1 8/2007 Neeracher et al.
2007/0206022 A1* 9/2007 Skaggs ............... G06F 16/9577 345/581
2008/0140413 A1* 6/2008 Millman .................. G09B 7/02 704/270
2008/0140652 A1* 6/2008 Millman ................ G09B 17/00
2008/0167856 A1 7/2008 Janakiraman et al.
2008/0167875 A1 7/2008 Bakis et al.
2008/0235024 A1 9/2008 Goldberg et al.
2009/0157394 A1 6/2009 Singhal
2009/0202226 A1 8/2009 McKay
2009/0276064 A1 11/2009 Gassel
2010/0094632 A1 4/2010 Davis et al.
2010/0153091 A1* 6/2010 Kung ...................... G06F 40/53 704/9
2010/0318362 A1* 12/2010 Kurzweil ................ G10L 13/00 704/260
2010/0318363 A1* 12/2010 Kurzweil ................ G10L 13/00 704/260
2010/0318364 A1* 12/2010 Kurzweil ................ G10L 13/00 704/260
2010/0324895 A1* 12/2010 Kurzweil ................ G10L 13/00 704/235
2010/0324902 A1 12/2010 Kurzweil et al.
2010/0324903 A1* 12/2010 Kurzweil ................ G10L 13/00 704/260
2010/0324904 A1* 12/2010 Kurzweil ................ G10L 13/00 704/260
2010/0329555 A1 12/2010 Chapman et al.
2011/0246175 A1* 10/2011 Yi ........................... G06F 40/45 704/3
2011/0261030 A1* 10/2011 Bullock .............. G06F 3/04842 345/204
2012/0036429 A1* 2/2012 Ajima .................... G06Q 30/02 715/259
2012/0050306 A1 3/2012 Kurzweil et al.
2012/0324324 A1 12/2012 Hwang et al.
2012/0324355 A1* 12/2012 Mbenkum ............... G06F 3/167 715/727
2013/0013991 A1* 1/2013 Evans ............ H04N 21/440236 715/206
2013/0185198 A1* 7/2013 Lorch .................. G06Q 20/145 705/39
2013/0212454 A1* 8/2013 Casey .................... G06Q 10/10 715/203
2013/0294751 A1* 11/2013 Maeda ..................... H04N 9/87 386/282
2013/0298016 A1* 11/2013 Chigier ................. G06F 40/103 715/256
2014/0007257 A1 1/2014 Dougherty et al.
2014/0013192 A1* 1/2014 McQuiggan ........... G09B 5/062 715/203
2014/0059476 A1 2/2014 Shin
2014/0067367 A1 3/2014 Simmons et al.
2014/0093855 A1* 4/2014 Waldman ............... G09B 5/065 434/308
2014/0120503 A1* 5/2014 Nicol ....................... G09B 5/02 434/157
2014/0123311 A1* 5/2014 Pegg ....................... G06F 21/10 726/27
2014/0180698 A1* 6/2014 Kai ......................... G10L 15/22 704/275
2014/0237576 A1* 8/2014 Zhang ..................... G06F 21/32 726/7
2014/0325407 A1* 10/2014 Morris .................. G06F 3/0481 715/765
2015/0025663 A1 1/2015 Cameron et al.
2015/0039991 A1 2/2015 Cameron et al.
2015/0199314 A1 7/2015 Ratnakar
2015/0242061 A1 8/2015 Patel et al.
2015/0301721 A1 10/2015 Clark
2015/0346930 A1 12/2015 Murray et al.

(56) References Cited

U.S. PATENT DOCUMENTS

| | | | | |
|---|---|---|---|---|
| 2015/0356887 | A1* | 12/2015 | Mathias | G09B 19/06 434/157 |
| 2016/0109976 | A1 | 4/2016 | Nguyen | |
| 2017/0024381 | A1 | 1/2017 | Ajayi | |
| 2017/0078504 | A1* | 3/2017 | Nagata | G03G 15/5016 |
| 2017/0193982 | A1* | 7/2017 | Agrawal | G06K 9/00597 |
| 2018/0101135 | A1* | 4/2018 | Rinker | G03H 1/2205 |
| 2018/0165255 | A1 | 6/2018 | Gafford et al. | |
| 2018/0165987 | A1* | 6/2018 | Montiel | G09B 5/06 |
| 2019/0005959 | A1* | 1/2019 | Cameron | G06F 3/165 |
| 2019/0051301 | A1* | 2/2019 | Locascio | G10L 15/26 |
| 2019/0189027 | A1* | 6/2019 | Begert | G09B 19/06 |
| 2019/0196675 | A1 | 6/2019 | German | |
| 2019/0362732 | A1* | 11/2019 | Port | G10L 21/0364 |
| 2020/0118582 | A1* | 4/2020 | Garland | G10L 25/51 |
| 2020/0327817 | A1* | 10/2020 | Raynaud | G10L 21/10 |
| 2020/0336612 | A1* | 10/2020 | Inoue | G06F 40/174 |

OTHER PUBLICATIONS

Dachis, A.n (Jul. 12, 2011). PdfMasher Turns PDFs into Ereader-Friendly HTML the Right Way. Retrieved Apr. 19, 2019, from https ://lifehacker.com/pdfmasher-turns-pdfs-i nto-ereader-friendly-html-the-rig-5820487 (Year: 2011).

Dupras, V. (Jun. 20, 2011). PdfMasher 0.1.0 presentation. Retrieved from https://www.youtube.com/watch?v=sgRIz-2PGfM (Year:2011).

Lazel, Inc. Kids A-Z iPad Application. Mobile Application. Version Release Date: Oct. 12, 2018. Date Accessed: Oct. 12, 2018.

* cited by examiner

| Page | Transpose | Text to Columns | | |
|---|---|---|---|---|
| 14 | The | rabbit-hole | went | straight |
| 14 | rabbit-hole | | | |
| 14 | went | | | |
| 14 | straight | | | |

FIG. 3
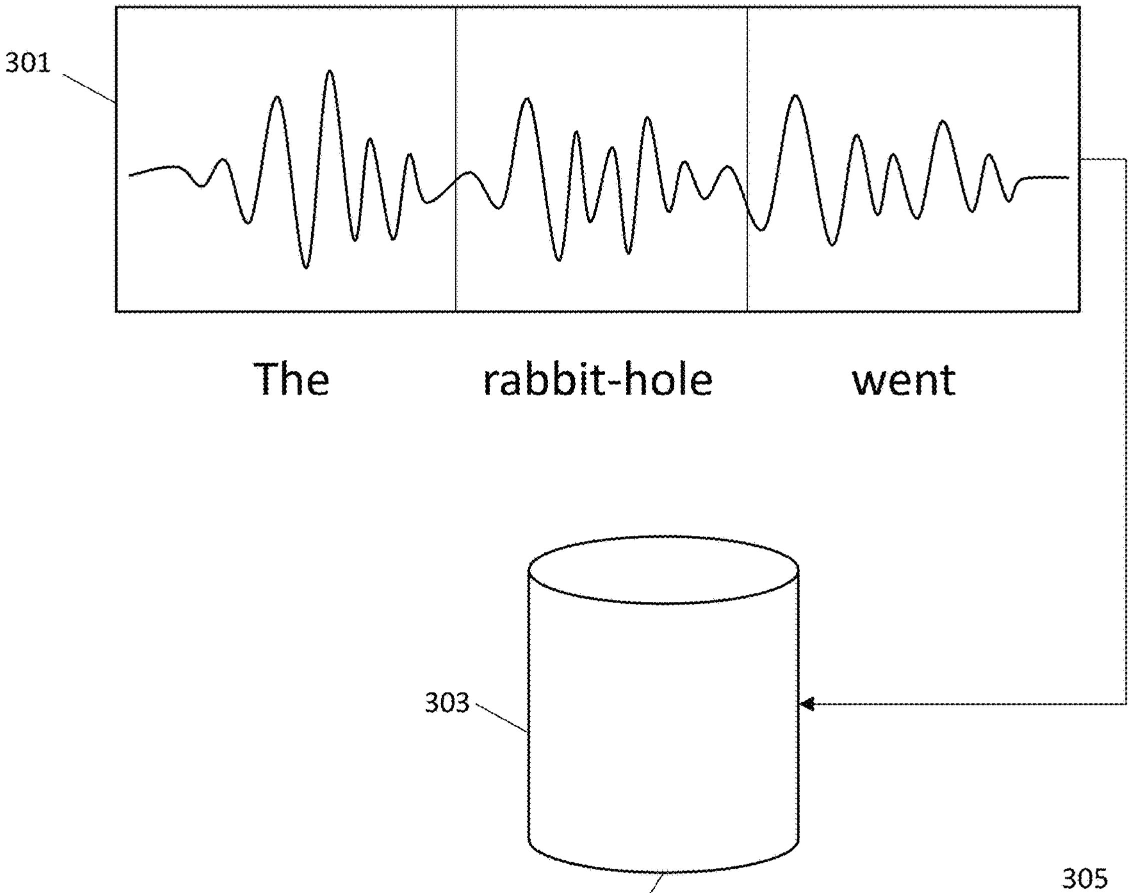
305
| Audio | Word | Page | Start | End | mp3 |
|---|---|---|---|---|---|
|  | The | 2 | 05:01:10 | 05:02:15 | 4 |
| 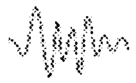 | rabbit-hole | 2 | 05:02:20 | 05:03:05 | 5 |
| 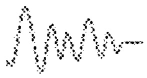 | went | 2 | 05:03:15 | 05:03:50 | 6 |

Alice started to her feet, for it flashed across her mind that she had never before seen a rabbit with either a waistcoat-pocket, or a watch to take out of it, and burning with curiosity, she ran across the field after it, and fortunately was just in time to see it pop down a large rabbit-hole under the hedge.

Alice started to her feet, for it flashed across her mind that she had never before seen a rabbit with either a waistcoat-pocket, or a watch to take out of it, and 601

603
605
607 burning with curiosity, she ran across the field after it, and fortunately was just in time to see it pop down a large rabbit-hole under the hedge. 601

603
605
607

Text © 2014 Katherine Hall

801

801

Text © 2014 Katherine Hall

Text © 2014 Katherine Hall

FIG. 13C

| School | City | State | # Hits | Expiration |
|---|---|---|---|---|
| * Arbordale Test & Demo | Mount Pleasant | AS | 2886 | 12/31/2018 |

* Arbordale Test & Demo

| Item + or - All Items | + 2015 | - 2016 Jan | Feb | Mar | Apr | May | Jun | July | Aug | Sep | Oct | Nov | Dec | Total | + 2017 |
|---|---|---|---|---|---|---|---|---|---|---|---|---|---|---|---|
| -eBooks | 277 | 42 | 58 | 211 | 98 | 38 | 224 | 201 | 1235 | 1007 | 450 | 261 | 189 | 4014 | 8666 |
| -English | 275 | 42 | 58 | 208 | 96 | 38 | 224 | 201 | 1226 | 1007 | 450 | 253 | 163 | 3966 | 8666 |
| BatCount | | | | | | | | | | | | 4 | | 4 | |
| 'Twas the Day Before Zoo Day | 1 | | 1 | | 2 | | | | | | | 2 | | 5 | 49 |
| ABC Safari | 2 | | 3 | | | | 4 | | 7 | 68 | 3 | 28 | 22 | 135 | 424 |
| Achoo! Why Pollen Counts | 15 | | 2 | 3 | | | 2 | | 14 | 3 | | 4 | 2 | 30 | 47 |
| After A While Crocodile: Alexas Diary | | | | | | | | 19 | 125 | 11 | 7 | 3 | 3 | 168 | 197 |
| Amphibians and Reptiles: A Compare and Contrast Book | 19 | | 1 | 8 | | 2 | 4 | 2 | 12 | 1 | 3 | 2 | 1 | 36 | 58 |
| Animal Eyes | 7 | | 1 | | | | 2 | | 2 | | 2 | 2 | 1 | 10 | 40 |
| Animal Helpers: Aquariums | | | | 1 | 2 | 4 | 2 | | 7 | | 1 | 2 | | 19 | 45 |
| Animal Helpers: Raptor Centers | | | | 1 | 2 | | | | 5 | | 1 | 2 | | 11 | 71 |
| Animal Helpers: Sanctuaries | 6 | | | 1 | | | | 2 | 7 | 1 | 2 | 2 | | 15 | 44 |
| Animal Helpers: Wildlife Rehabilitators | 2 | | 2 | | | | | | 2 | | 1 | 1 | | 6 | 45 |
| Animal Helpers: Zoos | 4 | | | | | | | | 2 | | 1 | 1 | 1 | 5 | 51 |
| Animal Legs | | | | | | | | 6 | 127 | 23 | 13 | 1 | 2 | 172 | 158 |
| Animal Mouths | 2 | | | 1 | | | | 2 | 5 | | 1 | 2 | | 11 | 53 |

FIG. 19
1901
* Arbordale Test Drive - (11 pg Previews)
Spanish
Bat Count
Honey Girl
A True Princess of Hawai'i
ABC Safari
After A While Crocodile
Animal Eyes
Animal Helpers Sanctuaries
Animal Helpers Zoos
Animal Legs
Animal Partners
Animalogy

Figure 20:
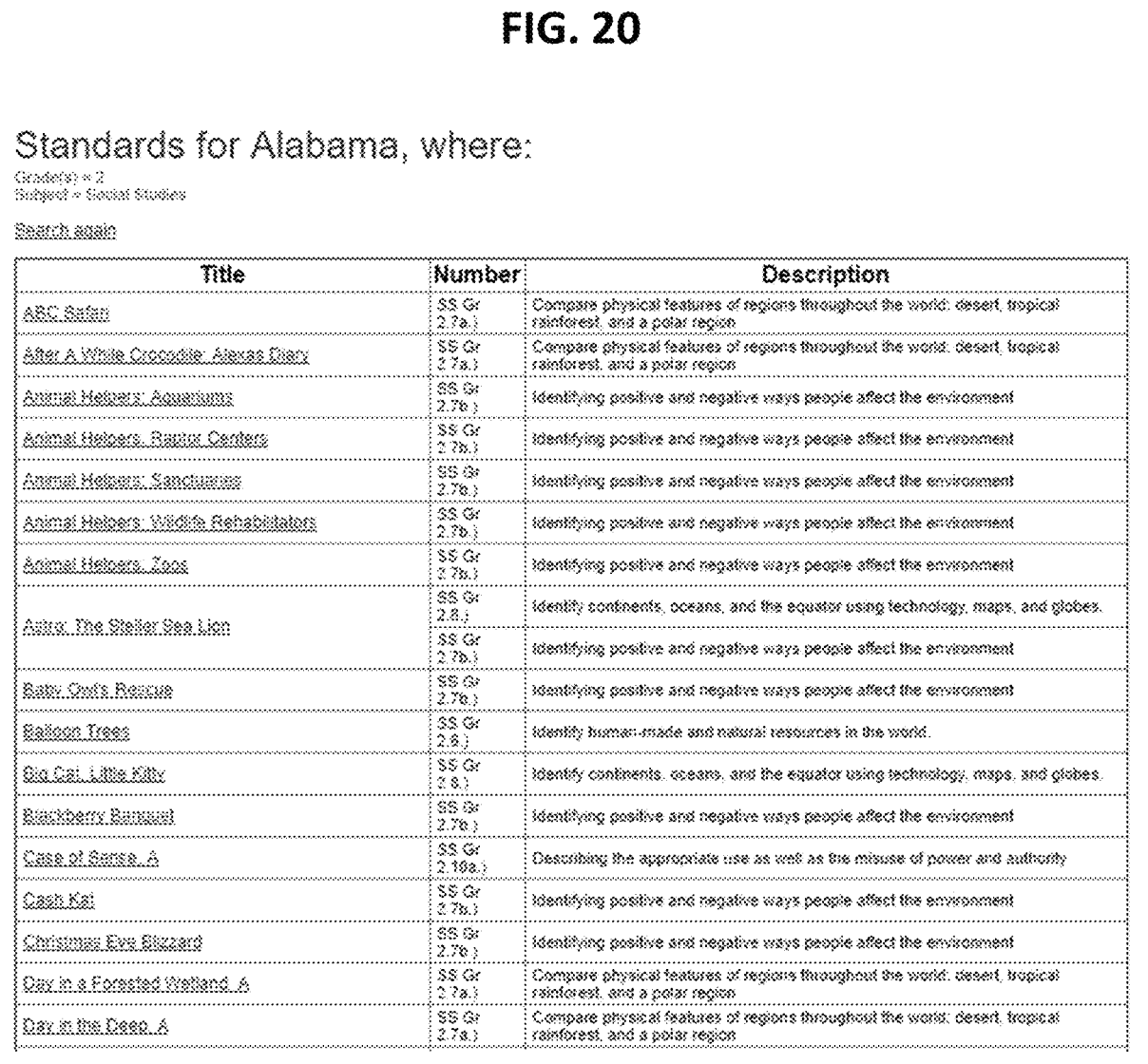

Standards for Alabama, where:

Grade(s) = 2
Subject = Social Studies

Search again

| Title | Number | Description |
|---|---|---|
| ABC Safari | SS Gr 2.7a.) | Compare physical features of regions throughout the world: desert, tropical rainforest, and a polar region |
| After A While Crocodile: Alexas Diary | SS Gr 2.7a.) | Compare physical features of regions throughout the world: desert, tropical rainforest, and a polar region |
| Animal Helpers: Aquariums | SS Gr 2.7b.) | Identifying positive and negative ways people affect the environment |
| Animal Helpers: Raptor Centers | SS Gr 2.7b.) | Identifying positive and negative ways people affect the environment |
| Animal Helpers: Sanctuaries | SS Gr 2.7b.) | Identifying positive and negative ways people affect the environment |
| Animal Helpers: Wildlife Rehabilitators | SS Gr 2.7b.) | Identifying positive and negative ways people affect the environment |
| Animal Helpers: Zoos | SS Gr 2.7b.) | Identifying positive and negative ways people affect the environment |
| Astro: The Steller Sea Lion | SS Gr 2.8.) | Identify continents, oceans, and the equator using technology, maps, and globes. |
| | SS Gr 2.7b.) | Identifying positive and negative ways people affect the environment |
| Baby Owl's Rescue | SS Gr 2.7b.) | Identifying positive and negative ways people affect the environment |
| Balloon Trees | SS Gr 2.8.) | Identify human-made and natural resources in the world. |
| Big Cat, Little Kitty | SS Gr 2.8.) | Identify continents, oceans, and the equator using technology, maps, and globes. |
| Blackberry Banquet | SS Gr 2.7b.) | Identifying positive and negative ways people affect the environment |
| Case of Sense, A | SS Gr 2.10a.) | Describing the appropriate use as well as the misuse of power and authority |
| Cash Kat | SS Gr 2.7b.) | Identifying positive and negative ways people affect the environment |
| Christmas Eve Blizzard | SS Gr 2.7b.) | Identifying positive and negative ways people affect the environment |
| Day in a Forested Wetland, A | SS Gr 2.7a.) | Compare physical features of regions throughout the world: desert, tropical rainforest, and a polar region |
| Day in the Deep, A | SS Gr 2.7a.) | Compare physical features of regions throughout the world: desert, tropical rainforest, and a polar region |

FIG. 23
Sylvan Dell
Add eBooks
ABC Safari
Written by: Suzanne Slade
Illustrated by: Gary R. Phillips
32 pg, Ages: 4-8, Grades: K-1, Lexile: 780,
AR: 2.7, Reading Counts: 2.4
Status
Cloud
Down load
2301

FIG. 25
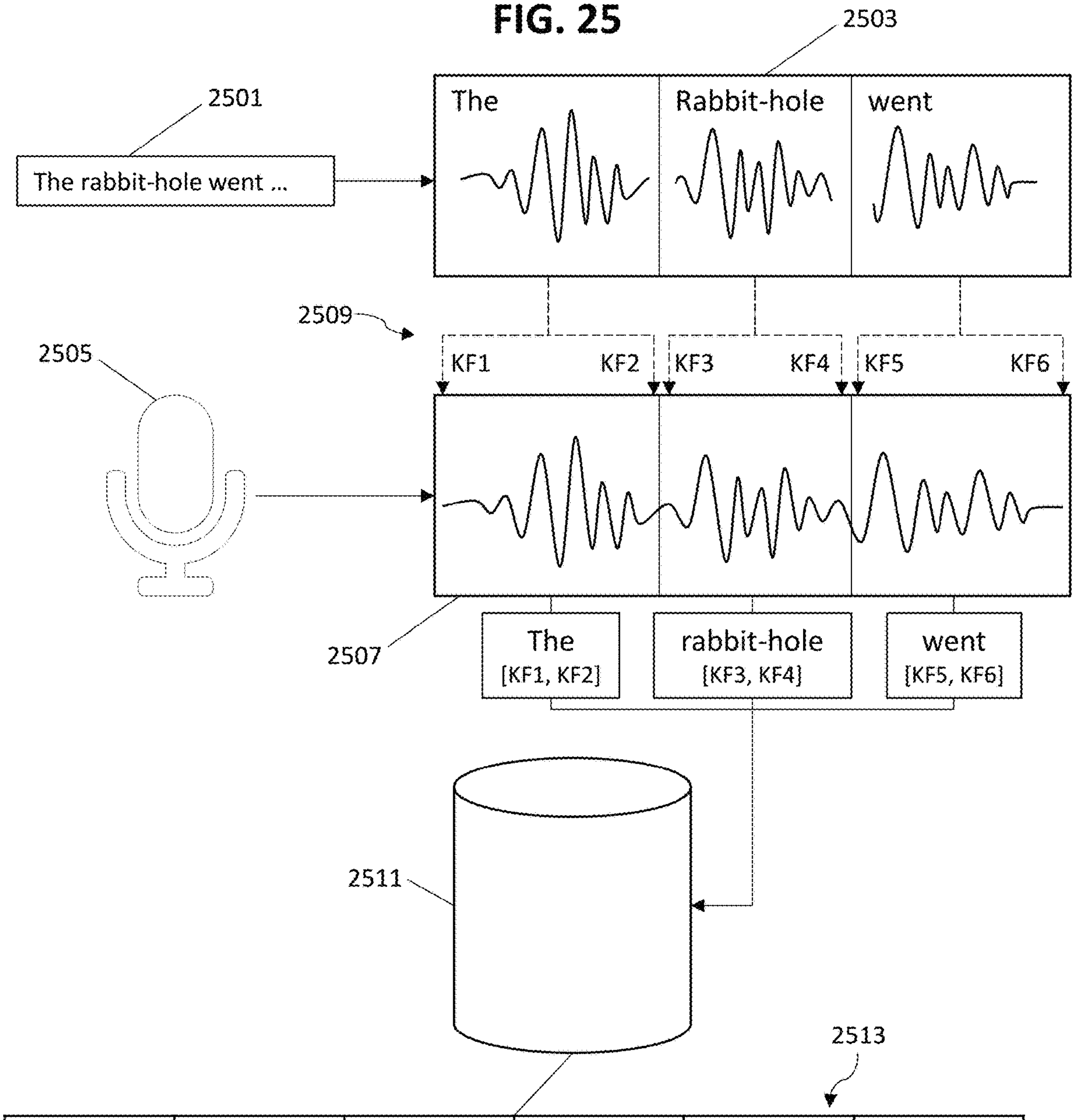
| Audio | Word | Page | Start | End | mp3 |
|---|---|---|---|---|---|
| 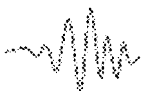 | The | 2 | 05:01:10 [KF1] | 05:02:15 [KF2] | 2 |
| 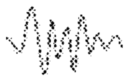 | rabbit-hole | 2 | 05:02:20 [KF3] | 05:03:05 [KF4] | 2 |
| 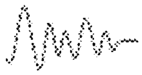 | went | 2 | 05:03:15 [KF5] | 05:03:50 [KF6] | 3 |

| Video | Word | Page | Start | End | Audio |
|---|---|---|---|---|---|
| 1.mp4 | into | Para. 1, Word 28 | 05:01:10 | 05:02:15 | 1.mp4 |
| 1.mp4 | book | Para. 1, Word 30 | 05:02:20 | 05:03:05 | 1.mp4 |
| 2.mp4 | sister | Para. 1, Word 32 | 05:03:15 | 05:03:50 | 3.mp3 |

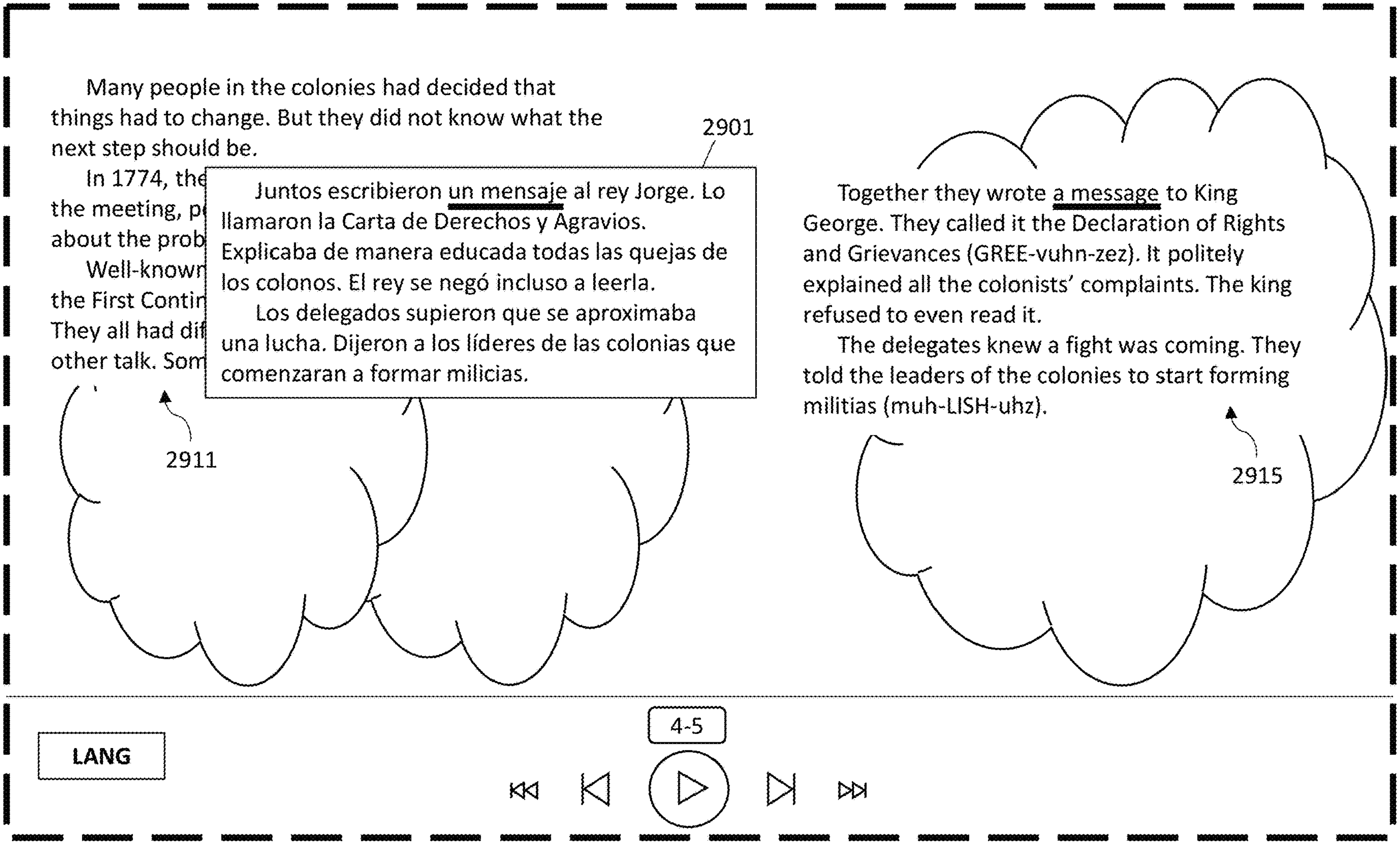

FIG. 30

Many people in the colonies had decided that things had to change. But they did not know what the next step should be.    2901

In 1774, the
the meeting, p    Juntos escribieron un mensaje al rey Jorge. Lo
about the prob    llamaron la Carta de Derechos y Agravios.
Well-known    Explicaba de manera educada todas las quejas de
the First Contin    los colonos. El rey se negó incluso a leerla.
They all had dif    Los delegados supieron que se aproximaba
other talk. Som    una lucha. Dijeron a los líderes de las colonias que
    comenzaran a formar milicias.

2911

Together they wrote a message to King George. They called it the Declaration of Rights and Grievances (GREE-vuhn-zez). It politely explained all the colonists' complaints. The king refused to even read it.
The delegates knew a fight was coming. They told the leaders of the colonies to start forming militias (muh-LISH-uhz).

2915

LANG

3103

3113 → This creature loves to cut down trees—long teeth can handle that with ease. She stacks the logs into a dome which then becomes the Beaver's home.

3107

3101

3111 → He slyly waits in log disguise.
A greedy gleam shines in his eyes.
He'll wait until the moment's right, then Alligator's going to bite.

3105

3109
4-5

| EN | SP | AR | — | Bilingual |
|----|----|----|----|-----------|

LANG

FIG. 33

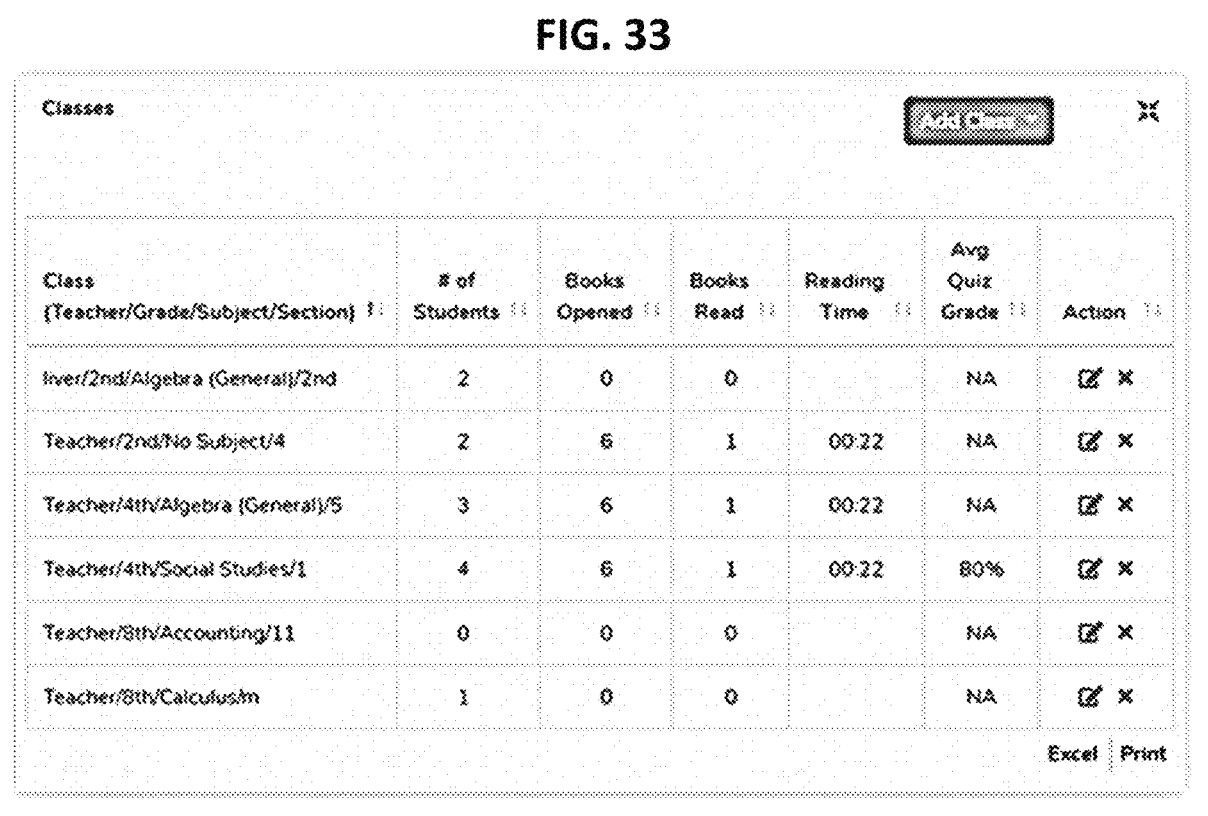

Classes

| Class (Teacher/Grade/Subject/Section) | # of Students | Books Opened | Books Read | Reading Time | Avg Quiz Grade | Action |
|---|---|---|---|---|---|---|
| liver/2nd/Algebra (General)/2nd | 2 | 0 | 0 | | NA | |
| Teacher/2nd/No Subject/4 | 2 | 6 | 1 | 00:22 | NA | |
| Teacher/4th/Algebra (General)/5 | 3 | 6 | 1 | 00:22 | NA | |
| Teacher/4th/Social Studies/1 | 4 | 6 | 1 | 00:22 | 80% | |
| Teacher/8th/Accounting/11 | 0 | 0 | 0 | | NA | |
| Teacher/8th/Calculus/m | 1 | 0 | 0 | | NA | |

Excel | Print

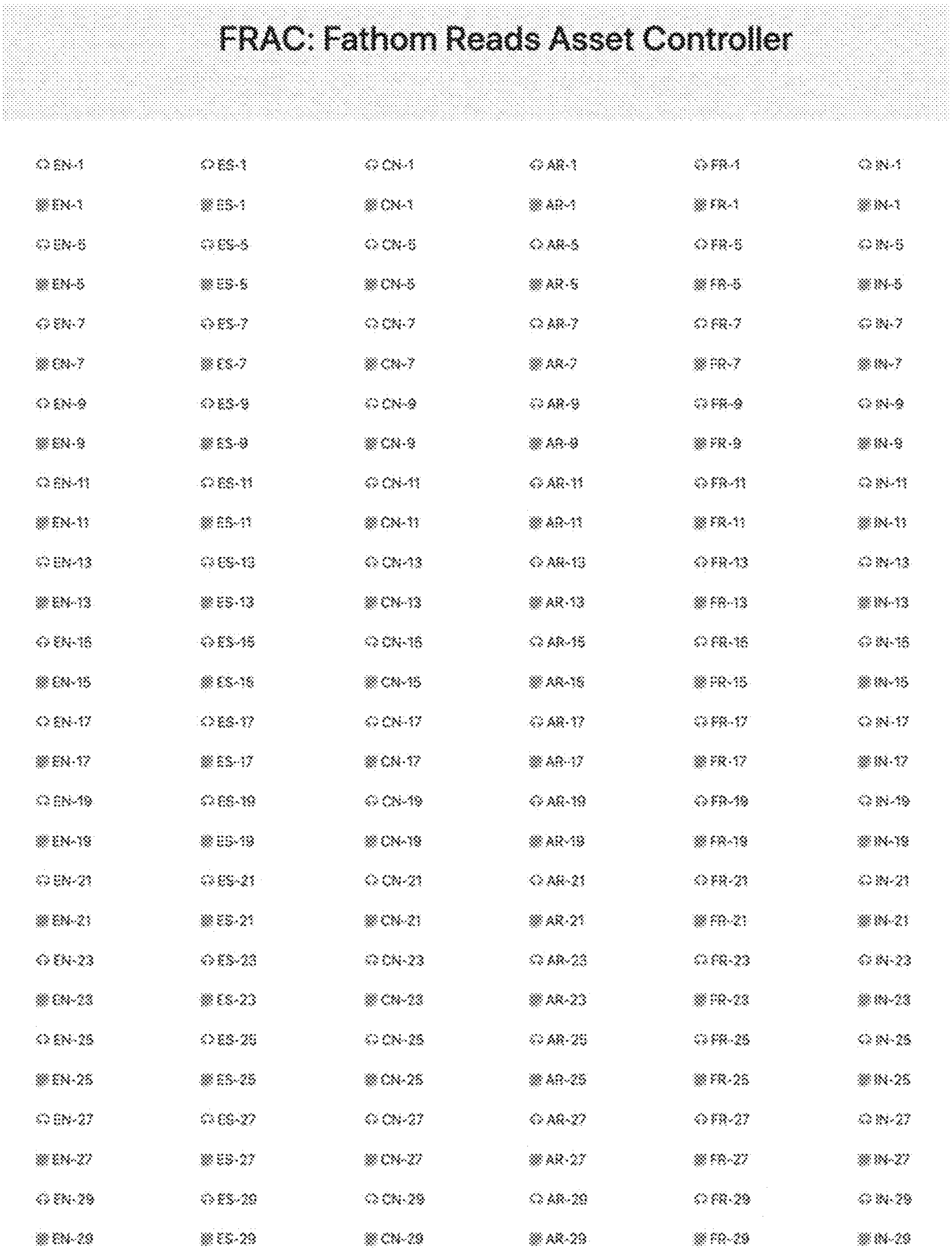

FIG. 37A

FRAC: Fathom Reads Asset Controller

| | | | | | |
|---|---|---|---|---|---|
| ○ EN-1 | ○ ES-1 | ○ CN-1 | ○ AR-1 | ○ FR-1 | ○ IN-1 |
| ▓ EN-1 | ▓ ES-1 | ▓ CN-1 | ▓ AR-1 | ▓ FR-1 | ▓ IN-1 |
| ○ EN-5 | ○ ES-5 | ○ CN-5 | ○ AR-5 | ○ FR-5 | ○ IN-5 |
| ▓ EN-5 | ▓ ES-5 | ▓ CN-5 | ▓ AR-5 | ▓ FR-5 | ▓ IN-5 |
| ○ EN-7 | ○ ES-7 | ○ CN-7 | ○ AR-7 | ○ FR-7 | ○ IN-7 |
| ▓ EN-7 | ▓ ES-7 | ▓ CN-7 | ▓ AR-7 | ▓ FR-7 | ▓ IN-7 |
| ○ EN-9 | ○ ES-9 | ○ CN-9 | ○ AR-9 | ○ FR-9 | ○ IN-9 |
| ▓ EN-9 | ▓ ES-9 | ▓ CN-9 | ▓ AR-9 | ▓ FR-9 | ▓ IN-9 |
| ○ EN-11 | ○ ES-11 | ○ CN-11 | ○ AR-11 | ○ FR-11 | ○ IN-11 |
| ▓ EN-11 | ▓ ES-11 | ▓ CN-11 | ▓ AR-11 | ▓ FR-11 | ▓ IN-11 |
| ○ EN-13 | ○ ES-13 | ○ CN-13 | ○ AR-13 | ○ FR-13 | ○ IN-13 |
| ▓ EN-13 | ▓ ES-13 | ▓ CN-13 | ▓ AR-13 | ▓ FR-13 | ▓ IN-13 |
| ○ EN-15 | ○ ES-15 | ○ CN-15 | ○ AR-15 | ○ FR-15 | ○ IN-15 |
| ▓ EN-15 | ▓ ES-15 | ▓ CN-15 | ▓ AR-15 | ▓ FR-15 | ▓ IN-15 |
| ○ EN-17 | ○ ES-17 | ○ CN-17 | ○ AR-17 | ○ FR-17 | ○ IN-17 |
| ▓ EN-17 | ▓ ES-17 | ▓ CN-17 | ▓ AR-17 | ▓ FR-17 | ▓ IN-17 |
| ○ EN-19 | ○ ES-19 | ○ CN-19 | ○ AR-19 | ○ FR-19 | ○ IN-19 |
| ▓ EN-19 | ▓ ES-19 | ▓ CN-19 | ▓ AR-19 | ▓ FR-19 | ▓ IN-19 |
| ○ EN-21 | ○ ES-21 | ○ CN-21 | ○ AR-21 | ○ FR-21 | ○ IN-21 |
| ▓ EN-21 | ▓ ES-21 | ▓ CN-21 | ▓ AR-21 | ▓ FR-21 | ▓ IN-21 |
| ○ EN-23 | ○ ES-23 | ○ CN-23 | ○ AR-23 | ○ FR-23 | ○ IN-23 |
| ▓ EN-23 | ▓ ES-23 | ▓ CN-23 | ▓ AR-23 | ▓ FR-23 | ▓ IN-23 |
| ○ EN-25 | ○ ES-25 | ○ CN-25 | ○ AR-25 | ○ FR-25 | ○ IN-25 |
| ▓ EN-25 | ▓ ES-25 | ▓ CN-25 | ▓ AR-25 | ▓ FR-25 | ▓ IN-25 |
| ○ EN-27 | ○ ES-27 | ○ CN-27 | ○ AR-27 | ○ FR-27 | ○ IN-27 |
| ▓ EN-27 | ▓ ES-27 | ▓ CN-27 | ▓ AR-27 | ▓ FR-27 | ▓ IN-27 |
| ○ EN-29 | ○ ES-29 | ○ CN-29 | ○ AR-29 | ○ FR-29 | ○ IN-29 |
| ▓ EN-29 | ▓ ES-29 | ▓ CN-29 | ▓ AR-29 | ▓ FR-29 | ▓ IN-29 |

E-READER INTERFACE SYSTEM WITH AUDIO AND HIGHLIGHTING SYNCHRONIZATION FOR DIGITAL BOOKS

CROSS REFERENCES TO RELATED APPLICATIONS

This application is related to and claims priority from the following U.S. patents and patent applications. This application is a Continuation-in-Part of U.S. Non-Provisional patent application Ser. No. 15/852,350, filed Dec. 22, 2017, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to eReader and eBook technology, and more specifically to methods and systems of creating, processing, and interacting with eBook text and graphics through an eReader in order to provide assisted reading, multilingual, and customizable interfaces for a multitude of eBooks.

2. Description of the Prior Art

It is generally known in the prior art to provide eBooks and eReaders as digital copies of paper-published works. It is also known to provide digital eBooks that include some interactive elements to improve reading functionality and interactivity. These embodiments are exemplified by the following documents.

U.S. Pat. No. 6,446,041 for a method and system for providing audio playback of a multi-source document by inventor Reynar, et al., filed Oct. 27, 1999 and issued Sep. 3, 2002, is directed to a multi-source input and playback utility that accepts inputs from various sources, transcribes the inputs as text, and plays aloud user-selected portions of the text is disclosed. The user may select a portion of the text and request audio playback thereof. The utility examines each transcribed word in the selected text. If stored audio data is associated with a given word, that audio data is retrieved and played. If no audio data is associated, then a textto-speech entry or series of entries is retrieved and played instead.

US Pub. No. 2003/0028380 for a speech system by inventor Freeland, et al., filed Aug. 2, 2002, is directed to a system for generating an audio message over a communications network that is at least partly in a voice representative of a character generally recognizable to a user. Either a voice message or text based message may be used to construct the audio message. Specific recordings of well known characters is stored in a storage means and background sound effects can be inserted into the audio message which are stored in database. The audio message is constructed by any one of the processing means and transmitted to a recipient for play back on a processing terminal.

US Pub. No. 2010/0324895 for Synchronization for Document Narration by inventor Kurzweil, et al., filed Jan. 14, 2010, is directed to techniques and systems for synchronizing an audio file with a sequence of words displayed on a user interface.

U.S. Pat. No. 7,483,832 for Method and system for customizing voice translation of text to speech by inventor Tischer, filed Dec. 10, 2001 and issued Jan. 27, 2009, is directed to a method and system of customizing voice translation of a text to speech includes digitally recording speech samples of a known speaker, correlating each of the speech samples with a standardized audio representation, and organizing the recorded speech samples and correlated audio representations into a collection. The collection of speech samples correlated with audio representations is saved as a single voice file and stored in a device capable of translating the text to speech. The voice file is applied to a translation of text to speech so that the translated speech is customized according to the applied voice file.

US Pub. No. 2008/0140652 for an Authoring Tool by inventor Millman, et al., filed Dec. 7, 2006, is directed to methods and related computer program products, systems, and devices for providing feedback to a user based on audio input associated with a user reading a passage torn a physical text are disclosed.

US Pub. No. 2003/0028380 for a speech system by inventor Freeland, et al., filed Aug. 2, 2017, is directed to system for generating an audio message over a communications network that is at least partly in a voice representative of a character generally recognizable to a user. Either a voice message or text based message may be used to construct the audio message. Specific recordings of well known characters is stored in a storage means and background sound effects can be inserted into the audio message which are stored in database. The audio message is constructed by any one of the processing means and transmitted to a recipient for play back on a processing terminal.

US Pub. No. 2009/0202226 for a System and method for converting electronic text to a digital multimedia electronic book by inventor McKay, filed Jun. 6, 2006, is directed to a system and method for converting an existing digital source document into a speech-enabled output document and synchronized highlighting of spoken text with the minimum of interaction from a publisher. A mark-up application is provided to correct reading errors that may be found in the source document. An exporter application can be provided to convert the source document and corrections from the mark-up application to an output format. A viewer application can be provided to view the output and to allow user interactions with the output.

U.S. Pat. No. 6,052,663 for a Reading system which reads aloud from an image representation of a document by inventor Kurzweil, filed Jun. 27, 1997 and issued Apr. 18, 2000, is directed to a reading system that includes a computer and a mass storage device including software comprising instructions for causing a computer to accept an image file generated from optically scanning an image of a document. The software convert the image file into a converted text file that includes text information, and positional information associating the text with the position of its representation in the image file. The reading system has the ability therefore to display the image representation of the scanned image on a computer monitor and permit a user to control operation of the reader by with respect to the displayed image representation of the document by using the locational information associated with the converted text file. Also described are techniques for dual highlighting spoken text and a technique for determining the nearest word to a position selected by use of mouse or other pointing device operating on the image representation as displayed on the monitor.

US Pub. No. 2004/0024582 for Systems and methods for aiding human translation by inventor Shepard, et al., filed Jul. 2, 2003, is directed to a system [that] aids a user in translating an audio signal that includes speech from one language to another. A user may be permitted to stop the playback at any time. The user may also be permitted to control the playback by, for example, fast forwarding, speeding it up, slowing it down, or backing it up so many seconds or so many words. The media player or the graphical user interface may present the user with a set of controls to permit the user to perform these functions.

U.S. Pat. No. 8,238,566 for Apparatus for providing sound effects according to an image and method thereof by inventor Choi, et al., filed Mar. 9, 2005 and issued Aug. 7, 2012 is directed to an apparatus for providing sound effects according to an input image and a method thereof capable of conveying details of the input image lively and effectively by recognizing the shape of the image and outputting a sound suitable for the recognized shape of the image. The apparatus for providing the sound effects according to the image includes an image input unit for receiving an input of an image, a sound effect providing unit for recognizing the image inputted through the image input unit and providing the sound effects according to the input image, and an image output unit for outputting the image inputted through the image input unit and the sound provided from the sound effect providing unit.

US Pub. No. 2015/0242061 for Automatic bookmark of a select location within a page of an ebook responsive to a user touch gesture by inventor Patel, et al., filed Feb. 24, 2014, is directed to a system and method for bookmark a select location with a page of an ebook. A graphical user interface (GUI) is configured to display content of a page, and bookmark a select location within the page responsive to a swipe gesture starting from a predetermined position on the GUI. The end position of swipe gesture is recorded as the bookmark and a visual object representing the bookmark is rendered on the GUI. The select location may correspond to a last line that a user just finished reading before closing the reading session of the electronic document. The visual object may be removed from the electronic document once a user can locate the select location in a subsequent reading session.

U.S. Pat. No. 9,081,529 for Generation of electronic books by inventor Joshi, et al., filed Jun. 22, 2012, and issued Jul. 14, 2015, is directed to systems and methods for modifying electronic books ("eBooks"). A server processes eBook data to determine portions of one or more source fonts comprising various glyphs used in presenting the eBook. An embedded font is generated which includes those portions of the one or more fonts which are used in the particular eBook data. Because the unused portions of the one or more fonts are omitted, the overall size of the embedded fonts may be less than those of the source fonts. A custom character map may be generated as part of the embedded font which provides for increased document security.

SUMMARY OF THE INVENTION

The present invention relates to eBook and eReader systems and methods that provide an interactive and multi-functional environment for education.

It is an object of this invention to provide a comprehensive, multi-functional educational tool for the instruction of literary, foreign language, math, and science topics through the use of interactive, multi-language, assisted reading, read-aloud eBook technology. Prior art focuses on simply converting previous methods of instruction, such as paper books, into digital alternatives, and thus there is a great need to utilize the new possibilities of computer technology to transform books into a learning environment that is substantially different from its printed counterparts or mere digital copies. Some attempts have been made at developing this technology through means that simply apply known computer technology to eBooks to create some degree of interactivity. However, these attempts have not provided any significantly beneficial improvements to educational technology, since the components do not work together to provide a cohesive, interconnected learning experience that actively teaches students through a variety of learning methods, tools, and activities.

In contrast to prior art, the present invention is directed to transforming books entirely in order to provide a system that accelerates education through a new platform. When utilizing eBooks for educational purposes, teachers often have to incorporate multiple, external teaching aids in order to provide a comprehensive teaching environment. This leads to much confusion, wasted time, and inefficient instruction, since the outside teaching aids do not always mesh well together and are not directly accessible from a single platform. Similarly, for a student either passively or actively learning through an eBook, none of the prior art provides a system or method to cohesively, interactively, and effectively promote learning literary, foreign language, math, and science skills through the same eBook or eReader platform.

The present invention solves these problems by creating interconnected systems and methods for providing interactive, educational eBook platforms and eReaders with assisted reading. The platforms provide a comprehensive system through which readers are able to interact with and learn from the material presented. Specifically, a combination of a Text Transformation System, eBook-specific Learning Tools, and an improved graphical user interface (GUI) with highlighting, assisted reading, and read-aloud features provide improvements and developments to eReader technology that create a new, more effective platform for educational eBooks.

In one embodiment, the present invention provides a system for an improved eReader interface, comprising: text and audio relating to a digital book, wherein the text includes at least two language sets of text, and wherein the audio includes at least two language sets of audio; a graphical user interface (GUI); and keyframes for the audio, wherein the keyframes are derived from force alignment of the audio to the text, and wherein the keyframes indicate beginning timestamps and ending timestamps for spoken words, spoken characters, spoken sentences, or spoken sentence fragments corresponding to words, characters, sentences, or sentence fragments of the text; wherein the system is operable to display text corresponding to a selected language set of the at least two language sets of text; wherein the system is operable to provide highlighting preference options via the GUI, wherein the highlighting preference options include selections for word highlighting, character highlighting, sentence highlighting, and sentence fragment highlighting; wherein the system is operable to highlight the words, the characters, the sentences, or the sentence fragments of the text based on a selection of the highlighting preference options received via the GUI; wherein the system is further operable to playback the audio and synchronize the playback with the highlighting, wherein the system is operable to highlight at least one word, at least one character, at least one sentence, or at least one sentence fragment of the text for a time according to the keyframes; wherein the highlighting and the playback occurs based on the selected language set and a corresponding language set of the at least two language sets of audio; wherein the system is further operable to highlight the words, the characters, the sentences, or the sentence fragments based on a word selection, a character selection, a sentence selection, or a sentence fragment selection; and wherein the system is further operable to playback audio corresponding to the word selection, the character selection, the sentence selection, or the sentence fragment selection based on the keyframes.

In another embodiment, the present invention provides a method for an improved eReader interface, comprising: receiving text and audio, wherein the text includes at least two language sets of text, and wherein the audio includes at least two language sets of audio; deriving keyframes for the audio via force alignment of the audio to the text, wherein the keyframes indicate beginning keyframes and ending keyframes for spoken words, spoken characters, spoken sentences, or spoken sentence fragments corresponding to words, characters, sentences, or sentence fragments of the text; receiving a selected language set of the at least two language sets of text; displaying text corresponding to the selected language set; providing highlighting preference options via the GUI, wherein the highlighting preference options include selections for word or character highlighting, sentence highlighting, and sentence fragment highlighting; receiving a selection of the highlighting preference options; highlighting the words, the characters, the sentences, or the sentence fragments of the text based on the selection of the highlighting preference options; playing the audio and synchronizing the playing with the highlighting, wherein the highlighting includes highlighting at least one word, at least one character, at least one sentence, or at least one sentence fragment of the text for a time according to the keyframes; wherein the highlighting and the playing occurs based on the selected language set of the at least two language sets of text and a corresponding language set of the at least two language sets of audio; receiving a word selection, a character selection, a sentence selection, or a sentence fragment selection; highlighting the words, the characters, the sentences, or the sentence fragments based on the word selection, the character selection, the sentence selection, or the sentence fragment selection; and playing audio corresponding to the word selection, the character selection, the sentence selection, or the sentence fragment selection based on the keyframes.

In yet another embodiment, the present invention provides a system for an improved eReader interface, comprising: text and audio, wherein the text includes at least one language set of text, and wherein the audio includes at least one language set of audio; a graphical user interface (GUI); and audial descriptors, including keyframes for the audio, wherein the keyframes indicate timings for spoken words, spoken characters, spoken sentences, or spoken sentence fragments corresponding to words, characters, sentences, or sentence fragments of the text; wherein the system is operable to highlight the words, the characters, the sentences, or the sentence fragments of the text based on a highlighting preference selection received via the GUI; wherein the system is further operable to playback the audio and synchronize the playback with the highlighting, wherein the system is operable to highlight at least one word, at least one character, at least one sentence, or at least one sentence fragment of the text for a time according to the keyframes; wherein the system is operable to display text corresponding to a selected language set of the at least one language set of text, and wherein the highlighting and the playback occurs based on the selected language set and a corresponding language set of the at least one language set of audio; wherein the system is further operable to receive a selection of a word, a character, a sentence, a sentence fragment, or a graphic via the GUI and, based on corresponding descriptors, playback audio corresponding to the sentence selection, the sentence fragment selection, or the graphic selection.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 3 is a schematic highlighting the audio clip creation, keyframing, tagging, and database storage aspects of the Text Transformation system.

FIG. 13C illustrates a further expanded embodiment of the usage data chart.

FIG. 20 illustrates an eBook display page with foreign language translation.

FIG. 25 illustrates forced alignment between text and audio according to one embodiment of the present invention.

Figures 28A, 28B, 28C, 28D:
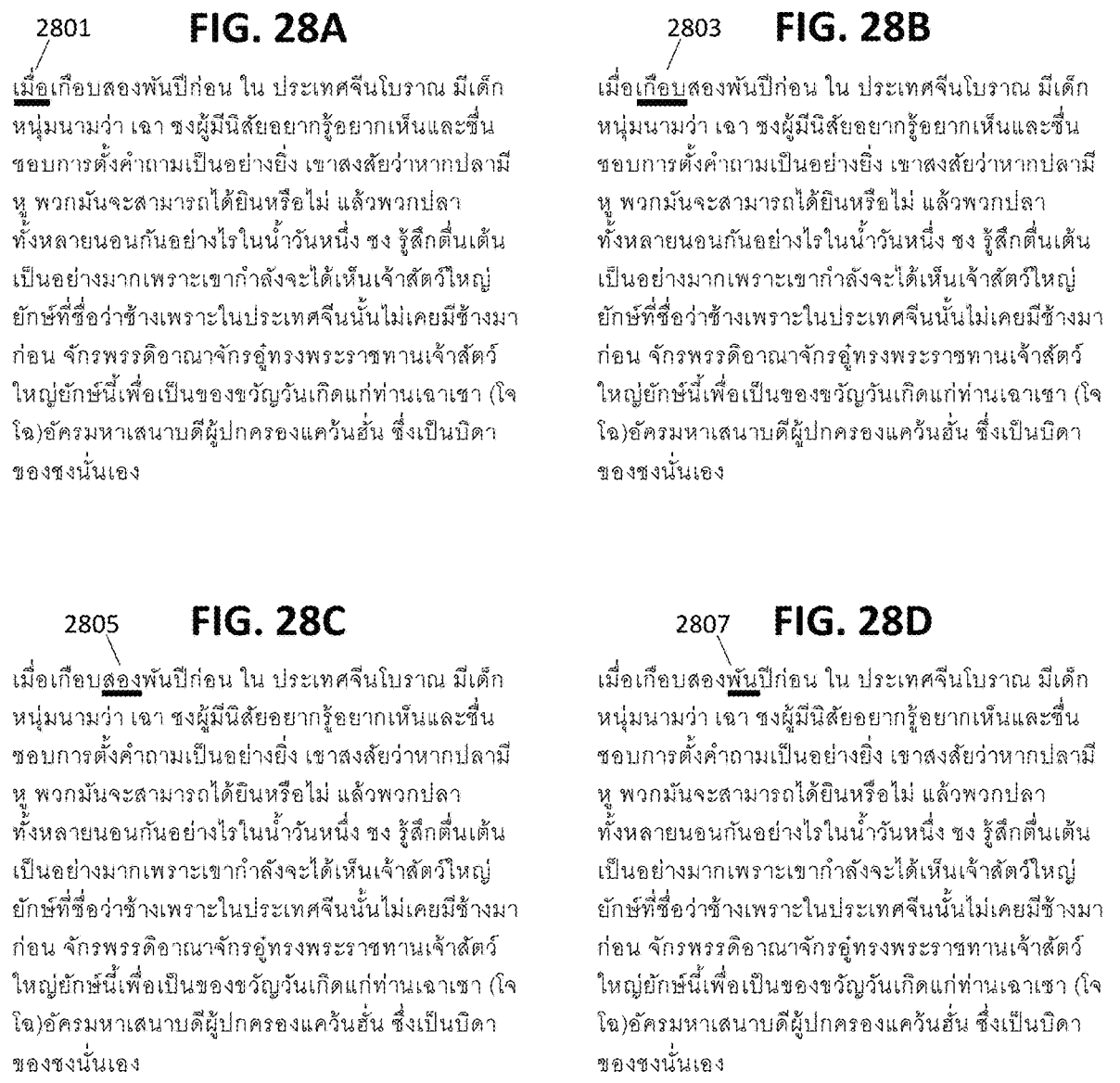

FIG. 28A illustrates a Thai text paragraph with a first highlighting element according to one embodiment of the present invention.

FIG. 28B illustrates a Thai text paragraph with a second highlighting element according to one embodiment of the present invention.

FIG. 28C illustrates a Thai text paragraph with a third highlighting element according to one embodiment of the present invention.

FIG. 28D illustrates a Thai text paragraph with a fourth highlighting element according to one embodiment of the present invention.

FIG. 30 illustrates an alternate language dynamic text container with highlighting according to one embodiment of the present invention.

FIG. 33 illustrates a chart with reading statistics according to one embodiment of the present invention.

FIG. 37A illustrates an asset list with no elements loaded according to one embodiment of the present invention.

DETAILED DESCRIPTION

Figure 1:
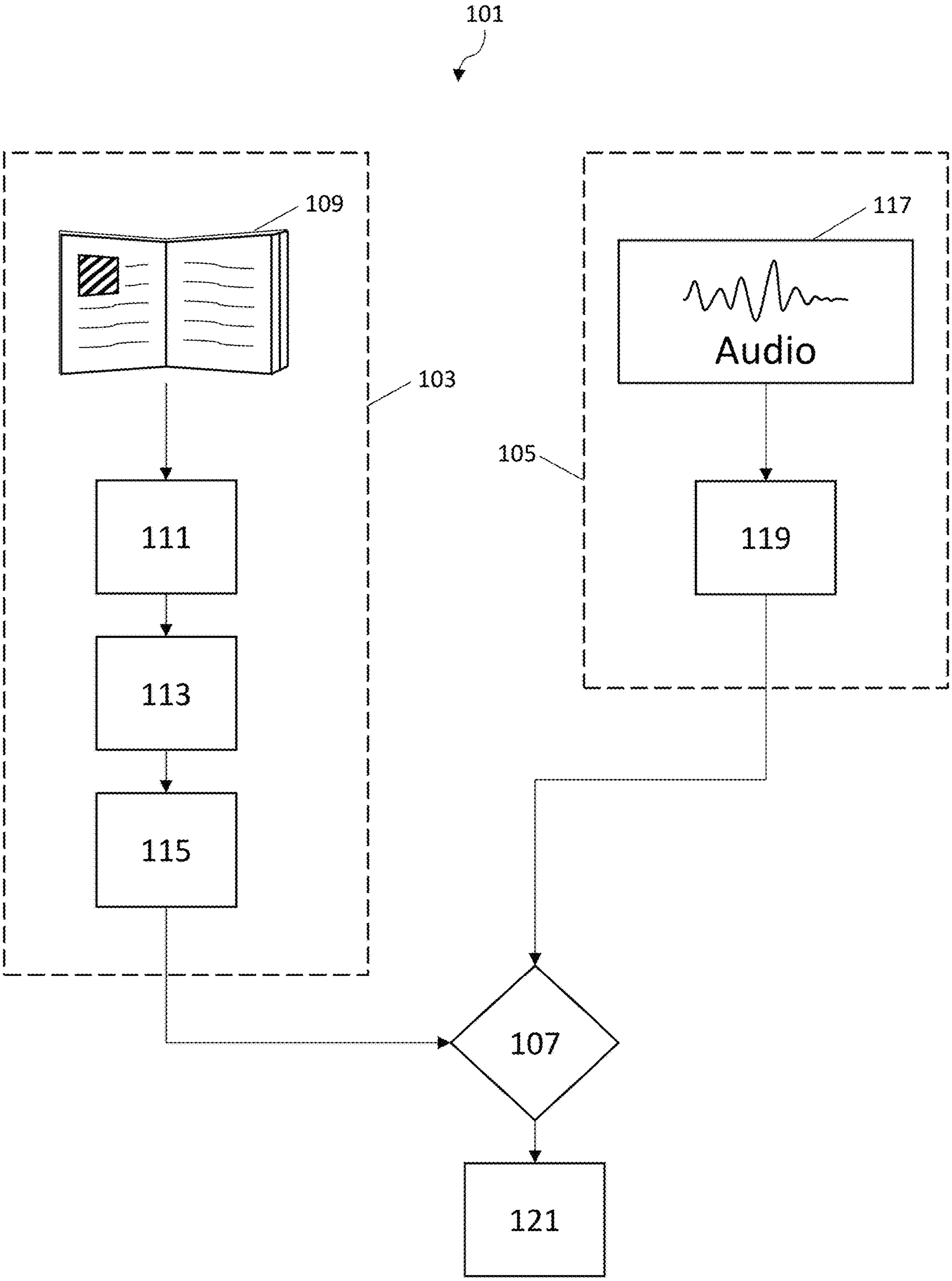
FIG. 1 is a flow diagram illustrating the Text Transformation System.

The present invention is generally directed to an eBook platform, generator, and eReader. The invention enables enhanced text and audio processing for interactive, multi-language, read-aloud eBooks through a Text Transformation System, an HTML Generator, and an improved graphical user interface (GUI) with highlighting, assisted reading, and read-aloud features. The systems and methods described herein provide a more interactive, cohesive eReader platform that combines literary, assisted reading, foreign language, math, and science tools and interfaces, resulting in a robust, effective, and cohesive teaching tool.

Advantageously, the present invention creates a new combination of text processing, audio synchronization, HTML generation, foreign language tools, markup and teaching tools, interactive illustrations, and embedded teaching tools that create an educational system unavailable in prior art.

In one embodiment, the present invention provides a system for an improved eReader interface, comprising: text and audio relating to a digital book, wherein the text includes at least two language sets of text, and wherein the audio includes at least two language sets of audio; a graphical user interface (GUI); and keyframes for the audio, wherein the keyframes are derived from force alignment of the audio to the text, and wherein the keyframes indicate beginning timestamps and ending timestamps for spoken words, spoken characters, spoken sentences, or spoken sentence fragments corresponding to words, characters, sentences, or sentence fragments of the text; wherein the system is operable to display text corresponding to a selected language set of the at least two language sets of text; wherein the system is operable to provide highlighting preference options via the GUI, wherein the highlighting preference options include selections for word highlighting, character highlighting, sentence highlighting, and sentence fragment highlighting; wherein the system is operable to highlight the words, the characters, the sentences, or the sentence fragments of the text based on a selection of the highlighting preference options received via the GUI; wherein the system is further operable to playback the audio and synchronize the playback with the highlighting, wherein the system is operable to highlight at least one word, at least one character, at least one sentence, or at least one sentence fragment of the text for a time according to the keyframes; wherein the highlighting and the playback occurs based on the selected language set and a corresponding language set of the at least two language sets of audio; wherein the system is further operable to highlight the words, the characters, the sentences, or the sentence fragments based on a word selection, a character selection, a sentence selection, or a sentence fragment selection; and wherein the system is further operable to playback audio corresponding to the word selection, the character selection, the sentence selection, or the sentence fragment selection based on the keyframes.

In another embodiment, the present invention provides a method for an improved eReader interface, comprising: receiving text and audio, wherein the text includes at least two language sets of text, and wherein the audio includes at least two language sets of audio; deriving keyframes for the audio via force alignment of the audio to the text, wherein the keyframes indicate beginning keyframes and ending keyframes for spoken words, spoken characters, spoken sentences, or spoken sentence fragments corresponding to words, characters, sentences, or sentence fragments of the text; receiving a selected language set of the at least two language sets of text; displaying text corresponding to the selected language set; providing highlighting preference options via the GUI, wherein the highlighting preference options include selections for word or character highlighting, sentence highlighting, and sentence fragment highlighting; receiving a selection of the highlighting preference options; highlighting the words, the characters, the sentences, or the sentence fragments of the text based on the selection of the highlighting preference options; playing the audio and synchronizing the playing with the highlighting, wherein the highlighting includes highlighting at least one word, at least one character, at least one sentence, or at least one sentence fragment of the text for a time according to the keyframes; wherein the highlighting and the playing occurs based on the selected language set of the at least two language sets of text and a corresponding language set of the at least two language sets of audio; receiving a word selection, a character selection, a sentence selection, or a sentence fragment selection; highlighting the words, the characters, the sentences, or the sentence fragments based on the word selection, the character selection, the sentence selection, or the sentence fragment selection; and playing audio corresponding to the word selection, the character selection, the sentence selection, or the sentence fragment selection based on the keyframes.

In yet another embodiment, the present invention provides a system for an improved eReader interface, comprising: text and audio, wherein the text includes at least one language set of text, and wherein the audio includes at least one language set of audio; a graphical user interface (GUI); and audial descriptors, including keyframes for the audio, wherein the keyframes indicate timings for spoken words, spoken characters, spoken sentences, or spoken sentence fragments corresponding to words, characters, sentences, or sentence fragments of the text; wherein the system is operable to highlight the words, the characters, the sentences, or the sentence fragments of the text based on a highlighting preference selection received via the GUI; wherein the system is further operable to playback the audio and synchronize the playback with the highlighting, wherein the system is operable to highlight at least one word, at least one character, at least one sentence, or at least one sentence fragment of the text for a time according to the keyframes; wherein the system is operable to display text corresponding to a selected language set of the at least one language set of text, and wherein the highlighting and the playback occurs based on the selected language set and a corresponding language set of the at least one language set of audio; wherein the system is further operable to receive a selection of a word, a character, a sentence, a sentence fragment, or a graphic via the GUI and, based on corresponding descriptors, playback audio corresponding to the sentence selection, the sentence fragment selection, or the graphic selection.

None of the prior art discloses the transformation of eBooks into an interactive text-and-audio driven assisted reading system with highlighting, read-aloud, speed control, gesture control, quick access to relevant teaching tools, and an improved graphical user interface (GUI). Furthermore, none of the prior art describes the Text Transformation System of the present invention, which transforms a book into an interactive eBook for use in the improved eReader. Both individually and in combination, the components of the present invention provide an educational platform that is unavailable in prior art.

Referring now to the drawings in general, the illustrations are for the purpose of describing one or more preferred embodiments of the invention and are not intended to limit the invention thereto.

FIG. 1 describes one embodiment of the Text Transformation System 101, wherein a textual system 103 is converted and synced with audio system 105. In the illustrated embodiment, an eBook 109 is scanned and converted into an image 111 for manipulation. The image 111 is created in one of many digital file formats available, including JPEG (Joint Photographic Experts Group), GIF (Graphics Interchange Format), TIFF (Tagged Image File Format), PNG (Portable Network Graphics), or any other format known in the art of digital imagery. The image 111 is then sent to an optical character recognition (OCR) engine 113, wherein words and punctuation are automatically or manually recognized and converted to digital characters. The characters are encoded using any version of ASCII (American Standard Code for Information Exchange), ISO (International Standards Organization), Unicode, or any other character encoding mechanism known in the art. Next, a processor 115 differentiates between the words and punctuation marks of the recognized text. In one embodiment, spaces between words are recognized and removed in order to separate word into individual entities. The processor 115 stores each of the words and punctuation marks separately in a server or database along with textual descriptors, including for each word or punctuation mark at least: a page number, word and character length, meaning, definition, translation, and related corresponding audio files.

Referring to the audio system 105, an audio file 117 is a recording of a human reading the text of the eBook 109 or a computer-generated text-to-speech (TTS) audio recording. A processing unit 119 then takes the audio file 117 and automatically or manually uses speech recognition to identify the timestamps of the audio file 117 that correspond to specific words and to apply keyframes at the beginning and ends of the words. Keyframes refer to timestamps corresponding to the beginning and end of words. In one embodiment, the processing unit 119 is operable to receive instructions from a computing device and/or application on the computing device, wherein a user manually marks the keyframes in the audio. These keyframes are then used as indicators to cut, segment, and/or indicate portions of the audio file 117 into smaller audio clips, and these audio clips are stored in a database with a plurality of audial descriptors, including: keyframes, page numbers, corresponding words, audial runtime of words, file sizes, corresponding audio files or text files, and/or related audio clips. In another embodiment, the processing unit is operable to cross-check the text recognition with the eBook 109. In a further embodiment, the un-clipped audio file 117 is stored in a database with the keyframes included in the descriptors. A synchronization engine 107 takes the elements from both the textual system 103 and the audial system 105 and creates synchronization data 121, which matches a specific audio clip to a specific audio word. In automatic embodiments of the present invention, analytics are used to find the change in volume, change in pitch, and other speech recognition tools to set keyframes to the beginning and end of words. In this instance, preferences are set before hand and modified afterwards to set the precise parameters for keyframing at specific times before or after a word is recognized.

Notably, audio clips are either separate audio files or, in another embodiment, the audio clips are a single file with associated metadata, descriptors, or other stored data that indicates segments of the audio files. For example, in one embodiment, a single audio file is stored for a page, paragraph, or book, wherein the single audio file is loaded for playback without the need for loading multiple files for a set of words.

Preferably, keyframes are set to be 0.07 seconds before the beginning of a spoken word in an audio file if the word begins a sentence. If the time between inter-sentence spoken words is less than 0.3 seconds, then a keyframe is placed at the time directly between the end of a first word and the start of a second. If, instead, the time between inter-sentence spoken words is greater than 0.3 seconds, then a keyframe is placed 0.07 seconds after the end of the first word and 0.07 seconds before the beginning of the second word. For example, if a sentence starts at 3:05:070, the keyframe is placed at 3:05:000. If a first inter-sentence word ends at 3:06:000 and a second inter-sentence word starts at 3:06: 100, a keyframe is placed at 3:06:050. If instead the first inter-sentence word ends at 3:06:000 and the second inter-sentence word ends at 3:06:370, one keyframe is placed at 3:06:070 to indicate the end of the first word and one keyframe is placed at 3:06:300 to indicate the start of the second word. Through this method, the end of a first word and the start of a second word are the same point for closely spaced spoken words. However, during highlighting, the dual keyframes that indicate 0.3 second or longer time between words is used to remove any highlighting while a punctuation mark, paragraph break, or other reading pause is included in an audio file or audio clip. Thus, the highlighting engine is operable to pause before playing a specific audio clip in coordination with certain punctuation marks and/or turn of the read-aloud feature or highlighting feature during this time. The parameters above indicate one embodiment of the keyframe preferences, and further embodiments, which have been deleted herein for the sake of conciseness, include variability in the thresholds of up to 0.1 seconds or any other variation apparent to one skilled in the art in marking the speech keyframes.

The keyframes that are a part of the audio clips or audio files are indications of a time point at which a new speech point of interest begins or ends. For example, if a word starts at timestamp 05:03:015 (minute 5, second 3, millisecond 15) and ends at timestamp 05:04:000, two keyframes are added to the file at each of the corresponding times. In one embodiment, these keyframes are stored in an audio file of a reading of a book. In this case, the file containing spoken word (or synthesized word) of the text is tagged with multiple keyframes indicating the beginning and end of every word, the beginning and end of every page of the book, and other indicators necessary to synchronize the audio to the textual elements. In another embodiment, the audio file is split into multiple, separate audio clips, each containing keyframes and descriptors necessary for synchronization.

The synchronization engine is thereby operable to pair the text and audio elements together in order to provide a linked visual and audial eBook. In contrast to prior art, where a focus is drawn to speech synthesis or text-to-speech, the present invention allows for audio files and audio clips to be matched to the text of the eBook with descriptors. Since playback generally occurs through a user playing a page of an eBook or selecting a specific word to be played, the descriptors ensure that each instance is possible within the system. The synchronization engine is operable to find similar descriptors in textual or audial elements and pair these two words together. For example, in one embodiment this occurs by matching a sequence of words in the database with the sequence of word descriptors within the audio file. Each word is then aggregated into a sequence that reflects the original order of the eBook text. For languages that require spaces between words, a space is automatically or manually added between the words during aggregation. Additionally, punctuation is inserted into the sequence. Since punctuation generally does not have an audio file associated with it, the words are able to be inserted into the sequence as part of a textual element itself such that the textual element comprises both the word and the punctuation mark. For languages that require a space following punctuation marks, a space is manually or automatically added after these characters as well. Similarly, foreign language characters that are not able to be processed by some machines or specific encodings, need to be converted to character entities for HTML, or are not matched with audio descriptors are operable to be inserted in the same way. In one embodiment, two sequences are aggregated, one with punctuation marks included and one without punctuation marks. This allows for more flexibility in searching, editing, and displaying an eBook.

In digital publishing, eBooks are created and distributed in a number of different file formats in order to assure that copying of any copyrighted material is protected against. For example, AMAZON releases many of its eBooks in a proprietary AZW or KFX file format that can only be read on KINDLE devices. Therefore, in order to effectively transform the eBook, the Text Transformation System is operable to scan a book into an image file for processing. In one embodiment, the eBook to be transformed is converted into an image file, from which the images are sent through an OCR system. The text output from the OCR system is then saved in an individual file in a database, and any illustrations or images are saved in a separate file in the database. In another embodiment, if possible with the file format of the eBook, the text is extracted and separated from the graphical elements of the eBook file, and the text is saved in an individual file separate from the graphical elements. During this step, the Text Transformation System is also operable to record the location and placement of text or a block of text on the eBook page or spread. The location is stored in digital coordinate points or geographic markers and are tied as descriptors to the text or descriptors with the image. When displaying the eBook through an eReader, the text is then repositioned into a similar placement as the original eBook text. This is accomplished in combination with a dynamic text container. Additionally, in this embodiment, text is deleted from the original eBook such that only the images or background graphics are saved in an image file.

Notably, the format of the book is not limited to traditional eBook formats, since the Text Transformation System is operable to receive a scan of a physical book in order to convert the physical book into an eBook for transformation.

Additionally, once the words and punctuation elements have been extracted by the OCR system, each element is stored in a database. The database is configured such that the words and punctuation preserve their original order from the source material. Either the words or punctuation are operable to be used as database keys for lookup and composition of the final textual elements. In one embodiment, the punctuation marks and foreign language characters are converted to character entities for electronic markup, stylesheet, or semi-structured programming. This is accomplished through the use of HTML character entities, Friendly Codes, Numerical Codes, Hex Codes, or any other method of encoding special characters. For example, the HTML character entity for left double quotation marks is "&ldquo".

Textual and audial descriptors tag the text or audio elements with detailed descriptions of both the preferred presentation of the elements as well as any details necessary for synchronization. In contrast to prior art, the inclusion of these descriptors allows for fast, efficient, and customizable presentation of eBook text and audio. While prior art embodiments have generally focused on reading whole passages or simply indexing an audio file for a word, the descriptors of the present invention allow for the eBook transformation process to link directly to foreign language elements, audio timestamps, word length, and other descriptors. This method and system result in a platform through which a more tailored learning environment is possible. A descriptor is comprised of: a page number, word and character length, meaning, occurrence, definition, translation, related or corresponding audio files, keyframes, page numbers, a corresponding word, time for speech synthesis or production, file sizes, related images or illustrations, corresponding audio files or text files, and/or related audio clips. Descriptors are generated by the Text Transformation System and are either embedded directly into the text, image, or audio files they represent or they are stored in a separate file which can be read by an eReader and the HTML Engine. In the instance with a separate file, the file is preferably written in a markup-language or as semi-structured data and is preferably a JSON (JAVASCRIPT OBJECT NOTATION) file and the HTML Engine is paired with a JSON parser, through which the HTML elements and/or descriptors are converted or compiled into a JSON file. The separate file further includes descriptors relating to the book as a whole, including a universal font, background images, related audio and image files, and other descriptors indicating the visual, audial, or interactive configuration of the eBook. This is a significant development over prior art, since the separation of the descriptors from the elements themselves allows for cross-device consistency in appearance and interactivity.

Figure 2:
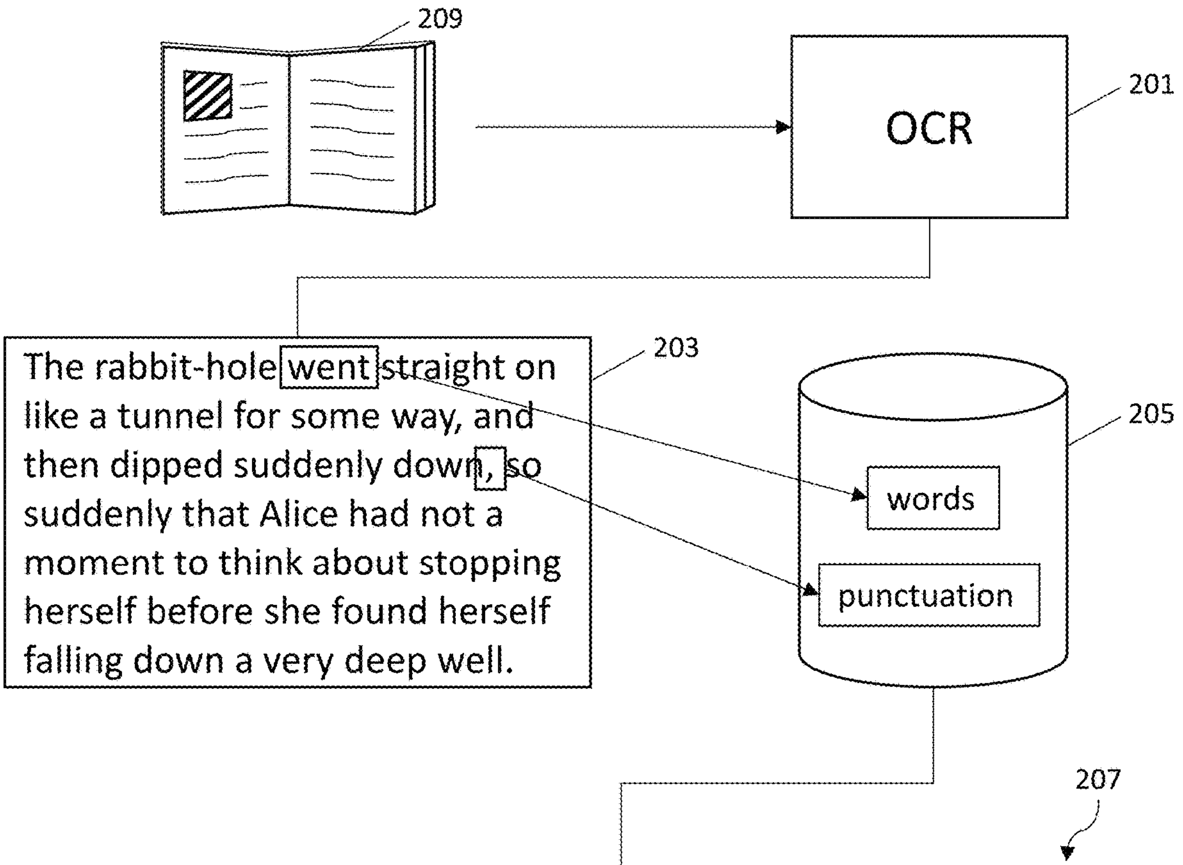
FIG. 2 is a schematic highlighting the OCR and database storage aspects of the Text Transformation System.

FIG. 2 illustrates one embodiment of the Text Transformation System, wherein the text from an eBook 209 is sent to an optical character recognition (OCR) engine 201 and the words and punctuation of image file of text 203 are stored into a database 205. Preferably, text is stored in the database 205 in such a way that each textual element is stored with descriptors, such as a page number, and is easily converted with an HTML engine. A table 207 indicates one embodiment of how a portion of text is stored in the database with its descriptors. The transposition of the text into both rows and columns assists in the synchronization process and in transferring the text between different functions of the system. Vertical columns allow for synchronization of words and characters to audial and textual descriptors as well as aggregation of the words and characters into separate markup tags.

As disclosed herein, databases include, in one embodiment, a local or cloud-based file system or a filesystem paired with a database, wherein the file system is a digital storage medium such that the storage medium includes a memory operable to store textual elements, audial elements, graphical elements, display elements, layout elements, descriptors, and/or any other stored element of the eBook and eReader system.

FIG. 3 illustrates one embodiment of the Text Transformation System, wherein an audio file 301 is spliced into individual segments for each word recognized. The waveform representation of the audio file is just one visual embodiment of the splicing. The splicing in additional embodiments occurs based on keyframes or time stamps instead of through a visual, waveform method. Each splice splits the audio file 301 into individual audio clips, wherein the audio clips include audial descriptors, including at least: a word, page number, start and end timestamps, a file indicator, and other descriptors necessary for synchronization or interactivity on the eBook. The audio clips are then input into a database 303 and stored with the audial descriptors. The table 305 indicates one embodiment of how these descriptors are stored with the audio clips.

Figure 4:
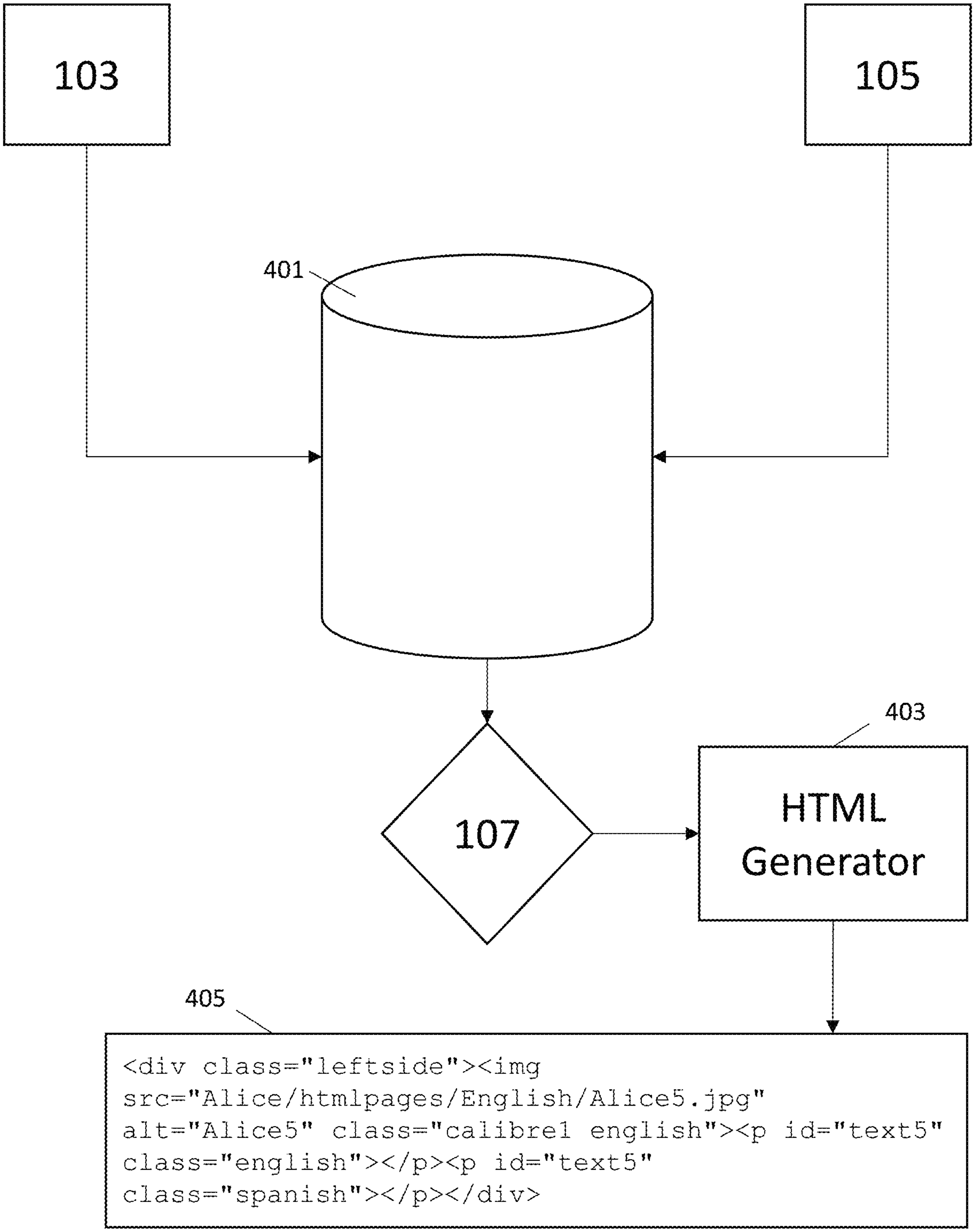
FIG. 4 is a schematic illustrating the Text Transformation System and HTML Generator.

FIG. 4 is a schematic detailing one embodiment of how the Text Transformation System interacts with the database 401, synchronization engine 107, and HTML Generator 403 in order to produce a text/audio output that is useable with an eReader. The textual system 103 and audial system 105 store both text, audio, and descriptors in the database 401, and a synchronization engine 107 synchronizes the corresponding words and audio together. For example, a word is matched with its corresponding spoken audio, and descriptors indicating the word length, audio clip length, page number, start and end times, and corresponding audio files are combined together into a single data type or data file. Collective, synchronized data is then output for use in eReader display and interactivity. In one embodiment, this data is synchronized through a spreadsheet program. In another embodiment, the data is output into a synchronization file for import into other systems. The HTML Generator 403 receives the data from the synchronization engine 107 and outputs HTML elements 405 to be embedded into an eReader or eBook. The HTML elements contain an indication of the textual and audial descriptors and indicates how a textual and audial item should be displayed, listened to, and interacted with. Notably, the HTML Generator 403 is customizable in order to change how a book is displayed, listened to and interacted with. For example, in one embodiment, the HTML Generator 403 is customized to display text with a certain font size or on a specific area of an eBook spread. In one embodiment, the HTML Generator 403 directly communicates with an eReader. In another embodiment, the HTML Generator 403 outputs to a server with memory and a database accessible by an eReader.

The HTML Generator is operable to transform the output of the synchronization engine into eReader-displayable content. While the generator is operable to output HTML, the engine is also operable to output other programming and markup languages, such as HTML-complimentary languages, Cascading Style Sheets (CSS), PHP: Hypertext Preprocessor (PHP), etc., as well as object-oriented languages, including JAVASCRIPT, PYTHON, and RUBY. The HTML Generator takes the paired elements from the synchronization engine and embeds the data into tags or coded language for display on an eReader. The generator is operable to take display elements from the descriptors, including the location of a word on a page, the page number, etc. and create an indication of how to display the information on a page. For example, in one embodiment, a word "Wonderland" with textual descriptors including, "page 20, word 3, wonderland3.mp3, pais de las Maravillas," is combined with surrounding words to produce HTML that displays the eBook element:

```
<div>
<a page="20" audio="wonderland1.mp3; wonderland2.mp3; wonderland3.mp3"
language="eng">Alice in Wonderland</a>
<a page="20" language="sp">Alicia en el país de las Maravillas</a>
</div>
```

In another embodiment, background images for eBooks are included in the following manner:

```
<div class="leftside">
<img src="Alice/htmlpages/English/Alice.jpg" alt="Alice" class="calibre1 english">
<img src="Alice/htmlpages/English/AliceES.jpg" alt="Alicia" class="calibre1 spanish">
</div>
```

In a still further embodiment, descriptors are included for each word in the following manner:

```
<par id="W32">
<text src="../page4.xhtml#W32"/>
<audio clipBegin="10.571001s" clipEnd="10.937001s" src="../audio/Alice_p4.m4a"/>
</par>
```

An eReader is then operable to display the output of the HTML generator in a dynamic text container. The HTML output optionally includes parameters dictating the size or appearance of the dynamic text container or its contents. For example, if descriptors input to the HTML generator include a font, point size, or location of text on a page, the generator is operable to output this information in a markup-specific format. An eReader then takes the programmed elements and displays them on the page according to the display parameters. If there are no display parameters included in the output, the eReader is further operable to display the text in a default location or use image processing to determine the location on the page where text overlaps the least amount of graphic elements.

In one embodiment, the appearance of the dynamic text container is dictated by CSS output from the HTML Generator. The CSS indicates the font size, font color, position of the dynamic text container relative to graphical or textual elements, and padding relative to other graphical or textual elements on the page or spread. A conversion engine is further operable to convert the output from the HTML generator for multiple devices. For example, in one embodiment, a JSON converter converts the location of the dynamic text container, the size, font, color, and other appearance elements of the dynamic text container into JSON equivalent elements such that the text is operable to be displayed on multiple devices and in multiple formats.

Figure 5:
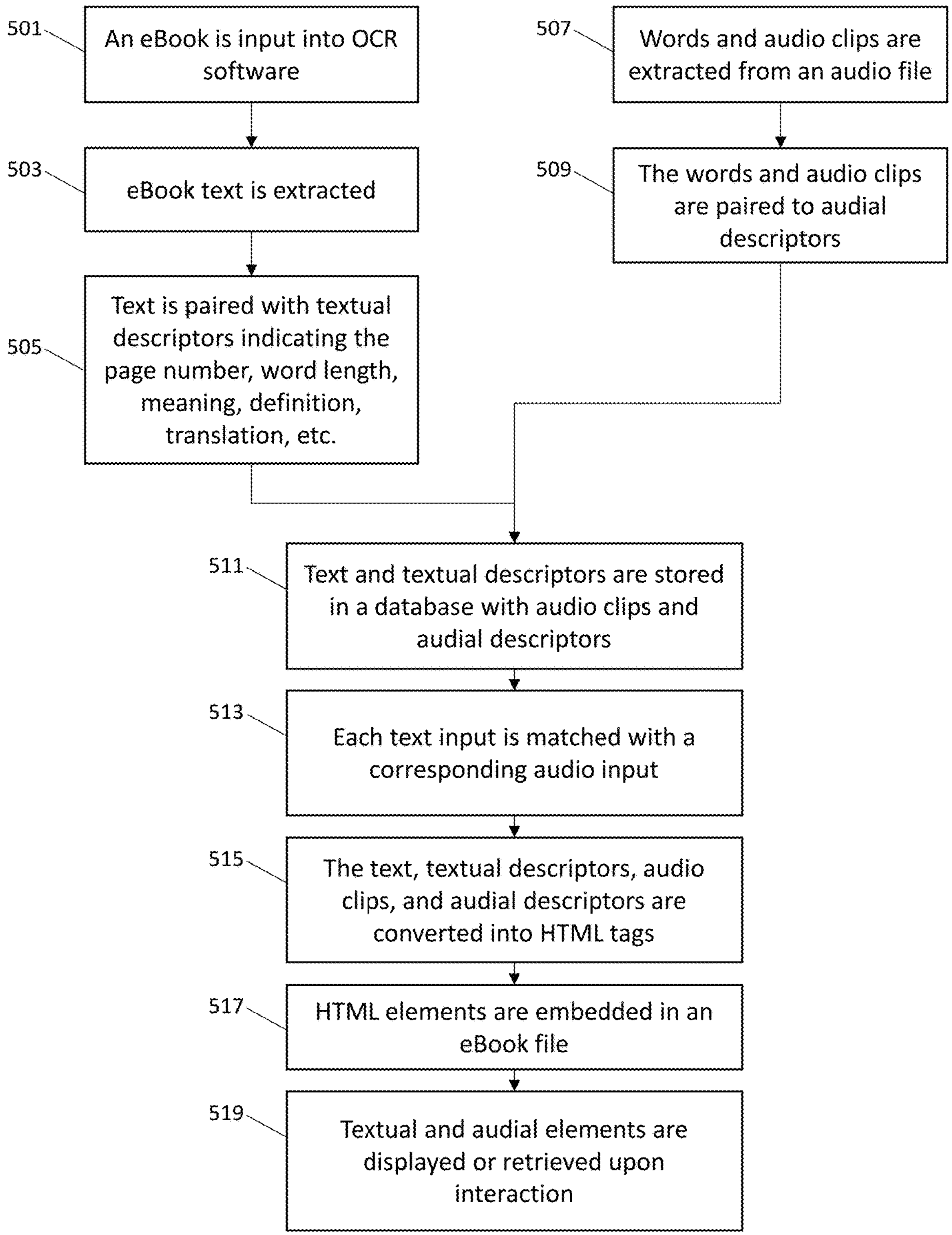
FIG. 5 is a flow chart illustrating one embodiment of the Text Transformation System and HTML Generator.

FIG. 5 is a flow chart illustrating one method of the Text Transformation System, wherein an eBook is input into OCR software 501, the eBook text is extracted 503, and the text is paired with textual descriptors 505. The eBook is one of any filetype known in the art for eBooks, including but not limited to ePub (Electronic Publishing), AZW, LIT (Literature), PDF (Portable Document Format), ODF (Open Document Format), MOBI (MOBIPOCKET), or JPEG or any graphic design filetype, including but not limited to AI (ADOBE ILLUSTRATOR), PSD (PHOTOSHOP Document), INDD (INDESIGN Document), IDML (INDESIGN Markup Language), or PMD (PAGEMAKER Document). The extraction 503 occurs through graphical means, such as scanning or capturing an image of the eBook, or through digital means, whereby the text is copied from the eBook. In one embodiment, a book is converted into an eBook before the text is extracted. In this embodiment, the book is scanned by a digital scanner, received by a computer, and thereby converted into an eBook. Audio is further synced to the text, wherein words and audio clips are extracted from an audio file 507, and the audial descriptors of the file are paired to the words and audio clips 509. Both the textual and the audial elements are then stored in a database with their corresponding descriptors 511. The textual elements are then matched to corresponding audial elements 513 and are converted to HTML based on the descriptors 515. In parallel embodiments, the audial elements are matched with the textual elements 513. HTML elements are then embedded in an eBook 517 and displayed or retrieved by an eReader 519. Users are then operable to interact with these elements according to the HTML elements.

In alternative embodiments, the HTML Engine is operable to compile the HTML elements into an eBook and convert a page or spread into an image file. The image file is then presented to the GUI instead of the HTML elements such that when a user is reading the eBook, the displayed text and images are in a compiled image format. In this instance, dynamic text containers and/or other interactive elements are operable to be embedded on top of the image in the GUI.

The output of the HTML engine is further operable to be placed within a database with any required audio, text, or image files and any supplemental data or descriptors. This information is categorized under a specific eBook title. The eReader is then operable to retrieve each transformed eBook from the database according to a user request. The database contains a list of all the titles available to an eReader as well as an indication of any highlighting, read-aloud, language options, or other features that are available in the transformed eBook.

Figure 6A:
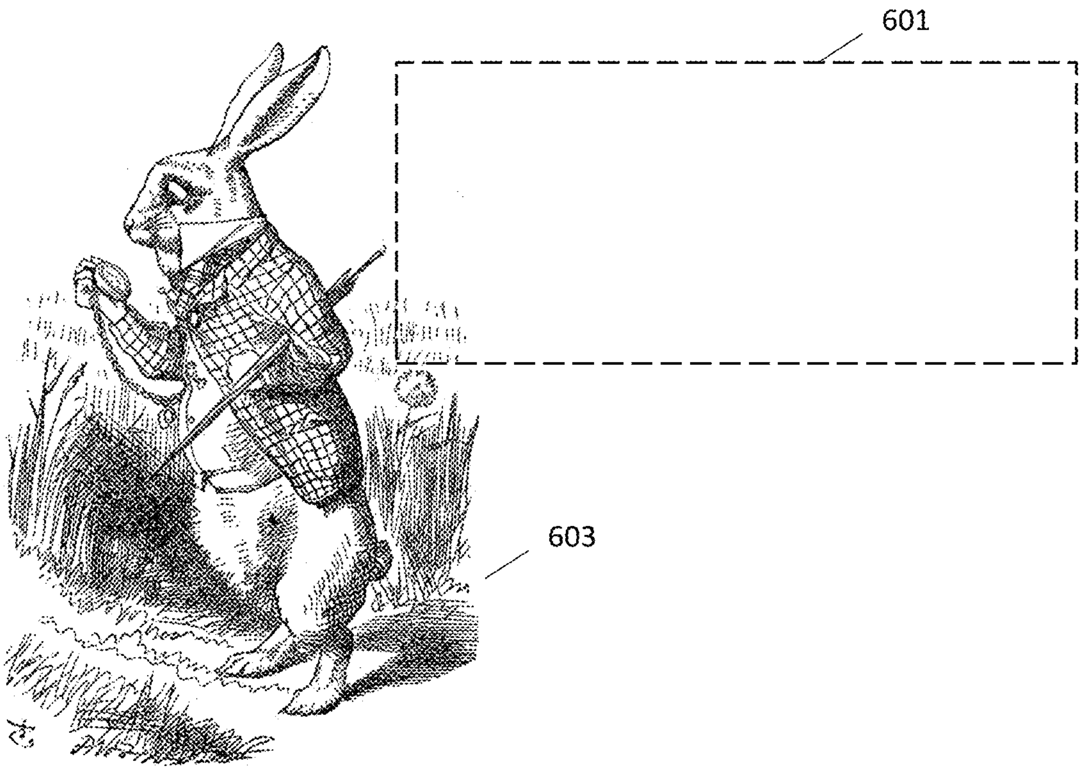
FIG. 6A illustrates one embodiment of the dynamic text container.

FIG. 6A-6D describe embodiments of the dynamic text container. In FIG. 6A, the dotted line represents the dynamic text container 601, which is operable to hold and display text for an eBook. In one embodiment, an HTML Generator outputs the dynamic text container programming elements, wherein the dynamic text container 601 is programmed to display in a specific location on a page. In another embodiment, the dynamic text container 601 matches the original location of the text element on a page before the Text Transformation System transformed the eBook text. The dynamic text container 601 is operable to overlay with a graphical element 603 and/or automatically "wrap" around a graphical element 603 or graphical object within the graphical element 603.

Figure 6B:
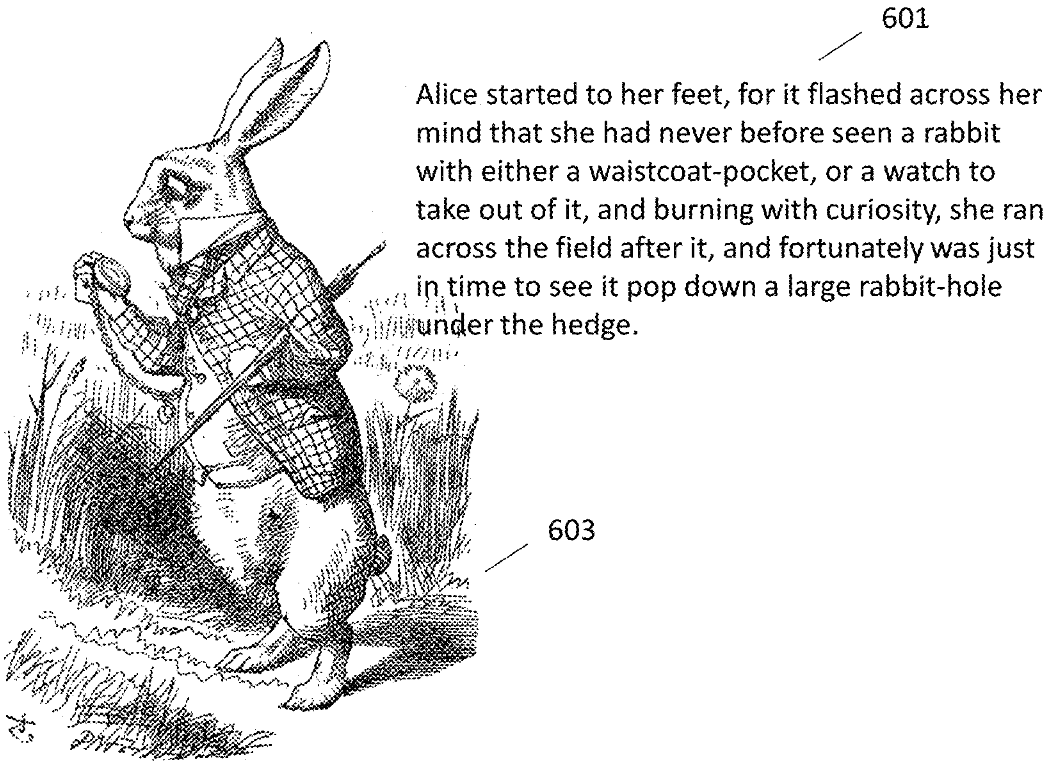
FIG. 6B illustrates another embodiment of the dynamic text container.

FIG. 6B shows one embodiment of the dynamic text container, wherein dynamic text container 601 is displaying text input by an external system or user.

Figure 6C:
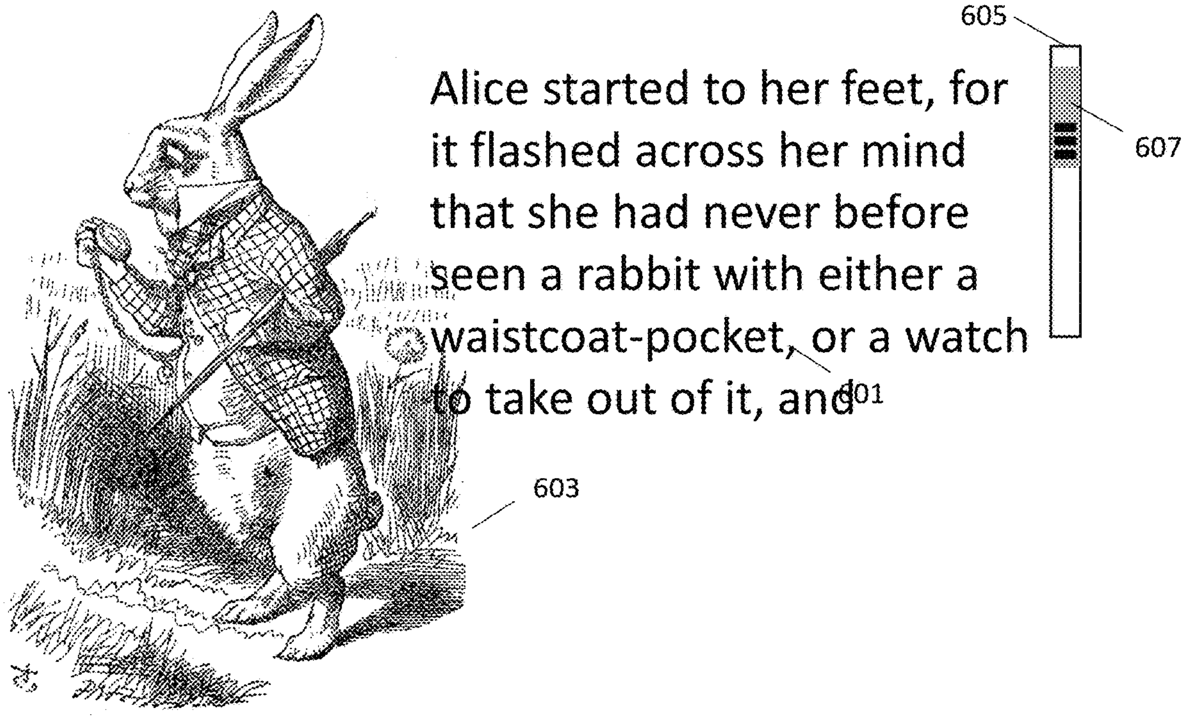
FIG. 6C illustrates another embodiment of the dynamic text container.
Figure 6D:
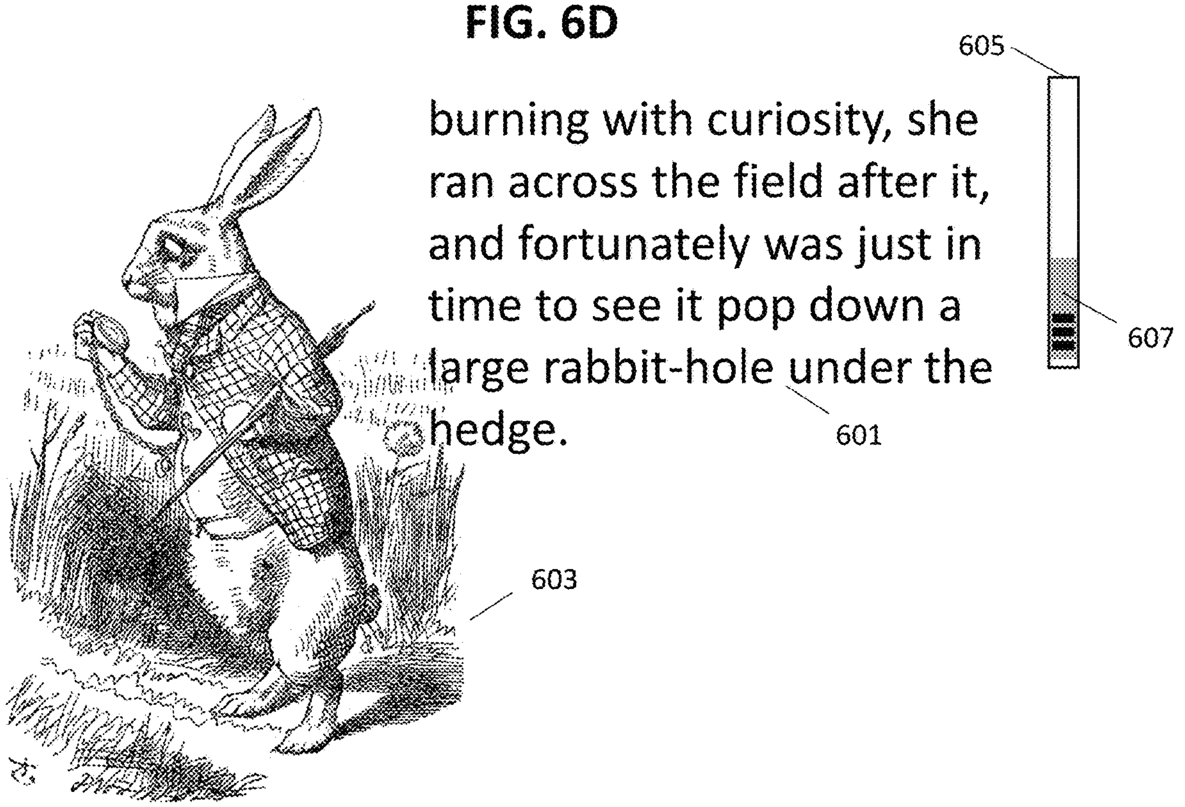
FIG. 6D illustrates another embodiment of the dynamic text container.

FIG. 6C describes one embodiment of a dynamic font feature of the dynamic text container 601. Since many picture books or other graphical publications have images that cannot be moved or rearranged to account for text manipulation (e.g. for differing screen resolutions, user preferences, etc.), a problem is created for those who need a large-print or east-to-read font. A large font or a non-standard typeface may hinder the presentation of the eBook through overlapping with pictures, changing the aesthetics of the book, or resulting in additional pages. Non-standard typeface consists of any typeface that differs from the typeface used in the original book and hinders readability. Advantageously, the present invention allows for the dynamic text container 601 to keep the original formatting intended by the eBook author. When text that is large or non-standard is input into the dynamic text container 601, a scrollbar 605 appears, wherein a slider 607 is operable to scroll the text. As the slider 607 is moved downwards, the dynamic text container 601 moves text upwards, hiding the text as it passes the edge of the dynamic text container 601. In another embodiment, scrollbars for the GUI as a whole control a scrolling of the text in the dynamic text container and/or a full spread of the eReader display. Simultaneously, as text is moved upwards, text that was previously hidden is displayed from the bottom of the dynamic text container 601. FIG. 6D details the same text of 6C with the slider 607 moved to show the additional, hidden text. In this way, the design of the eBook is kept as close to original book as possible, and users that need a large or non-standard font are advantaged by this technology. Other embodiments of this feature also include scroll buttons, gesture-controlled dynamic text containers, and/or automatically appearing and disappearing text.

In one embodiment, the dynamic text container includes an anchor point, which indicates where the text container is placed on the eBook page. The anchor point references a specific place on the page of the eBook (such as a pixel location, measurement from the edge of the eBook, or location relative to a graphical element) to render the dynamic text container. The dynamic text container is operable to receive the anchor point from the HTML Generator in an encoded element and/or from descriptors. In one embodiment, an anchor point in an encoded element indicates that the top-right corner of the dynamic text container of page 4 is to be positioned at Cartesian pixel coordinate (x, y)=(500, 500). Notably, the anchor point is operable to be encoded on a relative scale such that when the size of the eBook display changes to be larger or smaller, the dynamic text container keeps the desired location on the page. In preferable embodiments, the positioning and size elements of the dynamic text container are embedded within CSS files that are output by the HTML Generator.

If a specific font is encoded into the generator output, including point size or typeface, the dynamic text container is operable to display this text according to the descriptors. However, if the text does not fit into the dynamic text containers due to the font size or typeface, a scrollbar or other interactive feature appears to allow for overflow text to be read by the user. In one embodiment, the dynamic text container parameters are defined by programming elements from the HTML generator. In another embodiment, the parameters are set by an external entity, wherein the eBook itself contains an embedded textbox or display parameters for the dynamic text container.

In one embodiment, the dynamic text container displays a scrollbar for scrolling through overflow text. Based on a user's interaction through a human-machine interface (HMI), the HMI moves the scrollbar in the direction of the user's input in order to display hidden or overflow text. In other embodiments, the display of hidden text is accomplished through "paging" through text. For example, this is accomplished by providing buttons on or near the dynamic text container displaying a first block of text such that when the HMI interacts with the button, a second block of text is displayed with the remaining words, punctuation, and other textual elements not displayed in the first block of text.

The HMI is any human-machine interface known in the art, including a mouse, touchscreen, touchpad, trackpad, joystick, and stylus. The eReader is operable to allow any user to directly interact with the graphical user interface (GUI) in order to perform the functions of the present invention. In interacting with the HMI, the user is able to control and use the eReader GUI.

The GUI includes developments to eReader technology that significantly improve and transform previous user interfaces from simply a tool for viewing a digital book into a platform that provides interactive features and display elements that result in a new experience that is markedly different from simply reading a book or eBook. Prior art describes instances of graphical interfaces that present a digital form of a book, such as a scan or reformatting of the textual elements. In contrast, the present invention provides a combination of interactive features that allow a user to control and interact with multiple aspects of the eBook in order to improve the educational value of the eBook. For example, the highlighting aspect of the book directly allows users to select, read, and hear a word from the page. In learning environments, a user who is learning a foreign language, such as Spanish, is able to click on a Spanish word in a picture book, see the word highlighted, and hear how the word sounds. The direct interaction with and efficient reproduction of this word results in a learning environment that is advantageous over prior art. This feature, as well as the combination of speed control elements, dynamic text containers, and supplemental teaching tool connections constitute a platform that has hitherto been unavailable.

Font size transformation is also possible through the GUI, wherein the GUI is operable to display a control element, such as a slider, button, or input box, through which a user controls the font size of the displayed text. For example, in the case of a slider, the user moves a "slider" of the GUI on a scale. As the slider is moved along a set path, the size of the text increases. In another embodiment, the user selects a font size from a drop-down or pop-up menu that lists point-sizes. In yet another embodiment, font size is changed via a user gesture on a touch screen, such as clicking or double clicking via single finger action or pinch and/or spread via double finger action. Upon selection, the GUI updates the text displayed to be the selected size. Descriptors are able to provide a default font size or the GUI is able to have a set, default font size within the system. Transformation of the text to a different font size occurs instantaneously, such that when a user interacts with the GUI to change the font size, it updates automatically for the user to see.

Figure 7A:
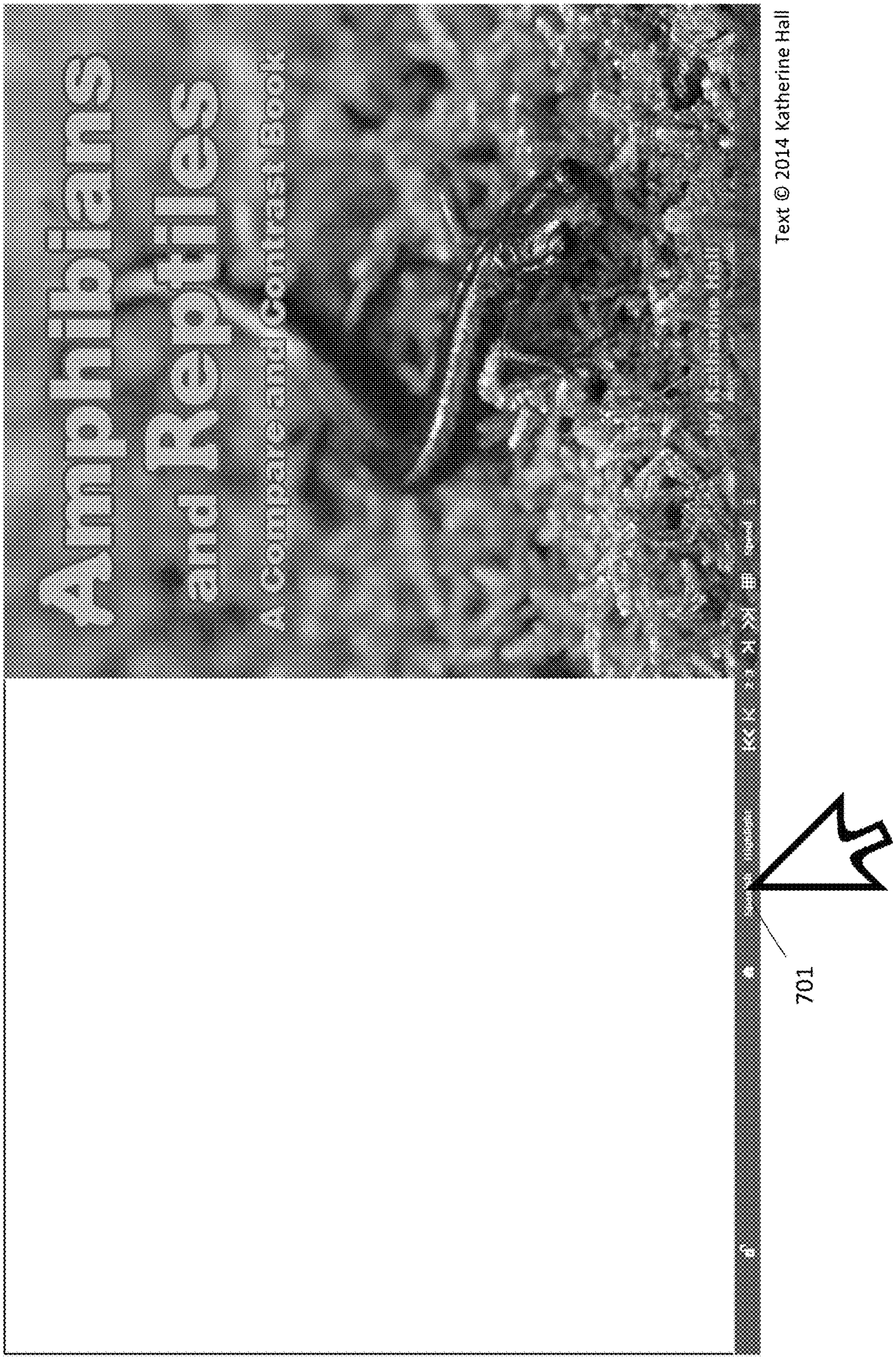
FIG. 7A illustrates one embodiment of the foreign language GUI.
Figure 7B:
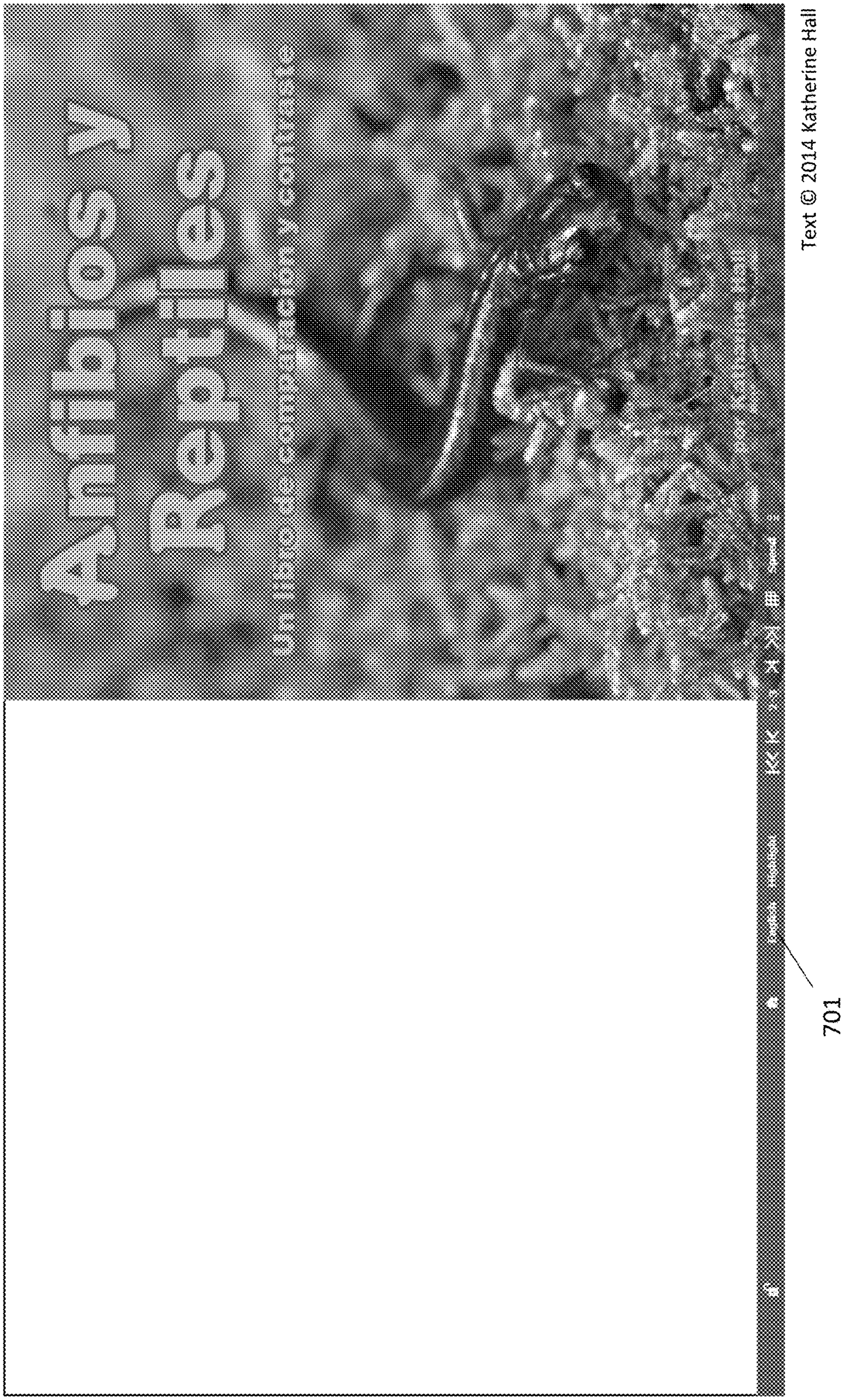
FIG. 7B illustrates another embodiment of the foreign language GUI.

FIGS. 7A and 7B are directed towards an improved eReader graphical user interface (GUI), wherein upon interaction with a language button, a system is operable to change the text within a dynamic textbox to equivalent foreign language text. Additionally, upon interaction with a language button, the system is operable to change illustrations or other graphical components of the eBook spread to match the foreign language text (for example, to change a stylized title on a title page). FIG. 7A illustrates a Spanish translation button 701, that when clicked transforms the text of the eBook from English to Spanish. FIG. 7B illustrates the transformed eBook text. In further embodiments, the button is replaced with a slider, a language preference menu, or any other selection method known in the art of graphical user interfaces. For eBooks with multiple languages, for example an eBook that has English, Spanish, and Chinese languages, the language is selected through one of the previously described methods, including a button that rotates through the languages, a menu from which a user can select a language, or a slider that is operable to be dragged to a language indicator. Other similar selection methods will be apparent to one skilled in the art.

The GUI is additionally operable to modify the language of the eBook based on an input from a user through the HMI. In one embodiment, this is made possible through a virtual button on the bottom of the eReader, wherein when the user selects the button, the eReader loads the foreign language elements of the eBook based on descriptors from either the HTML Generator or the database. For example, when a user clicks a button 701 labeled "Spanish," as in FIG. 7A, the English text and images are replaced with text and images tagged with Spanish descriptors. The transition from 7A to 7B is an example of the images changing based on a Spanish descriptor, and the transition from 8A to 8B is an example of the text changing based on Spanish descriptors.

Additional embodiments of the foreign language switch occur through the user inputting preferences into a server with memory and a database, such that when the eReader is initialized, it loads a language the user has set to be a preferred language. While reading a book, the GUI displays one of many options for a user to choose or change the eBook language displayed. This occurs through at least one graphical option including: a slider, a button, a switch, a drop-down menu, or a radio selector. In one embodiment, the eReader is operable to query and receive an indication of the preferred language of device on which the eReader is being accessed. For example, if the eReader is being accessed through a web browser, the eReader reads the user-agent string of the web browser to determine the preferred language. If, instead, the eReader is accessed through an application, the application is able to request from the device running the application a preferred system language.

Figure 8A:
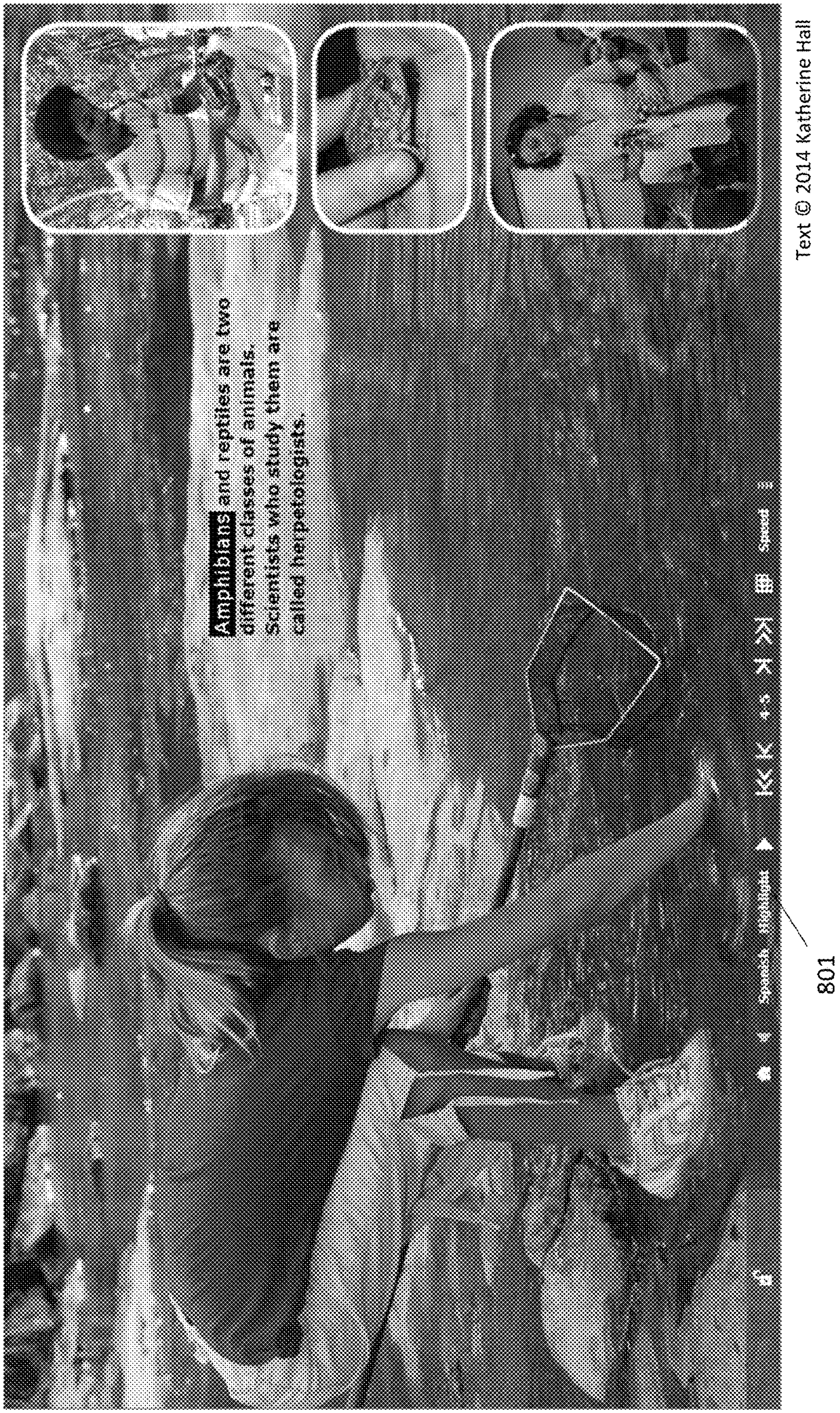
FIG. 8A illustrates the highlighting feature of the GUI in English.

FIG. 8A is one embodiment of the highlighting feature of the GUI. The text of the eBook illustrates a highlighted word as part of the read-aloud system. A user who clicks a button 801 activates the highlighting feature that provides assisted reading through synchronized highlighting and audio speed control. As a book is read aloud by the system, the eReader highlights the specific word being read. For example, the word "Amphibians" is highlighted in FIG. 8A, indicating that the word "Amphibians" is currently being read aloud. The highlight system reads and imports the descriptors paired with each word in the eBook to determine the correct word to highlight corresponding to the word being read aloud. In one embodiment, the highlighting feature is operable to play a specific audio file or audio clip at the same time as highlighting a word. The feature is operable to be turned on and off with the click of a button or other digital control method.

The highlighting feature of the eReader is further operable to connect to the descriptors of words such that when an audio file is being played or a word is selected, the highlighting selects the correct word. In the audio file embodiment, a user selects a "play" button on the GUI. Instantly, the eReader begins to read the text of the eBook aloud. As each word is read, the highlighting engine reads the descriptors from the coded elements or the database and determines the correct time and characters to highlight based on the character length, time stamp, or other elements included in the descriptors. For example, if the word being played is "Alice" and the descriptors include the audio file "alice1.mp3" and keyframe "03:01:00" the highlighting engine begins playing the file "alice1.mp3" and highlighting the word "Alice" at time "03:01:00." Highlighting ceases if there is a stop keyframe or the audio file reaches the keyframe of the next word. Additionally, a descriptor indicating a specific occurrence of a repeated word to highlight allows the system to highlight and/or play the correct audio file or audio clip through indexing a word and occurrence instead of an identification number or other included descriptor.

In one embodiment, the highlighting engine is operable to highlight without text being present. In this instance, text is either set to display transparently over a graphical element, such that the highlighting occurs without any textual elements being displayed, or highlighting is displayed according to a specific location on the book. Therefore, text that is embedded within a graphical element is highlighted without the need for additional textual elements to be displayed on top of the graphical text. This highlighting is embedded within a dynamic text container and/or embedded within the descriptors of the words or graphical elements themselves. In one embodiment, a dynamic text container contains text but does not display the text. Instead, it is positioned over text embedded within the graphic and highlighting is applied to the location of the textual elements such that the highlighting occurs without displaying text within the dynamic text container.

In two different embodiments, the GUI offers two different methods of reading the book aloud. One embodiment includes a button that starts playback of the read-aloud feature for the entire book. Playback then continues until the end of the page, turns the page with an animation, and then continues playback of the next page. This process repeats until the end of the book or until the GUI receives an indication to stop play, at which point the GUI sends a command to the read-aloud feature to stop or pause the audio. In the second embodiment, a second button allows for playback of the open page or spread. When interacted with through the GUI, the read-aloud feature loads and plays the audio corresponding to the specific page displayed. When playback for that page is completed, the same page or spread remains displayed for further interaction or re-reading.

Additionally, when a user selects a word through an HMI input, the eReader activates the highlighting feature, highlights the selected word, reads the descriptors of the selected word, and plays a corresponding section of the audio file or audio clip. For example, if the full narration is stored in a single file, the highlighting feature loads the single file and begins playing the file at the timestamp indicated in the word descriptor. If, instead, each word is contained in an audio clip, the highlighting feature loads the audio clip of the selected word and plays the file from the beginning.

Alternatively, each syllable of a word is highlighted as it is read aloud. In one embodiment, the entire word being read aloud is highlighted, with each syllable of the word being highlighted with a different color or otherwise emphasized, such as by changes to the font (e.g. bolding, italicizing, underlining, etc.) as it is read aloud.

Figure 8B:
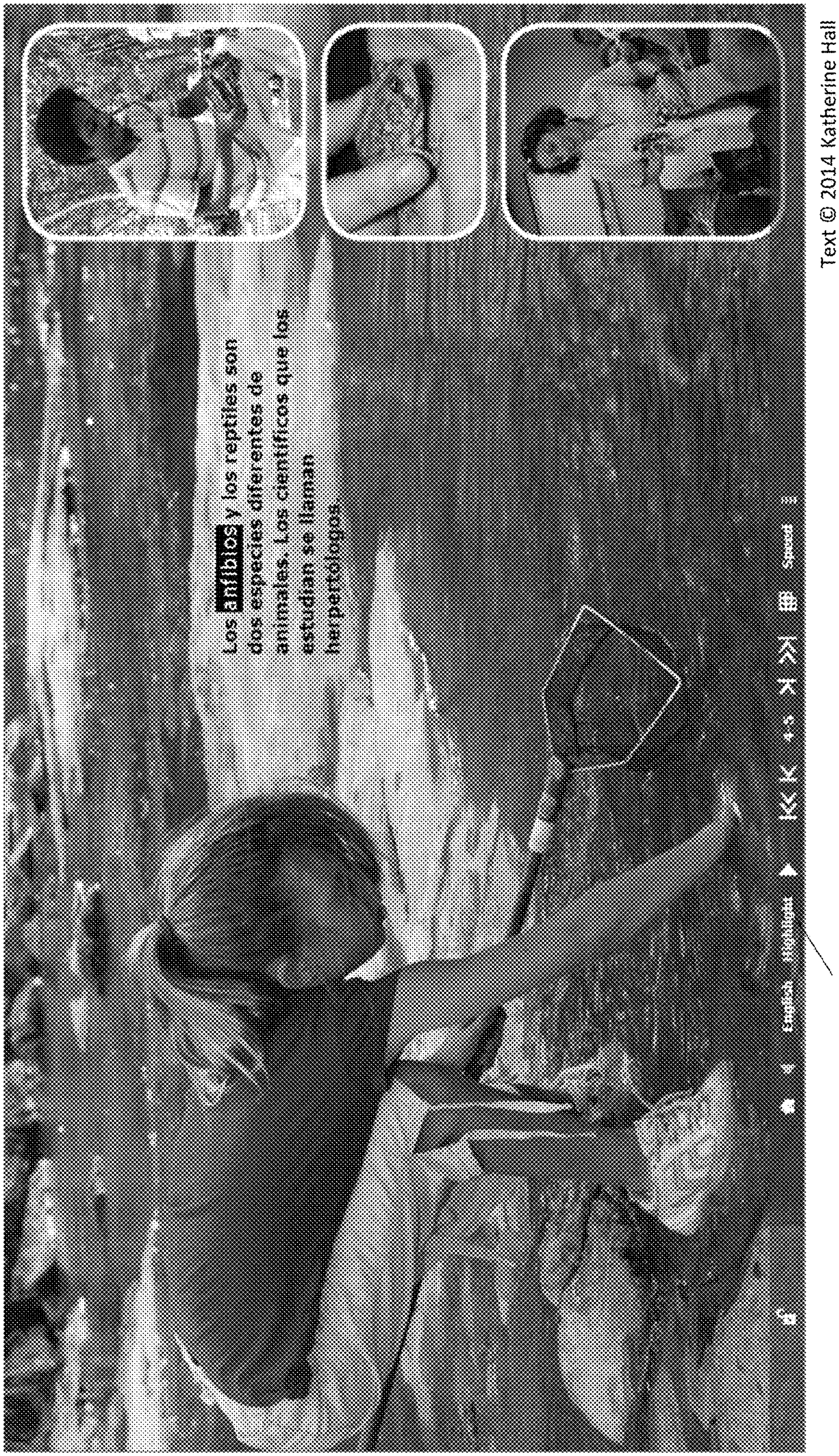
FIG. 8B illustrates the highlighting feature of the GUI in Spanish.

FIG. 8B is a Spanish language embodiment of the highlighting feature of 8A. The foreign language descriptors of each word or the foreign language words and their descriptors are used to play the correct audio clip or audio file at the same instance as the highlighting occurs.

Figure 8C:
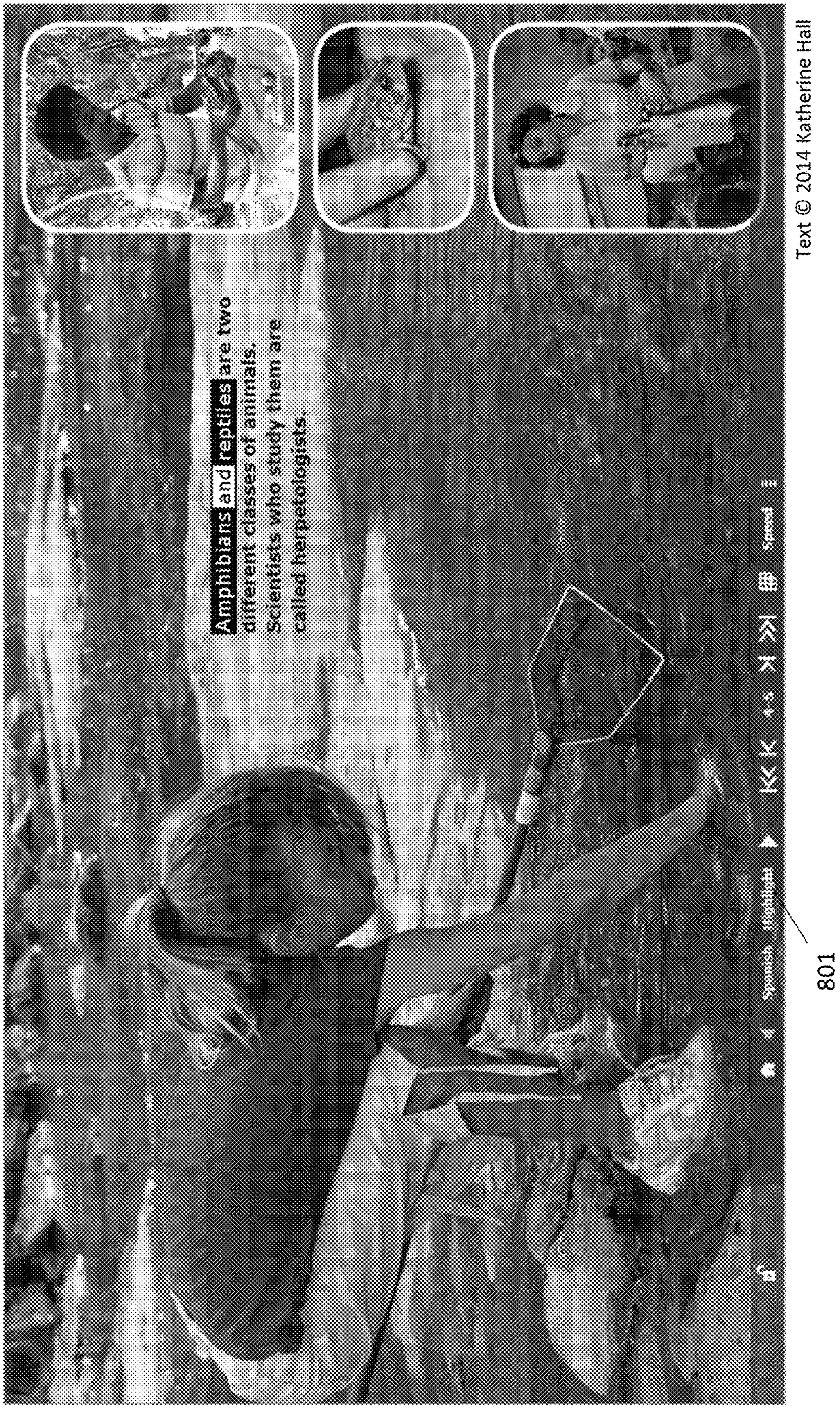
FIG. 8C illustrates one embodiment of highlighting feature of the GUI with multi-word highlighting.
Figure 8D:
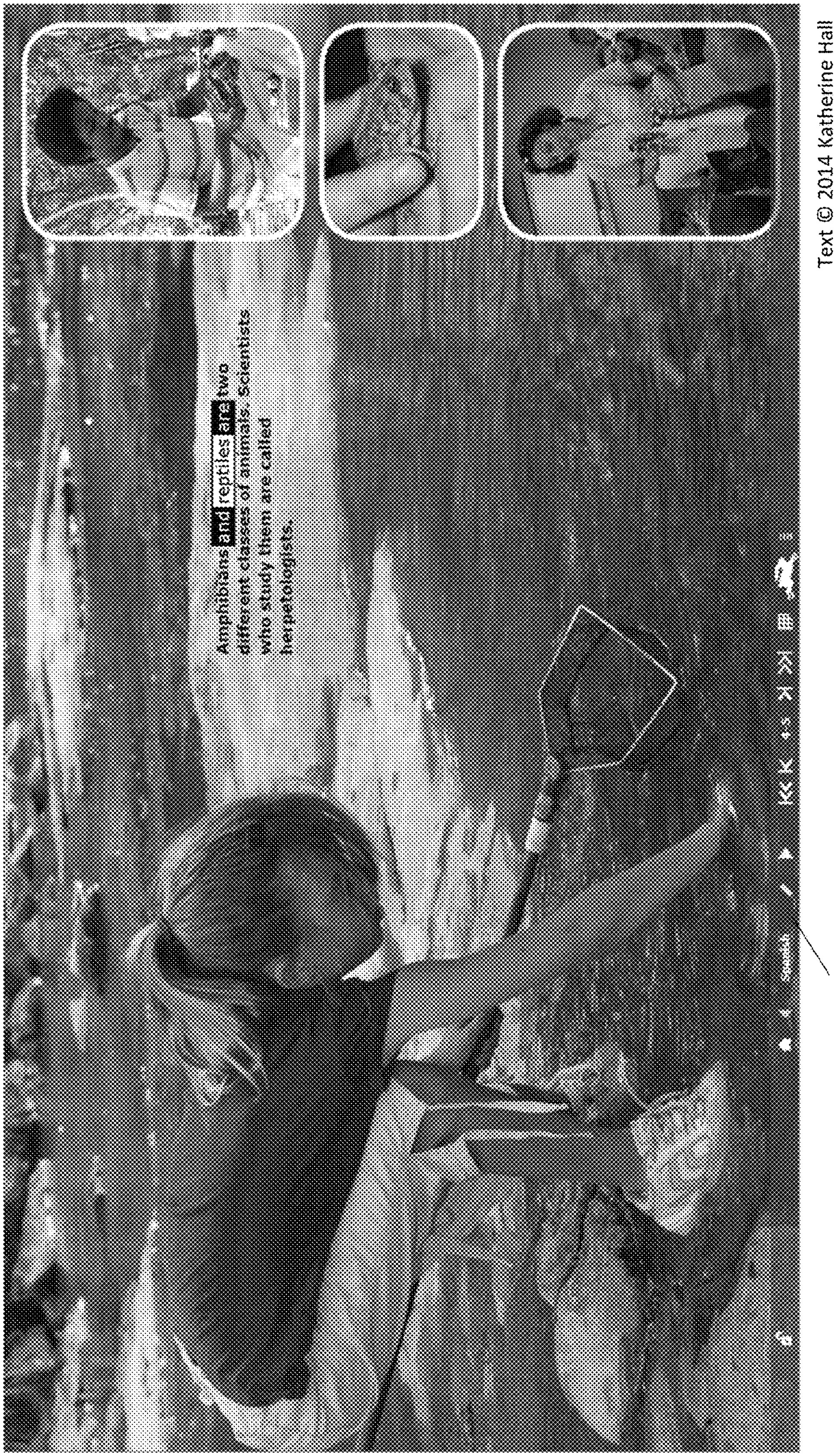
FIG. 8D illustrates another embodiment of the highlighting feature of the GUI with multi-word highlighting.

The highlighting engine is also operable to apply highlighting to a group or series of words instead of a single word or syllable. FIG. 8C illustrates one embodiment, wherein the highlighting engine is set to highlight one word before and one word after the word being read. The word read aloud is "and," while "Amphibians and reptiles" is highlighted. In FIG. 8C, the word read aloud, "and," is highlighted in a different manner (a different color) than the other words that are highlighted, though in alternative embodiments, the highlighting is uniform between words. The number of words highlighted before or after a word is set through a user preference, a descriptor in the eBook, a descriptor in the page or spread, and/or a default value for the eReader. In one embodiment, the highlighting engine continues to highlight the specified number of words before or after a word as the read-aloud feature reads each word of the eBook. For example, as illustrated in FIG. 8D, as the read-aloud feature continues reading the paragraph from 8C, the next word, "reptiles," is highlighted along with surrounding words "and" and "are." In another embodiment, groups of words are highlighted at a time, such as a sentence or a line. For example, in one instance, the first sentence of the same paragraph is highlighted in full: "Amphibians and reptiles are two different classes of animals." Once the entire sentence has been read, the next sentence is highlighted: "Scientists who study them are called herpetologists." Sentences, clauses, or phrases are highlighted based on the punctuation in the sentence, such as words between periods, words between a period and a comma, or words between two punctuation marks including the punctuation marks. In a further embodiment, a line of text is highlighted at a time, including the words and punctuation marks between one line break and a second line break. In yet another embodiment, a full paragraph is highlighted.

Notably, the highlighting format is not limited to the embodiments illustrated in the figures. Highlighting changes the properties of the appearance of a section of highlighted text through modifying or adding at least one of: a background color, a text color, a font size, symbols around or near the section, a graphic around the section, movement, italics, bold, and/or underlining. Furthermore, highlighting a word should be understood by one skilled in the art to extend to characters and symbols of languages that do not use the Roman or Latin alphabet, e.g., Chinese characters, wherein a character or symbol is highlighted as opposed to a word.

Additionally, a title database is operable to hold a list of books titles, stored location, identification numbers, International Standard Book Number (ISBN), page numbers, number of pages audio available, available languages, available interactive elements, font information, purchase history, and an indication of availability. The database is updated based on a user's purchase history, publisher availability, and/or eBooks owned by a user.

The eReader is further operable to receive an input as to which eBook to load. Upon receiving the input, the eReader queries the title database and retrieves the requested title. The eReader then loads the eBook from the HTML Generator or the stored location of the HTML Generator output and displays the graphical elements of the eBook based on the embedded descriptors. In one embodiment this is done locally, wherein each eBook with the output from the HTML Generator is stored on a user device accessing the eReader. In another embodiment, this data is loaded from the cloud. In the cloud-based embodiment, the eReader is loaded through an internet-capable device. The eReader then queries a server in order to retrieve eBook elements and displays these elements in the eReader. The server is operable to receive the query, match the eBook requested in the query to a title database, and download the eBook to the eReader. In one embodiment, the eBook is temporarily stored in temporary caches of the device and is not permanently stored. In another, the book is stored in the permanent storage of the device and is available for offline reading of the eBook. In the offline instance, the eBook and any additional resources, including to interactive elements, related media, or teaching resources, are downloaded along with the eBook to the device.

Figure 9:
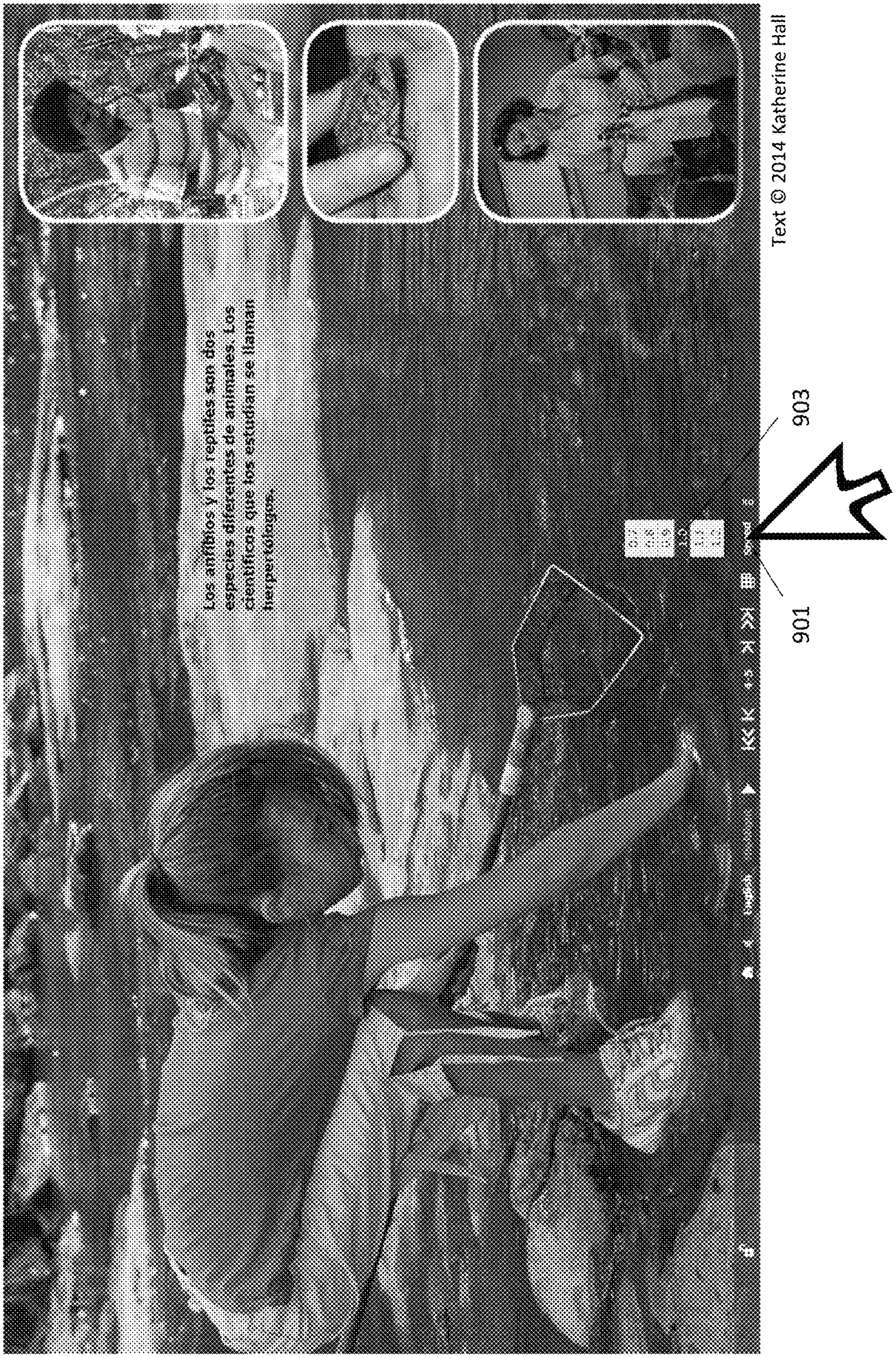
FIG. 9 illustrates the speed adjustment feature of the read-aloud system of the eReader.

FIG. 9 is one embodiment of the speed selection GUI. The GUI is operable to have a selection menu on the eReader that allows for a selection of the playback speed of the audio. The selection menu is operable to, when selected by a user, modify the playback setting of the read aloud system and/or use a mathematical multiplier on the timestamps or other audial descriptors in order to change the output speed of the read aloud system.

The read-aloud feature is operable to be engaged with or without highlighting. The read-aloud feature, when activated through the eReader, begins to play a specific audio file or audio clip based on the descriptors of the eBook. For example, if the elements of the page include descriptors for "page 5," the read-aloud system would retrieve the audio files or audio clips with descriptors for page 5 and begin to play them aloud. If a user interacts with the GUI to change the speed at which the audio is played, the read-aloud system receives an instruction from the GUI to play the audio at an increased rate. In one embodiment, this is accomplished by multiplying the timestamps of the audio file by the user-indicated speed adjustment. For example, an audio file for a page that in standard operation runs for 1 minute runs for 30 seconds after speed adjustment. In another embodiment, the read-aloud feature is operable to play audio clips at increased rates in sequential order.

The read-aloud speed is alternatively operable to be adjusted through a selection of a preferred words per minute (WPM). Instead of selecting a multiplier, the user selects a WPM from a menu. Additionally, when a speed is selected by a user, the GUI is able to load an audio file that is secondary to the main audio file, wherein the secondary audio file contains a narration recording that is read faster than the main file. The main file is either an audio file that contains a "sped-up" narration or is a series of audio clips that are read and/or sequenced to have a faster narration time. Additionally, when loading an additional audio file, audio clips, and/or applying a multiplier, the read-aloud system is operable to change the bitrate, pitch, and other sound elements of the files in order to provide a listenable file. For example, in some technologies, the sound file is increased in speed by changing the bit rate, which affects the pitch of the sound. The read-aloud system is able to overcome these shortcomings by adjusting the volume, pitch, etc. to make the audio file sound more natural and listenable.

Figure 10:
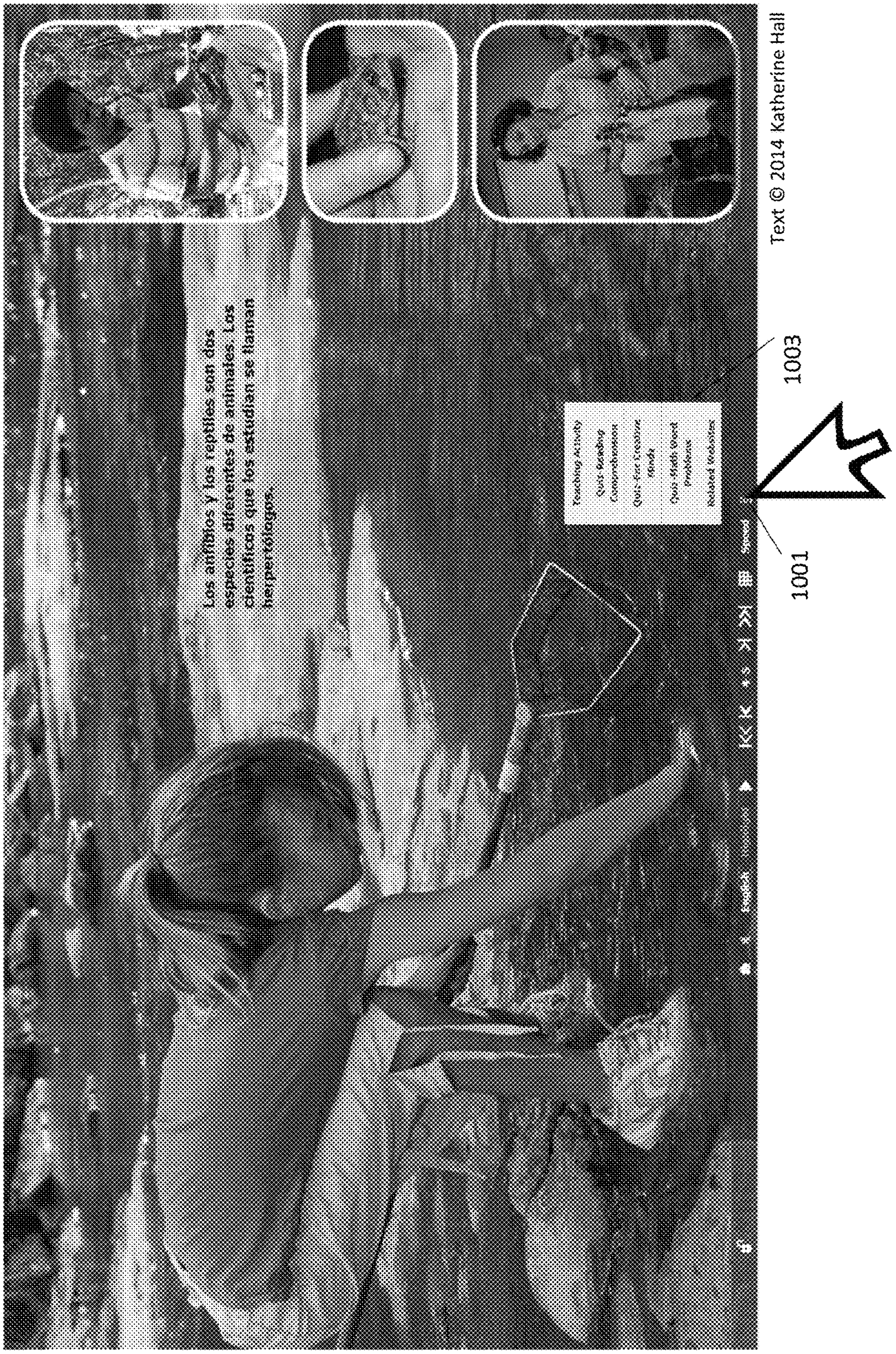
FIG. 10 illustrates the teaching tools connection feature of the GUI.

FIG. 10 is one embodiment of the teaching tools links section of the GUI. The GUI is operable to include a selection menu 1003 on the eReader that allows for a selection of a teaching tool that corresponds to the eBook. The teaching tools are comprised of a preset list of teaching elements. The selection menu 1003 is operable to, when receiving a selection from a user, direct the user to a webpage or additional section of the eReader that contains the linked teaching tool. In contrast to prior art, this provides a succinct, efficient method for linking a user to teaching tools relevant to the specific eBook. Instead of having to use a search engine, non-connected webpages, or additional tools that are not relevant to the eBook, the present invention allows for hyper-specific tools and resources to be linked directly from the eReader or eBook itself.

As illustrated in FIG. 10, the GUI is operable to display links and interactive elements that relate directly to the eBook material. The interactive elements and teaching tools are included in descriptors of the eBook. When the GUI is loaded, teaching elements from these descriptors are incorporated into the eReader display. For example, FIG. 10 illustrates a button that when pressed displays a menu showing relevant quizzes and teaching materials to the eBook. Further embodiments of the improved GUI include interactive elements within the eBook itself. For example, when a user selects an illustrated rabbit on the page of an eBook, a guide on rabbits appears as an overlay to the eBook. The teaching materials are operable to be links to other elements or action buttons that display the elements within the eReader itself.

Since the eBooks generally reflect standards for state or national standards, the teaching tools further include a resource which indicates the pages, elements, or methods of teaching that meet these standards. The standards include at least NGSS (Next Generation Science Standards) and Common Core standards. For example, a linked resource indicating the standards of the eBook Amphibians and Reptiles represented in FIG. 10 includes the following line:

Grade: 1; Number: 1.MD.C.4; Standard: Organize, represent, and interpret data with up to three categories; ask and answer questions about the total number of data points, how many in each category, and how many more or less are in one category than in another "Grade: 1" indicates the grade level of the curriculum standard that the eBook meets. "1.MD.C.4" indicates the reference number of the Common Core standard that the eBook meets, which is the Common Core mathematics category of Measurement and Data and subcategory of Represent and Interpret Data. The "Standard" tag provides a description of the curriculum standard. In this way, the quick access teaching tools and resources benefit teacher users in allowing for ease of planning and implementation of the eBooks into their curriculums.

Figure 11:
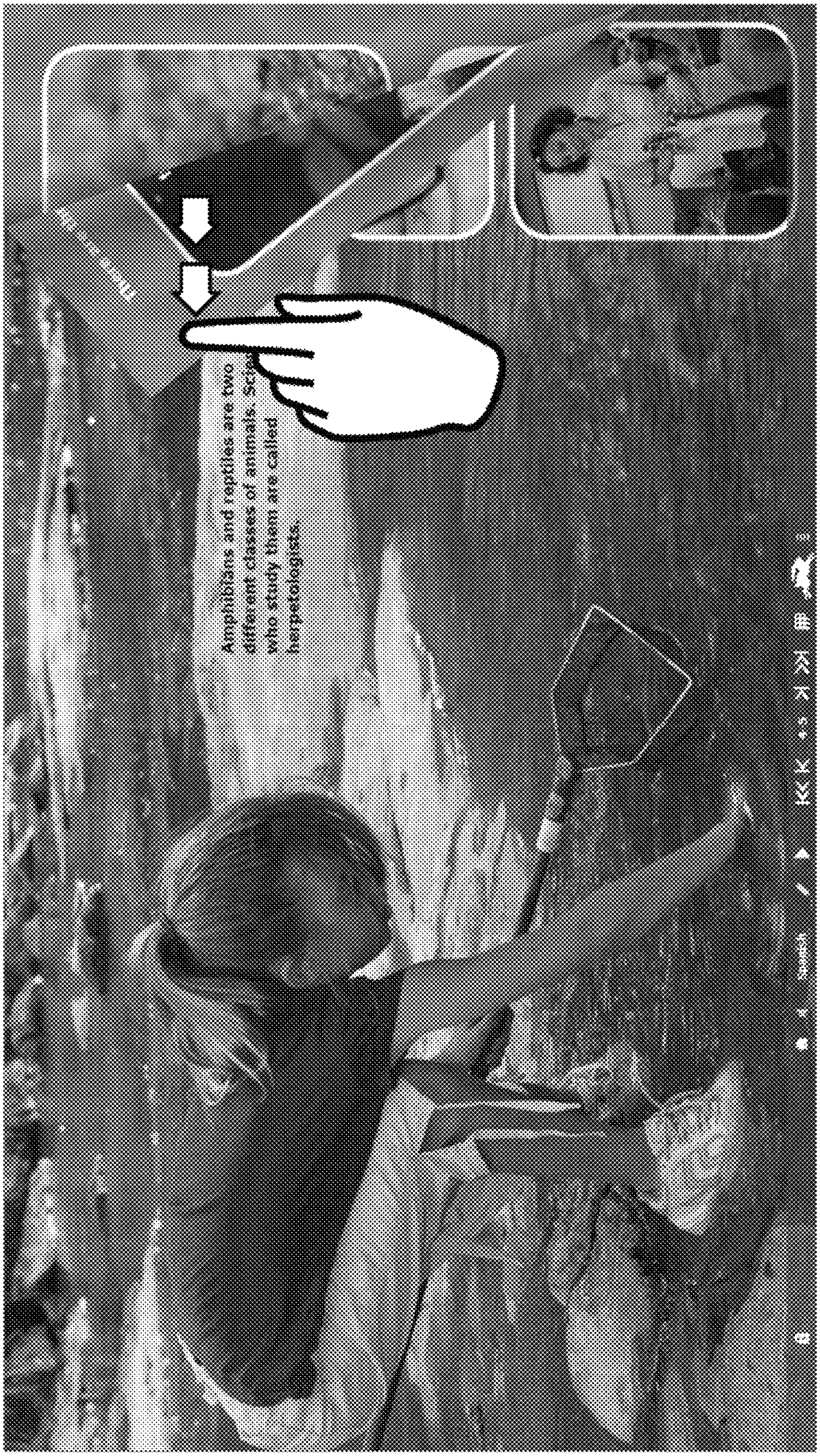
FIG. 11 illustrates one embodiment of a gesture control element of the GUI.

FIG. 11 is one embodiment of the gesture control elements of the GUI. The GUI is operable to allow a user to interact with the eReader to turn a page. A user interacts with a touchscreen, optical input, or any other method known in the art of Human-Machine Interfaces (HMI). When a user "touches," "presses," "clicks," or otherwise interacts with a specific point on the eBook and subsequently drags the input (using a hand, stylus, digital mouse pointer, etc.) to the left or the right side of the screen, the page of the eBook transitions to another page. Preferably, the pixels of the page displayed on the eReader follow the input in order to mimic the real-world depiction of a page turn. Gestures are not limited to page turning or left and right motion. Instead, other features are possible that allow the pages of the eBook to move along with a user input. Additionally, elements of the eReader are operable to react to the input. For example, in one embodiment, a swipe up on the bottom bar of the eReader displays a visual element from which a user can select which page to jump to.

Gestures are additional methods through which a user is able to interact with the GUI in order to control the page turn, teaching elements, speed of the read-aloud feature, highlighting of words, and other elements of the eReader. In one embodiment, the user interacts with the GUI through an HMI. Upon selecting a portion of a page of the eBook and dragging, the page moves in the direction of the dragged input. This results in the page turning in a method similar to that of turning a physical book. In one embodiment, as an HMI input device (such as a mouse cursor, a hovering finger, etc.) nears the edge of a page, the page displays a partial turn animation to indicate gesture capability. The partial turn animation in one embodiment appears to show the virtual page corner being folded backwards showing an eminent page turn. Other gesture examples include providing two inputs to the eReader and performing a "pinching" motion to decrease the size of the text or images of the eBook, performing a "grabbing" motion with multiple inputs in order to return to the beginning of a book, and "double tapping" or "double clicking" an element in order to highlight it. Further embodiments include utilizing sensors available to the device, including pressure sensitivity, in combination with gestures in order to provide more user-eReader interactions.

Additionally, gestures are operable to be included in the descriptors of the eBook itself, such that when a user performs a specific gesture with an HMI, the eBook performs in a specific way. For example, if a specific eBook is focused on teaching shapes to children, if a user inputs a circular gesture the eReader displays a circle or plays an audio file dictating the word "circle."

Notably, the audial descriptors of the present invention are not limited to being paired only with words. Audial descriptors are also able to be paired with images, dynamic text containers, and other elements of an eBook. For example, in one embodiment, a user selects a picture of a mouse in an illustration, the eReader checks the descriptors illustration image file for audial descriptors, and if there is a descriptor, loads the corresponding audio file and plays the sound. Descriptors of this kind are contained either within the image file itself, as in the previous example, or within an element that is displayed on the page. For example, in another embodiment, an eBook of Alice in Wonderland contains an illustration of a book character, such as the Mad Hatter, that when selected plays dialogue from the audio file for the accompanying text. In alternative embodiments, interactive elements include indications of interactivity, including a box around the element or a symbol next to the element.

In one embodiment, the eBook includes supplemental content on a page, such as a sidebar, which includes text, audio, video, or other interactive elements. If the supplemental content includes text or images with related audio content, the read-aloud feature is operable to play the audio files or audio clips associated with the elements. The supplemental audio files or audio clips are operable to be stored in the descriptors of the sidebar, page, eBook, or elements themselves.

When the read-aloud feature is engaged and audio files or audio clips are being read aloud, a user is able to select an interactive word or image to play an additional audio file or audio clip that corresponds to a graphic or word. The eReader is operable to have a setting dictating whether the narration is paused before playing the additional audio. When narration pausing is enabled, the narration pauses, plays the audio corresponding to the selected word or graphic, and then resumes narration from the last word read. When it is not enabled, the eReader does not allow selection of the interactive word or image.

In further embodiments of the image/audio selection, a user selects a portion of the page, and an image analysis engine compares the graphic elements to known images. When a graphic is recognized, for example an image of a rabbit or a barcode, corresponding audio is played. The corresponding audio is determined either through descriptors stored in the eBook or a connected external database.

Figure 12:
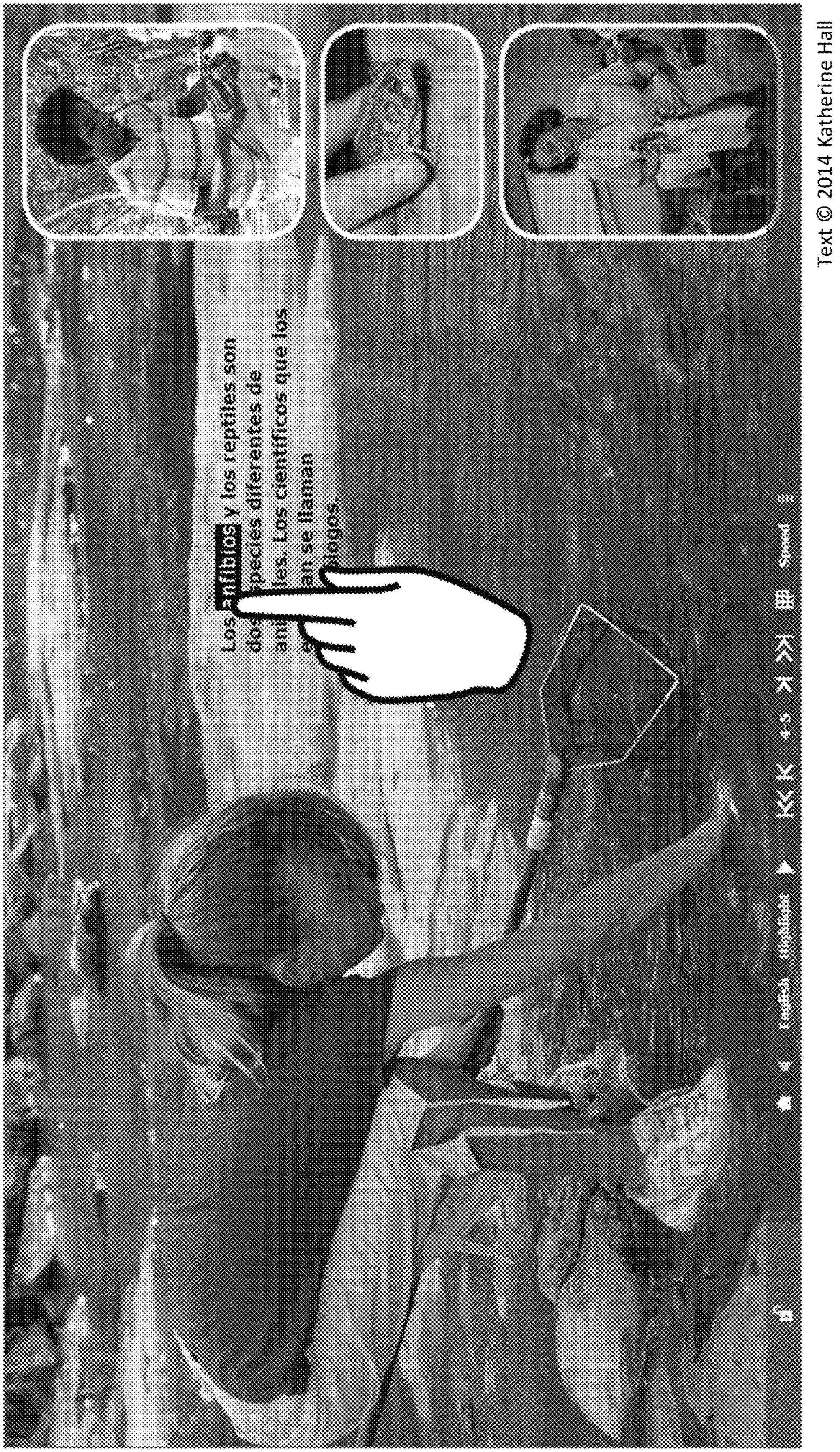
FIG. 12 illustrates the word selection feature of the GUI and read-aloud system.

FIG. 12 is one embodiment of the word selection feature of the GUI. In the illustrated embodiment, a user interacting through an HMI is able to select a word to be played. When the user selects this word, the corresponding audio clip or portion of an audio file is read aloud to the user. Optionally, the word is highlighted at the same time in order to indicate the word being read aloud. In FIG. 12, a user is selecting the word "anfibios," which is read aloud to the user. In other embodiments, a user selects a word through an HMI and the corresponding translation of the word in a foreign language is read aloud.

Usage data corresponding to a user's interaction with eBooks is collected and stored in a usage memory and usage database. Usage data includes eBooks read, pages read, teaching resources accessed, time spent viewing each page within each eBook, and/or any other analytics metric useful for understanding the interaction of a user with an eBook or eReader. Preferably, for eBooks read, a percentage metric is used in order to indicate that an eBook has been read. In the preferred embodiment, the percentage of pages viewed in order to mark an eBook as read is greater than 50 percent of the book. In another embodiment, the percentage is 60 percent or greater. In a still further embodiment, the percentage is when a book has been viewed in its entirety.

Figure 13A:
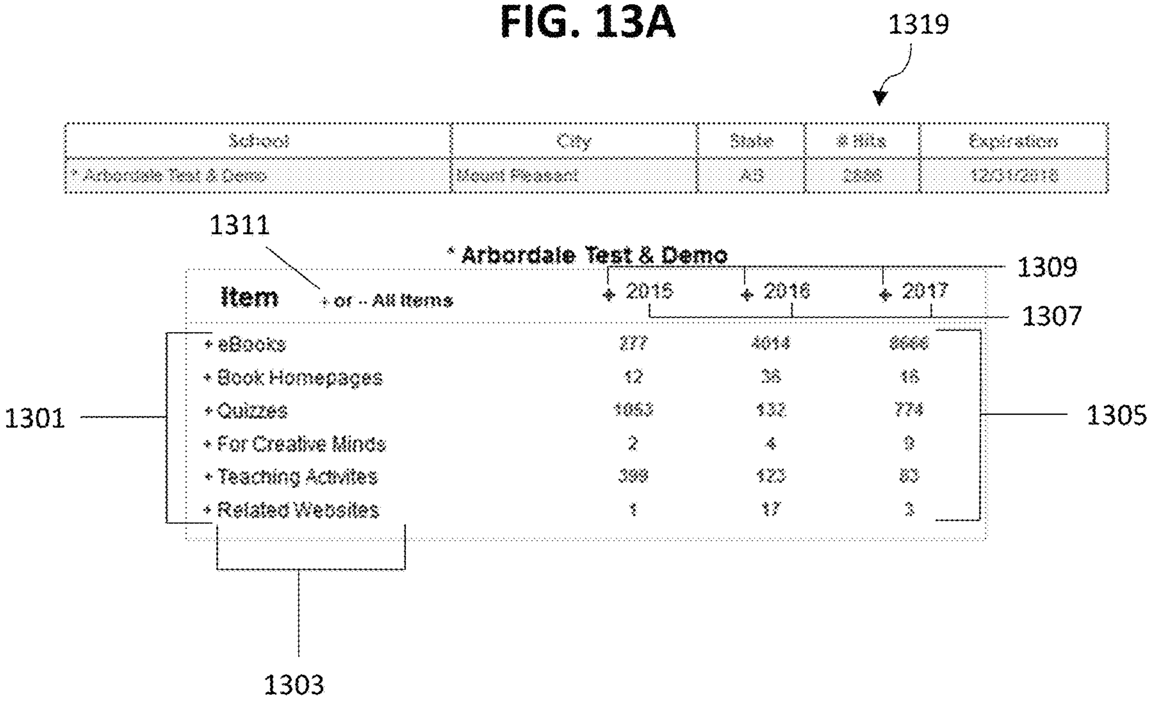
FIG. 13A illustrates one embodiment of the usage data chart.
Figure 13B:
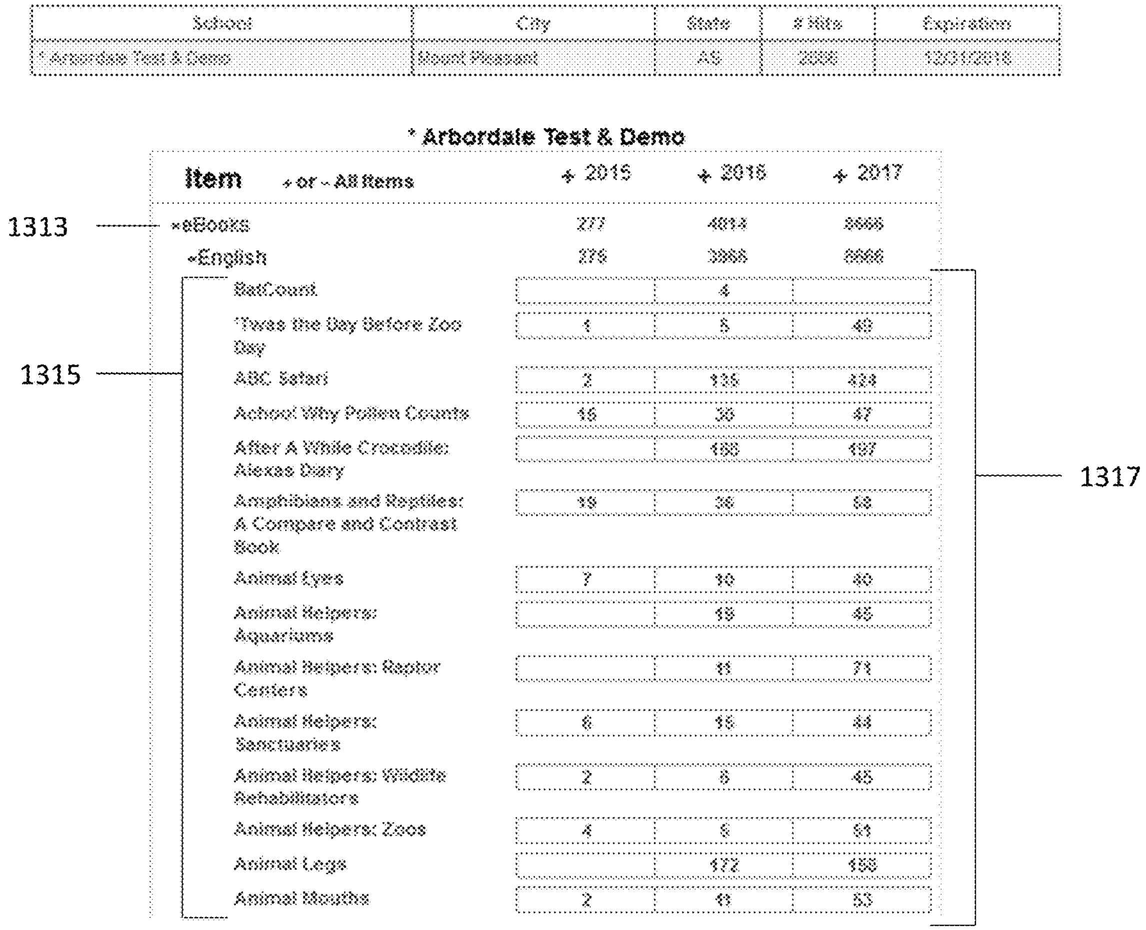
FIG. 13B illustrates an expanded embodiment of the usage data chart.

The GUI is then operable to retrieve the usage data from the usage memory and usage database and display the numbers in an auto-updating chart, wherein the chart automatically matches the usage data to eBooks in the eBook database and populates the chart with eBooks that the user has interaction data with. FIGS. 13A-13C illustrate one embodiment, wherein usage data corresponding to eBooks read by users under an administrator account is displayed in a usage chart. The GUI automatically retrieves the usage data from the usage memory and usage database and populates the usage chart with the corresponding count of eBooks read. FIG. 13A illustrates a default view of the usage data chart, where each usage data category 1303 is displayed next to the corresponding interaction count 1305 by year 1309. The categories are operable to be expanded into subcategories by "clicking" or "tapping" an expansion button corresponding to each category 1301. Each year is additionally paired with an expansion button 1307. An "expand or condense all" button 1311 is also supplied that allows expansion of all user data categories into subcategories or eBook listings. A header 1319 with overview information about the user is also displayed indicating any profile information as well as high-level interaction data, such as the number of hits a certain user's eBooks have in total.

As illustrated in FIG. 13B, once an expansion button is selected, it transforms into a condense button 1313. Subcategories subsequently have expansion buttons associated with them that allow further subcategories or eBooks to be displayed. Automatic population of read eBooks 1315 is displayed in the illustrated embodiment along with a breakdown of when each book was read by year in the chart 1317. The data in the chart 1317 is directly linked to the usage memory and usage database and updates automatically based on the user interaction data. Additionally, FIG. 13C illustrates an expansion of the years into months, which provides more detailed usage data for each eBook. In further embodiments, users are operable to select a specific book or teaching resource and see the interaction data for that book or teaching resource alone.

Alternative embodiments of the usage data chart include graphs and timelines that depict the usage data of eBooks in similarly customizable manners. For example, in one embodiment a line graph is drawn depicting the change in number of pages read over time. The graph maintains its tiered level of information, which provides a customizable and easy way of analyzing usage data of eBooks.

The usage data GUI of the present invention is a significant improvement over prior art, as it allows for highly specific usage data specific to the user to be automatically displayed. Notably, the user analytics and interaction data stored in the usage memory and usage database provide previously unavailable data to publishing, library, and other book owners as well as a unique graphical depiction of the usage data in a tiered level of depth. Usage and interaction data provided by user analytics and the Internet enable libraries to track which books are the most popular, publishers to track which books are being read, and teachers to understand whether assignments are being completed by their classes, among other benefits. These benefits were previously unavailable in these fields before computer technology was available.

Figure 14:
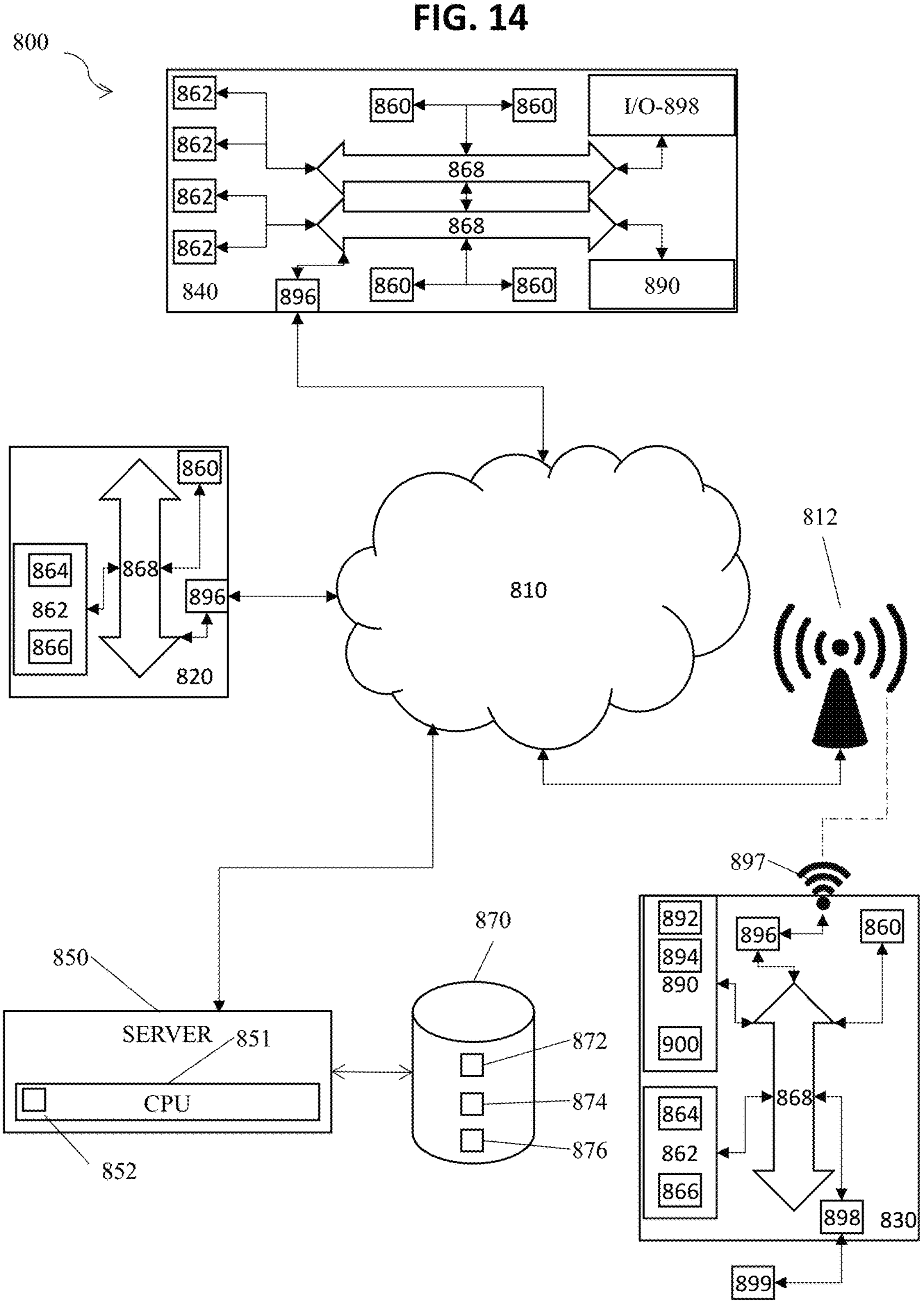
FIG. 14 is a schematic diagram of an embodiment of the invention illustrating a computer system.

FIG. 14 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a cloud-based network 810 for distributed communication via a wireless communication antenna 812 and processing by at least one mobile communication computing device 830. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 14, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multiprocessor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to a bus 868. Computing devices may communicate communication media through wired networks, direct-wired connections or wirelessly, such as acoustic, Radio Frequency (RF), or infrared, through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications, or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

It is also contemplated that the computer system 800 may not include all of the components shown in FIG. 14, may include other components that are not explicitly shown in FIG. 14, or may utilize an architecture completely different than that shown in FIG. 14. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Figure 15A:
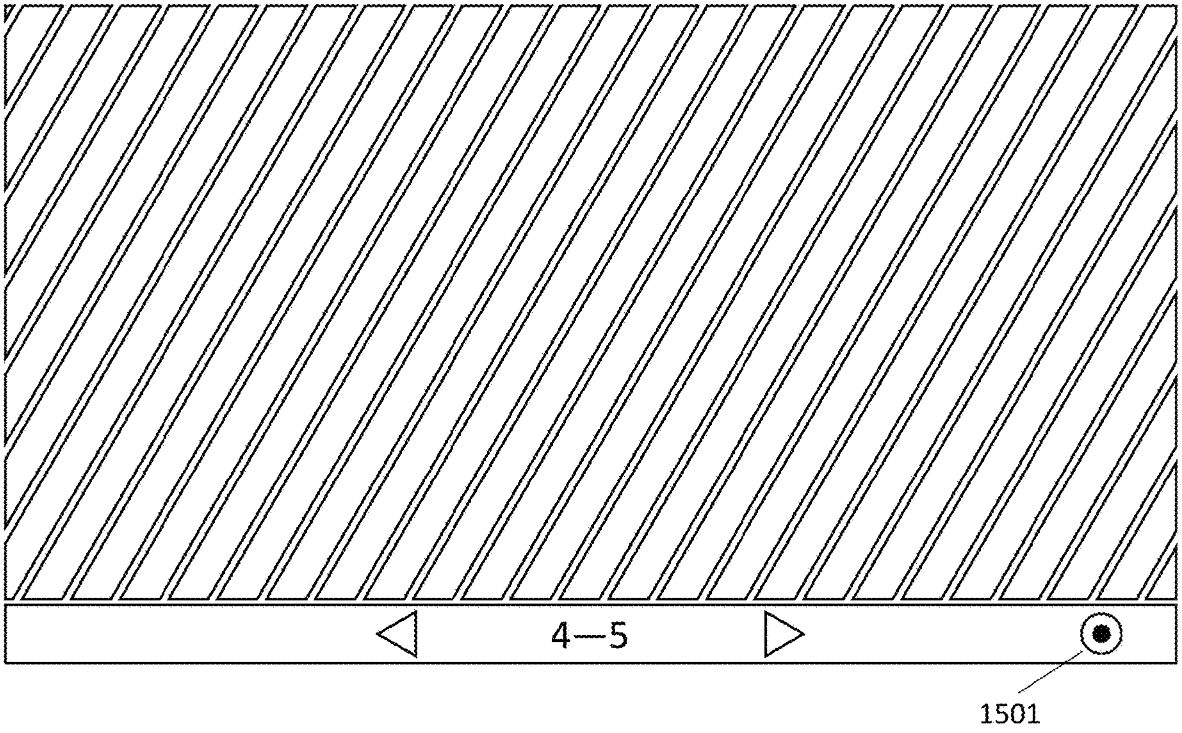
FIG. 15A illustrates one embodiment of the narration recording feature.
Figure 15B:
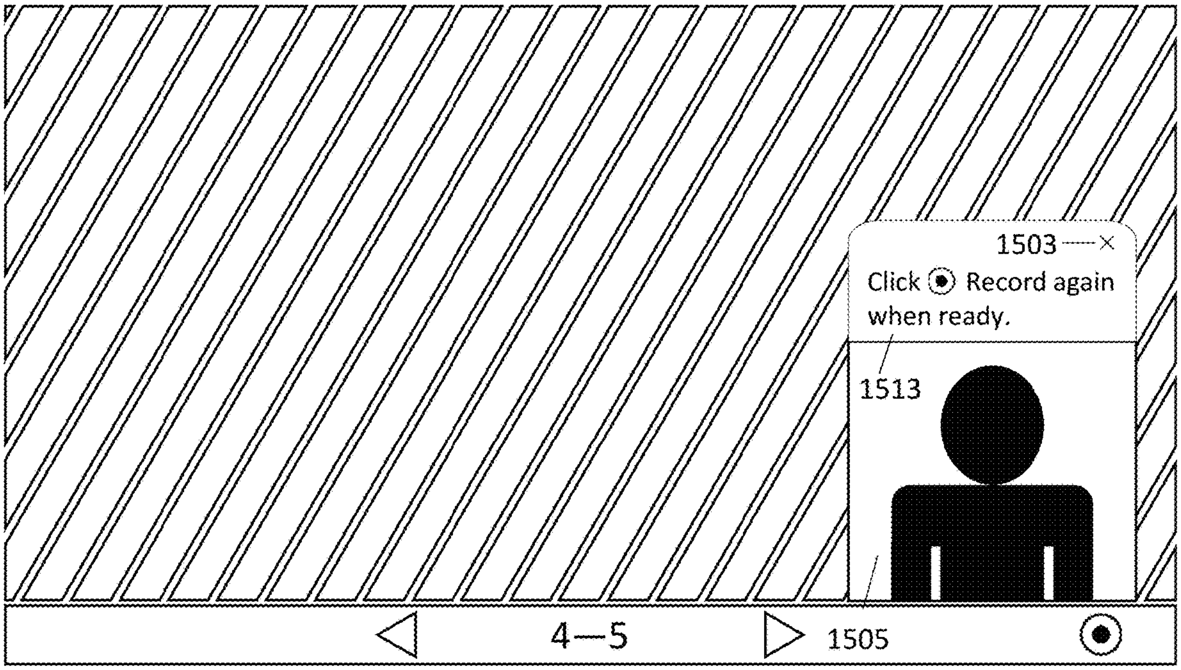
FIG. 15B illustrates another embodiment of the narration recording feature.

Additionally, for devices with video and audio capturing equipment (e.g. a camera and a microphone), the eReader of the present invention allows for recording and playback of video and audio elements within an eBook. FIGS. 15A-15D illustrate different features of this capability. In FIG. 15A, the eReader displays a record button 1501, which when selected by the user begins the recording process for the displayed eBook page. FIG. 15B illustrates a video monitoring window 1505, which displays a video stream from the video capturing equipment so that users can monitor the recording process. Additionally, the eReader is operable to display instructions 1513 for the recording process. In FIG. 15B, the instructions 1513 are docked on top of the video monitoring window with a close button 1503, which removes the instructions from the GUI. The instructions 1513 are operable to be displayed in any location within the GUI and recite wording as set by an eBook creator. Additionally, the language of the instructions reflects either the system language of the device or the language selected within the eReader itself. In one embodiment, when a record button is selected, video and audio are recorded and stored with the eBook files. Descriptors for the eBook are modified to indicate presence of recorded video and audio.

Figure 15C:
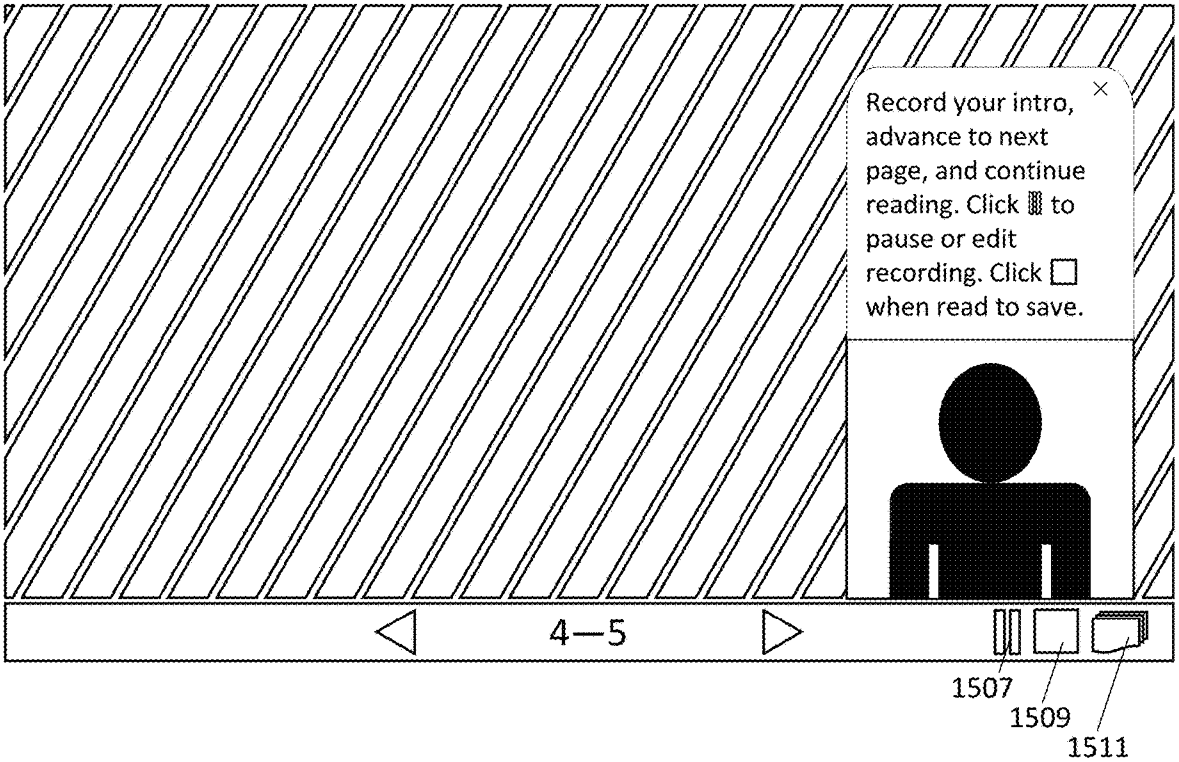
FIG. 15C illustrates another embodiment of the narration recording feature.

The eReader recorder is operable to function in two different manners based on input from the user. In a first instance, as indicated by FIG. 15B, the recording user selects the record button 1501, and the pages of the eBook automatically turn such that a user recording narration does not have to interact with the eBook to record multiple pages. In an alternative embodiment, the pages do not automatically turn, but the user is able to select a page turn button or perform a gesture to move to a subsequent page while recording continues. In a second instance, as illustrated by FIG. 15C, the user selects the stop button 1509 to stop recording for a single page. In this instance, a user is able to record a video message for a page or simply narrate on a page-by-page basis. A pause button 1507 also pauses the video and audio recording temporarily and resumes upon a subsequent selection of the button or selection of a record button. An overview button 1511 is additionally operable to display an indication of every page that contains recorded elements and change the page displayed to a selection of the user.

Figure 15D:
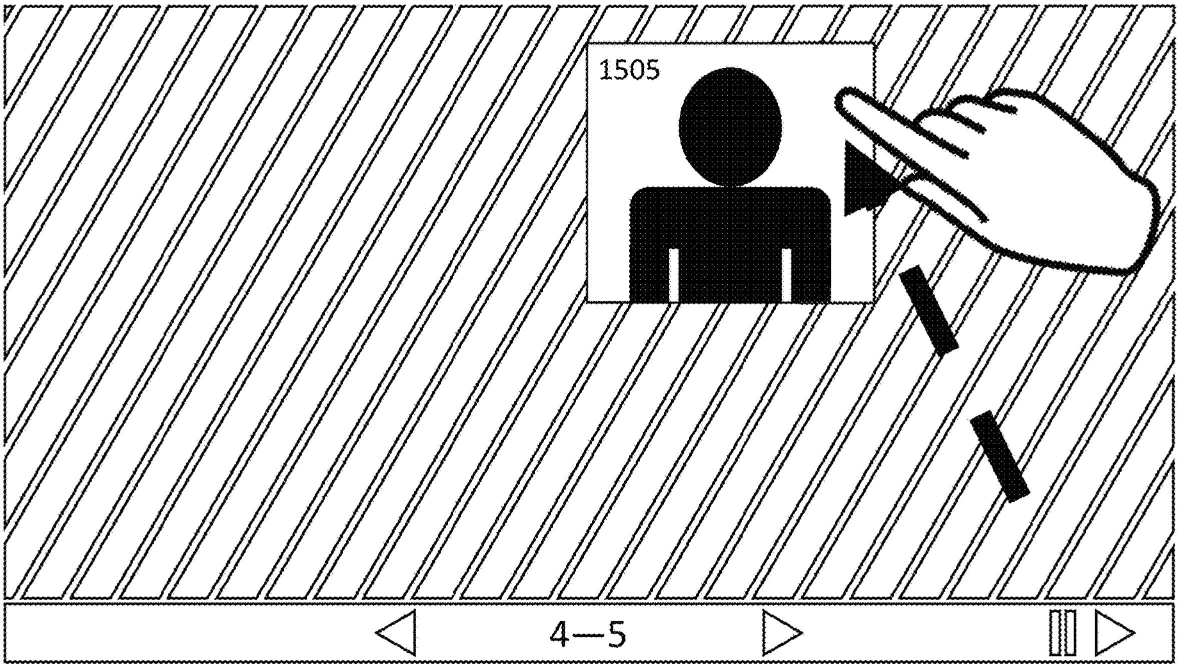
FIG. 15D illustrates another embodiment of the narration recording feature.

FIG. 15D illustrates the mobility of the video recording window 1505. Based on input from an HMI, the GUI is operable to move the video recording window 1505 to a different location on the eBook spread. For example, if the video recording window 1505 is displayed on top of eBook text, a user is able to move the window such that the text is visible. In one embodiment, the location of the video recording window is set and stored within the eBook for each page. In this instance, the video recording window becomes an embedded element within the eBook with descriptors indicating the location it is docked to. Thus, when an end user is viewing the recorded elements, the video recording window is by default not overlaid on top of the text recorded.

In one embodiment, when the play button is selected in eBooks with recorded elements, the eReader loads the recorded video and audio files and plays these elements instead of the default narration elements that the audial and textual descriptors are linked to. In another embodiment, controls for the recorded elements are displayed in addition to the narration and highlighting controls.

In an alternative embodiment, an audio-only version of the recording feature allows a user to record audio without recording or viewing video elements. In this instance, the eReader is operable to display only control buttons and instructions without a video recording window for feedback.

Furthermore, video and audio recordings are operable to be shared between eReaders. In one embodiment, this occurs through sending the recordings through a digital communication method, including email, instant messaging, and/or wireless communication methods covered under or used as combinations of the Institute of Electrical and Electronics Engineers (IEEE) 802.11 standards for wireless communication (e.g., WIFI, BLUETOOTH, NEAR FIELD COMMUNICATION (NFC), or ZIGBEE). Alternatively, the recordings are uploaded to a server with memory and a database, wherein eReaders are operable to request a specific recording and download the recording or stream it. The server is operable to implement digital encryption or username/password protection to secure the uploaded recordings and thereby restrict access only to specific users.

The recording features provide a significant benefit to both users learning to read and speak a language as well as to provide sentimental value and bolster personal connections between individuals. For example, children learning how to read benefit significantly from hearing how they sound or seeing themselves speak, and the eReader provides a powerful tool for delivering this through recording features. Additionally, for a user learning a foreign language, these features provide similar benefits so that pronunciation and clarity can be assessed and corrected. Furthermore, the recording features provide sentimental value, such as providing a "snapshot" of a child or parent's voice and appearance at a specific age. Families separated over long distances, such as military families, are also beneficiaries of these features, as the recorded elements act as mementos or messages that provide comfort and connection through eBook technology.

Figure 16:
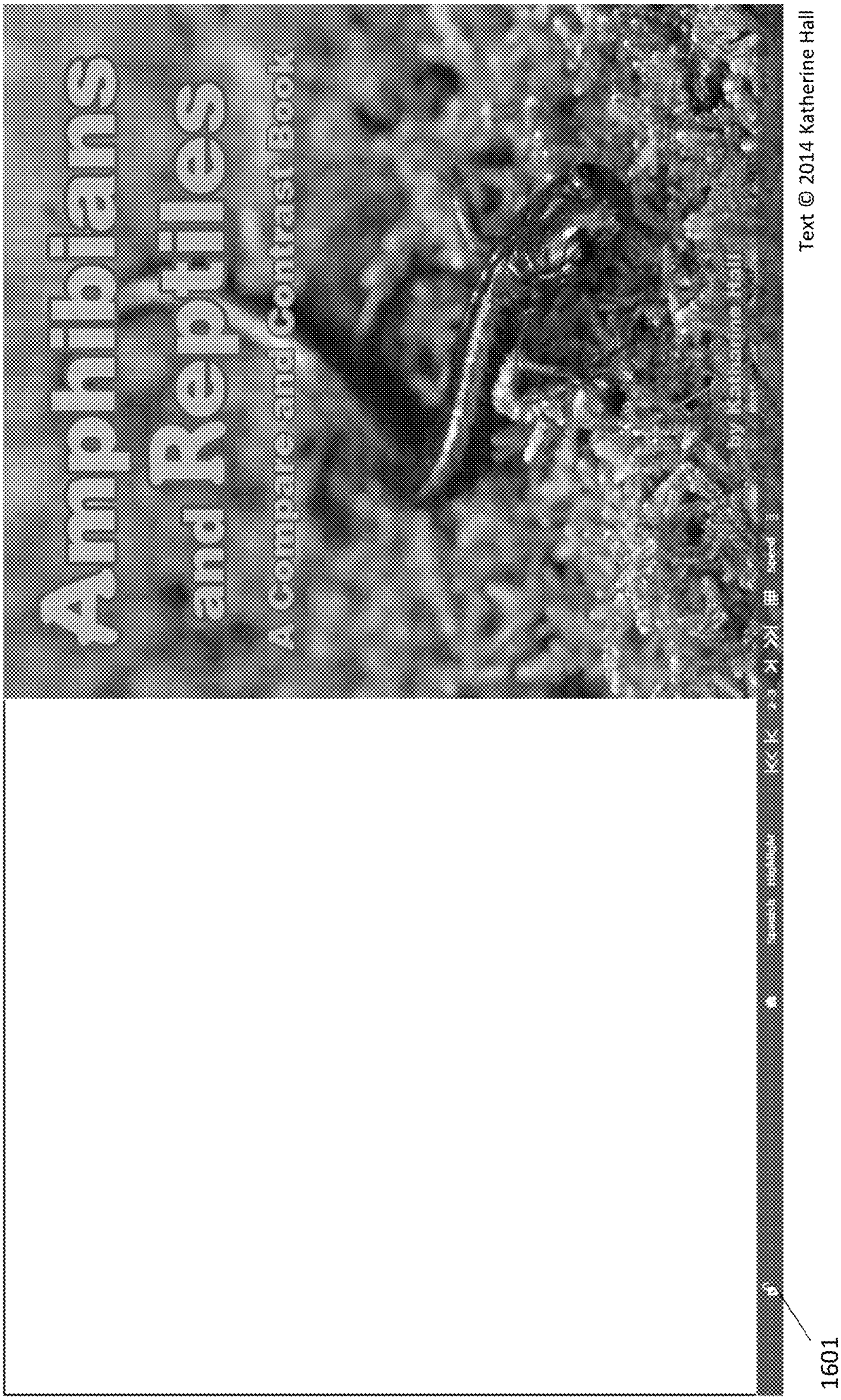
FIG. 16 illustrates one embodiment of the visual page selection feature.

FIG. 16 illustrates a locking feature of the control bar. The control bar is operable to have a lock switch 1601, such that when a user selects it, the control bar either stays visible while an eBook is displayed or activates auto-hide mode, wherein the control bar is displayed only when the user interacts with the eBook or an input device moves near the bottom of the screen (e.g. a mouse cursor). Once the switch is selected, it changes visible states such that it displays whether the control bar is locked or unlocked.

Figure 17:
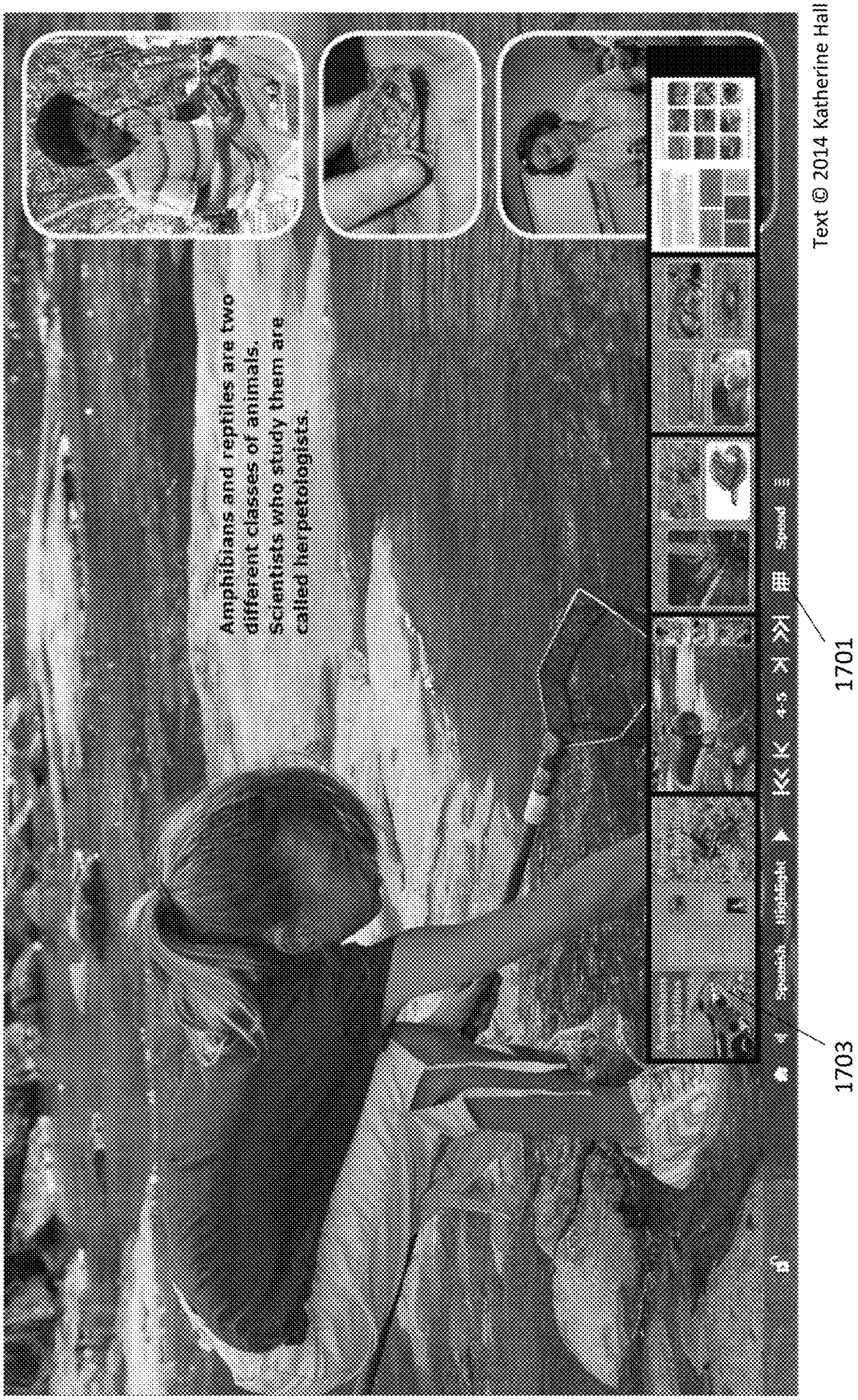
FIG. 17 illustrates the login and registration page of the eReader.

FIG. 17 illustrates the visible page selection feature of the eReader, wherein upon selection of the overlay button 1701, thumbnail images 1703 of the eBook are displayed indicating a page or spread of pages within the eBook. When a user selects a thumbnail, the eReader loads the corresponding page or spread and displays it through the GUI. The thumbnails 1703 also have scrolling capability. The embodiment in FIG. 17 is a click-and-drag (or touch-and-drag) implementation, such that a user "slides" the thumbnails 1703 from right to left in order to see all pages in the eBook. Alternative embodiments include a scroll bar similar to that of the dynamic text container or a scrolling indication of the page number of the thumbnails displayed.

Figure 18:
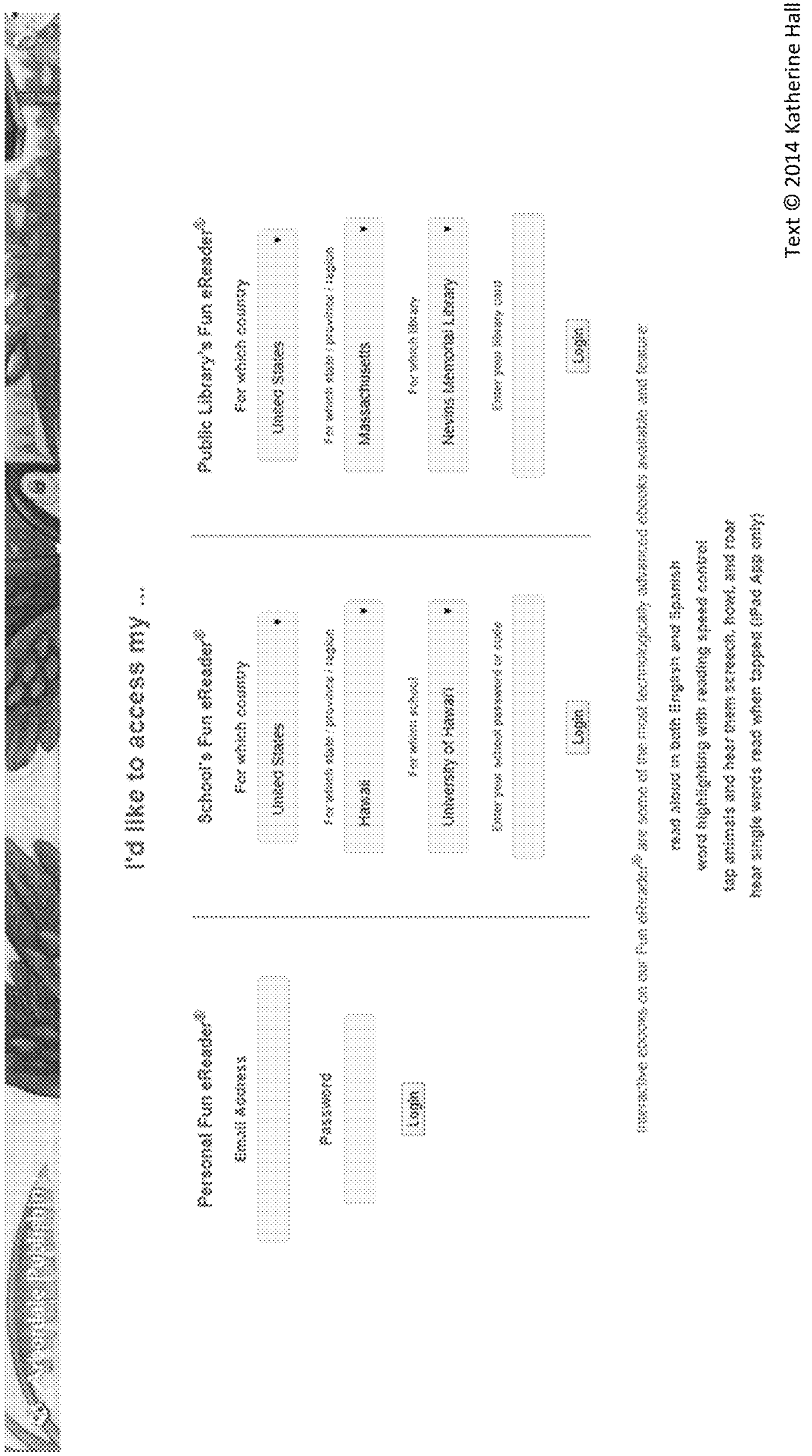
FIG. 18 illustrates navigation bar locking in the eReader.

FIG. 18 illustrates three different access methods to specific eBook databases. In one embodiment, a user accesses a personal eBook database through creation and access to a personal account with a username and password. In another embodiment, the user accesses a school eBook database through selection of a school and providing an access code or password associated with that school. In a third embodiment, the user accesses a library eBook database through selection of a library and inputting a library card number associated with that library. Each of these login methods provide access to an eBook database with eBooks that are purchased or available for users. Each individual type of administrator user associated with an entity (personal, school, library, etc.) has privileges to purchase eBooks and add to the eBook database for that particular entity. Another user is able to access an entity's eBook database by inputting corresponding credentials. When a user logs into a specific entity's eBook database, the eReader is operable to store these credentials and log in upon activation or remain logged in to the eBook database. Additionally, when a user logs into an eBook database, the device is registered with the specific entity's account, which provides analytics and management of devices attached to a specific entity's account.

Figure 19:
FIG. 19 illustrates a standards searching feature of the eReader.

FIG. 19 illustrates one embodiment of an eBooks display page, wherein books in the eBook database are displayed accompanied with their title pages and are organized by category. The categories displayed in FIG. 19 are "New Releases" and "Additional Titles," though the system is operable to assign any category name to an item, such as a curriculum standard that the eBook meets. Each eBook in the eBook database is tagged with a category such that the eBooks display page automatically displays each tagged item in accordance with the category name. Furthermore, a language switch button 1901 is operable to change the title pages displayed to the foreign language equivalents and display language-corresponding category names. The language switch button 1901 is not limited to a button, but in some embodiments is a slider, a drop-down menu, a radio-selector, or any other selection method known in the art that allows for selection of a language from two or more language choices. In another embodiment of the eBook display page, a filter mechanism allows for users to sort eBooks based on a selected category or in a specific order (e.g. alphabetical, grade level, etc.).

FIG. 20 illustrates an education standards searching mechanism results page, through which a user is able to find books that meet a specific curriculum standard, such as NGSS or Common Core. The results page of FIG. 20 shows results from searching for books meeting the Common Core standard of Grade 2 Social Studies. The system returns an indication of the eBooks that meet this standard, sub-standards that the eBook meets, and a description of the sub-standard. The search is operable to be done through textbox, dropdown menu, radio selector, or any method of input known in the art for indicating a standard to be searched or sorted. In a further embodiment, the results page is displayed with eBook title pages in addition to or instead of the eBook title. Furthermore, additional embodiments allow for searching and sorting by a specific language, a specific standard, title names and/or categories.

Figure 21:
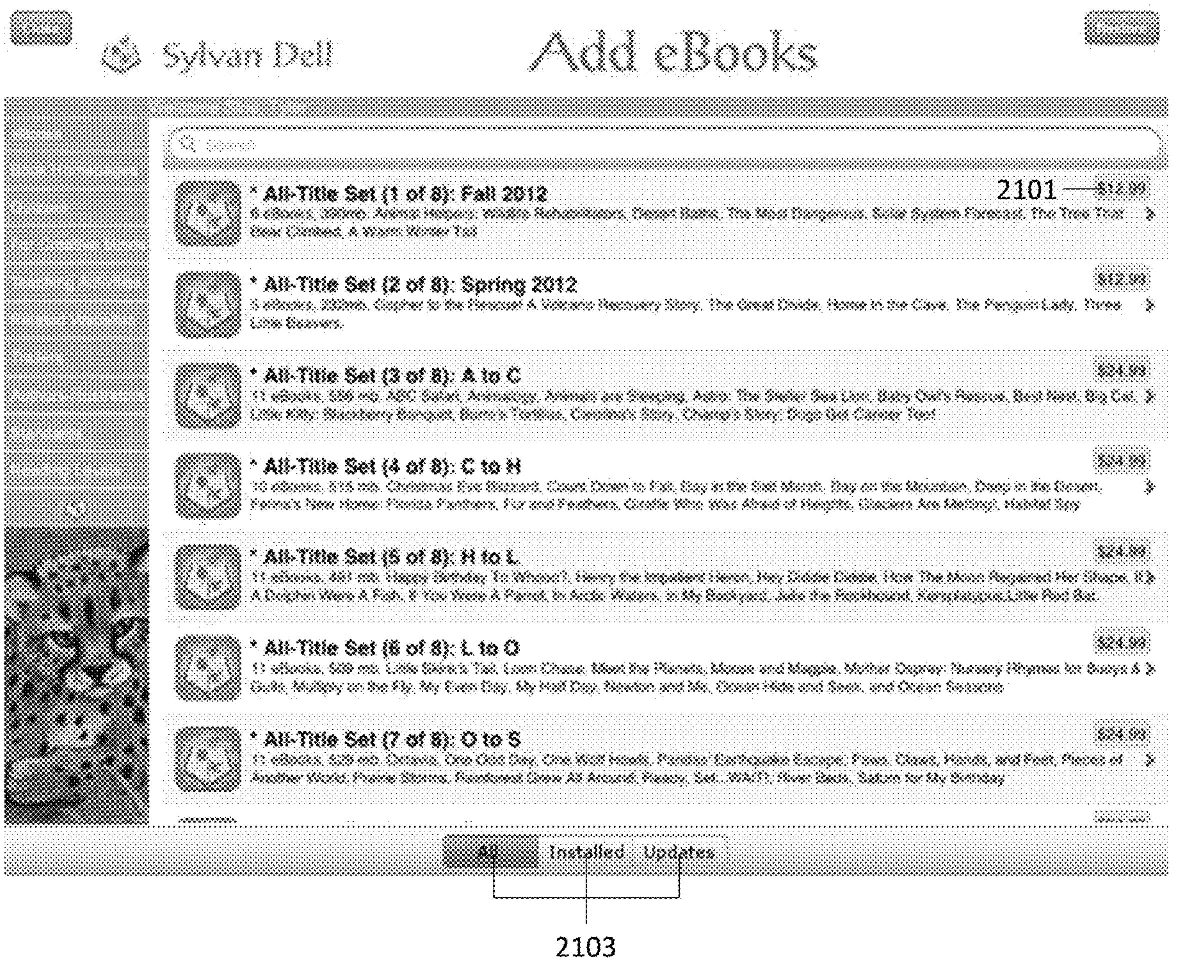
FIG. 21 illustrates one embodiment of the eBook purchasing feature of the eReader.

FIG. 21 illustrates one embodiment of an eBook purchase page, wherein the eReader is operable to allow a user to purchase an eBook or set of eBooks. The illustrated embodiment is a mobile device application with sets of eBooks available for purchase. A user is able to select through an HMI a purchase button 2101 to purchase an eBook. The purchase button is operable to display a price of the eBook or simply indicate that an eBook is able to be purchased. In one embodiment, selecting the purchase button redirects to a purchase page for entering payment information and purchasing the item. In another embodiment, an external payment system to the eReader is built into the device and is automatically activated (for example a mobile payment system, such as APPLE PAY). Additionally, once an eBook or eBook set has been purchased, each eBook in the eBook database is updated to indicate that the eBook has been purchased and is available for reading. The eReader is operable to display the eBooks in the eBook database through a tab, which the user is able to switch through by selecting a filter button 2103. Upon selection, the filter button 2103 is able to display all of the eBooks, only the installed eBooks, eBooks available for purchase, or eBooks with available updates.

Figure 22:
FIG. 22 illustrates another embodiment of the eBook purchasing feature of the eReader.

FIG. 22 illustrates another embodiment of the eBook purchase page, wherein Uninstall 2201, Download 2203, and Buy Now 2205 buttons are provided for uninstalling a downloaded eBook from the device accessing the eBook purchase page, downloading to the device, or purchasing the eBook.

Figure 23:
FIG. 23 illustrates an eBook storage selector for the eReader.

FIG. 23 illustrates a filtered eBook purchase page with an eBook listing for a purchased eBook. The radio selectors 2301 allow for a user to indicate whether the book should be stored in the cloud or downloaded to local storage on the device itself. When a user keeps an eBook in the cloud, when the eReader is loaded to be read, it first downloads a temporary copy to temporary storage on the device and displays the eBook. Temporary storage is cleared upon changing eBooks or digitally leaving the eReader environment. When downloaded, the eBook is stored on the device and is loaded by the eReader when selected to be read by a user.

Figure 24:
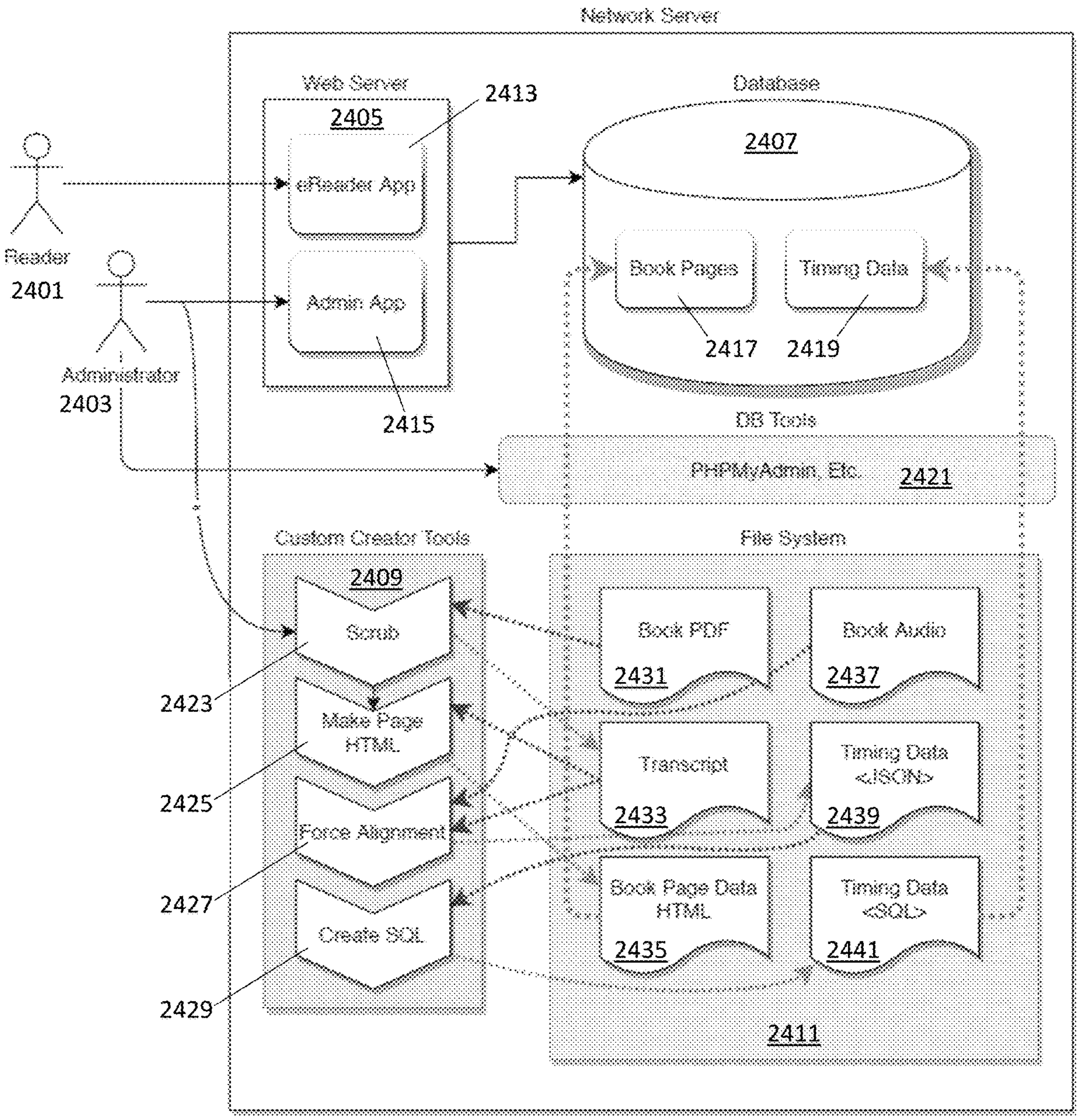
FIG. 24 illustrates a server topology diagram of an eReader system according to one embodiment of the present invention.

FIG. 24 illustrates one embodiment of a network server architecture, wherein the server provides access to both a front-end reader user 2401 and a back-end administrator user 2403. The network server provides access to a web server 2405, a database 2407, custom creator tools 2409, and a file system 2411. The web server 2405 provides access to the front-end tools for interacting with an eBook, such as the eReader app 2413 and/or other tools, such as teacher quizzes, reading statistics, and other front-end user-based functionality disclosed herein. An admin app 2415 provides access to administrative tools that allows for creation, generation, and management of eBooks, eBook data (e.g., descriptors, images, audio, and metadata), code and markup data, and availability of titles, quizzes, resources, and other teacher-based features of the system. The database 2407 is a database that includes both eBook data 2417 (such as book pages) and eBook descriptors and other metadata 2419 (such as timing data for audio and video). A database management tool 2419 allows for an administrator user to modify and/or add eBook data to the database.

The custom creator tools 2409 and the file system 2411 interact, in one embodiment, in the same way the creation and generation tools for eBooks are described above. In another embodiment, the custom creator tools 2409 include at least four functions that interact with eBook information stored on the file system 2411. The scrub 2423 functionality performs the steps of receiving a digital book (e.g., a book PDF 2431 from the file system 2411), as described above, extracting text, images, and related metadata (e.g., page numbers, paragraph numbers, word count, word length, image size, etc.), and storing the extracted text, images, and related metadata in the file system 2411. In one embodiment, the custom creator tool is operable to store a transcript 2433 with a structured and/or unstructured version of the text of the digital book in the file system 2411. The custom creator tool 2409 is operable to automatically generate computer-readable output for displaying and allowing interaction with the eBook content, illustrated in FIG. 24 by "Make page HTML" 2425, which in one embodiment includes the HTML Generator and its functionality, as disclosed herein. Notably, the computer-readable output includes, in one embodiment, intake of the structured and/or unstructured data of the transcript 2433 and output of any computer-readable instructions for display and/or interaction, including HTML, JavaScript, PHP, CSS, SQL, JSON, Flash, Ruby, and/or any other programming language or markup language for providing the functionality disclosed. In one embodiment, the custom creator tools 2409 outputs book page data HTML 2435, which is then indexed in the database 2407 with the book pages 2417 and other metadata.

In another embodiment, the custom creator tools 2409 receives book audio 2437 and the transcript 2433 and uses forced alignment 2427 functionality to generate timing data for the highlighting and/or audio or video playback functionality of the eReader. Forced alignment 2427 (or "force alignment") matches beginning and end times of words, characters, and punctuation marks with audio and/or video timestamps and/or keyframes. In one embodiment, forced alignment 2427 generates synthetic audio for the text of the eBook and, based on an analysis of the book audio 2437 and the synthetic audio, the forced alignment 2427 outputs an indication of matched words, characters, and punctuation marks. In one embodiment, the output is provided as JSON timing data 2439, which is stored in the file system 2411. Forced alignment 2427 is described in further detail with respect to FIG. 25.

FIG. 24 further illustrates generation of SQL 2429 from the forced alignment output, wherein the custom creator tools 2409 transform the JSON timing data 2439 from the forced alignment into SQL timing data 2441, wherein the custom creator tools 2409 store the SQL timing data in the file system 2411. The timing data 2441 is then stored and/or indexed in the database 2407 as eReader-accessible timing data 2419. Preferably, this allows for highlighting and playback of audio/video in the eReader app 2413 based on the stored and indexed information in the database 2407.

FIG. 25 illustrates one embodiment of forced alignment, wherein audio is synchronized to text of a book. In one embodiment, text 2501 is extracted from a digital book and/or retrieved from a database and/or filesystem. Synthetic audio 2503 is generated based on the text 2501 using any text-to-speech (TTS) model known in the art. The synthetic audio is compared 2509 to the input audio 2507, which is derived from any input source 2505, such as through an eReader recording system or a separate audio stored in a local or remote server and/or file system. Based on the comparison, beginning and ending keyframes for each word, character, punctuation mark, syllable, phrase, sentence, sentence fragment, or paragraph is determined, wherein the keyframes, text, and any other corresponding metadata is stored and/or indexed in the database 2511. In the illustrated embodiment, the word "the" is matched to beginning keyframe KF1 and ending keyframe KF2 of the input audio 2507. The word "the" and the corresponding keyframes are stored in the database 2511. In one embodiment, a correlation score or confidence value is generated for each word, character, punctuation mark, syllable, phrase, sentence, sentence fragment, or paragraph. If a correlation score or confidence value is greater than a threshold, then the word is matched to the corresponding audio segment of the input audio 2507. For example, in one embodiment, a beginning keyframe and an ending keyframe of the input audio 2507 has a confidence value of 0.95 for the word "went." The confidence interval is compared to a preset minimum threshold of 0.9, wherein upon determining that the confidence value is greater than the threshold, the keyframes are associated with the corresponding word, "went," and the text, the audio, the keyframes, and any corresponding metadata are stored and indexed within the database 2511. In another embodiment, a confidence interval is at least partially based on surrounding words. For example, a confidence interval of the word "rabbit-hole" is calculated to be higher based on identified audio keyframes identified for words "the" and "went" in adjacent time spaces. In another embodiment, the analysis occurs directly without the comparison to a synthetic audio. For example, keyframes are determined based on a comparison of the input audio 2507 to a pre-generated speech model for a library of speech elements. Notably, this is a high-level description of the algorithms and processes behind forced alignment, and one of ordinary skill in the art will recognize that any current and future systems for forced alignment and equivalent systems are within the scope of this invention. For example, in one embodiment, the invention includes any form of forced alignment via dynamic time warping (DTW) or automatic speech recognition (ASR) via hidden Markov models (HMM).

The table 2513 illustrated in FIG. 25 further shows how text and audio are paired together within the database 2511. Notably, the system is operable to store the extracted audio and text (including their corresponding textual descriptors and audio descriptors) with each of the audio metadata, including keyframes (KF1, KF2, etc.). The system is further operable to store the audio file as a single file or as individual audio segments that are separate files. For example, in the illustrated embodiment, the words "the" and "rabbit-hole" are associated with mp3 file "2," while the word "went" is associated with the mp3 file "3."

Figure 26A:
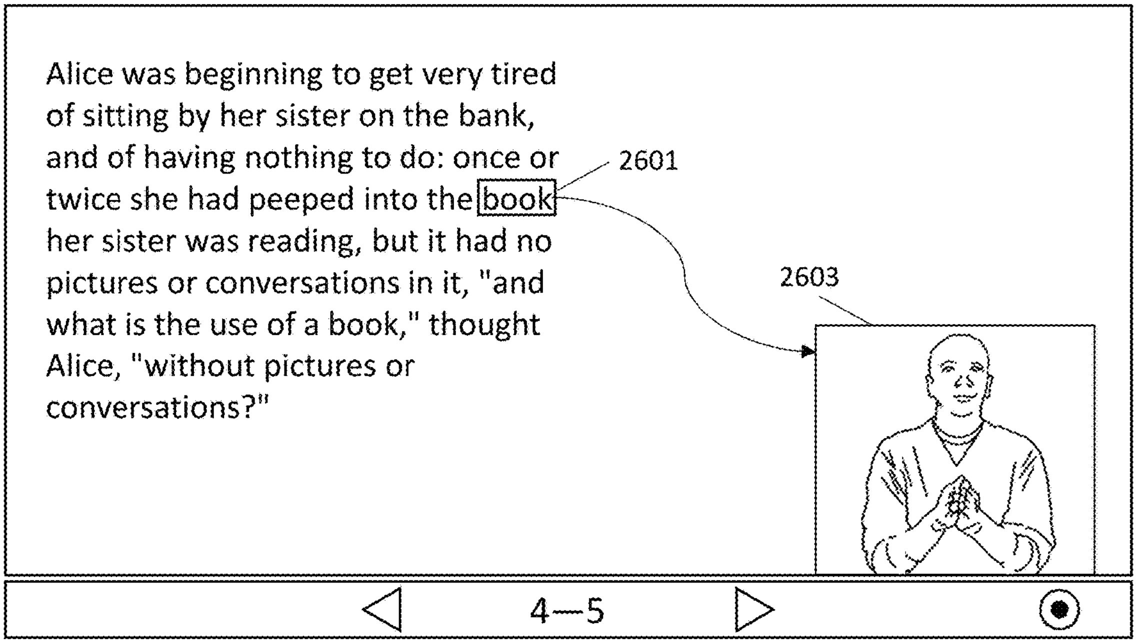
FIG. 26A illustrates synchronized video and highlighting according to one embodiment of the present invention.
Figure 26B:
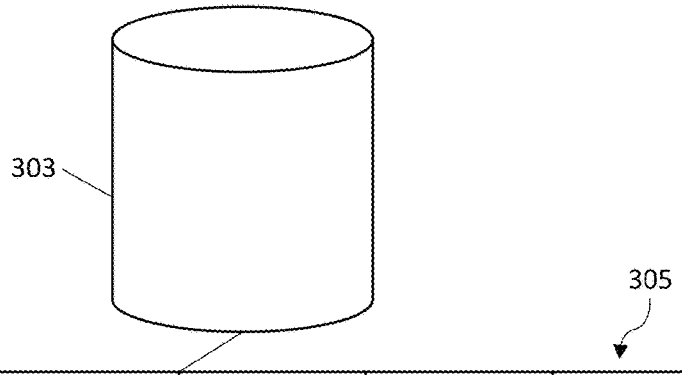
FIG. 26B illustrates a database for storing video, audio, text, and corresponding descriptors according to one embodiment of the present invention.

FIG. 26A illustrates a video-based embodiment of the present invention, wherein the eReader GUI provides a video that corresponds to the text of the displayed eBook. For example, in one embodiment, the video is a recording of a person reading the text of the book. In one embodiment, the audio processed by the system for generating keyframes, descriptors, and other metadata is extracted and/or processed from the video. For example, in one embodiment, forced alignment is performed on the audio of the video to generate keyframes for the beginning and ends of words, characters, punctuation marks, syllables, phrases, sentences, sentence fragments, or paragraphs. During operation, the eReader is operable to display highlighting in synchronization with the video reading. In one embodiment, video-based forced alignment or any other automatic or manual method for synchronization is applied to a video with a non-verbal communication method, such as American Sign Language (ASL). In this embodiment, instead of matching audio to text, the keyframes and/or text clips are generated based on detected visual cues (e.g., signed words) or are generated based on preset data identifying the words being signed (e.g., embedded indicators, subtitles, or other indicator of the words being communicated). In one embodiment, page turns, movement of the video or graphical elements, and/or highlighting are coordinated to the keyframes or runtimes of the videos, wherein page turns, highlighting, or other graphical functionality starts and/or stops based on a beginning keyframe, an ending keyframe, a beginning of a video runtime, an ending of a video runtime, or any other video-based variable for synchronization of the vide to the eBook. For example, in one embodiment, when a page is manually or automatically turned, a video corresponding to the page is loaded, wherein highlighting is synchronized to the video playback, and wherein a graphical element is operable to transform when a specific keyframe or runtime is reached. In the illustrated embodiment, the word book 2601 is highlighted while a video playback 2603 illustrates a reader signing the word "book." FIG. 26B illustrates one embodiment of a database storing descriptors and synchronization data for the video and audio elements. Notably, the words "into" and "book" are associated with the same video, 1.mp4, and the corresponding audio for 1.mp4, whereas the word "sister" is associated with the separate video 2.mp4 and a separate audio file, 3.mp3. Notably, videos are operable to be processed and tagged with audial and video descriptors in the same manner as audio and audio descriptors, as described herein, and videos, video clips, and video segments are operable to be synchronized with the text and textual descriptors for highlighting and playback in the same manner as audio and audio descriptors.

Due to the varying forms of written language expression, unique challenges are presented when providing a multi-language highlighting system within an eReader. For example, in English, groups of phonetic letters make up words, commas separate clauses and phrases, and periods end sentences. In written Chinese, one or more characters represent sounds and meanings, and a host of punctuation marks may be used to clarify meaning, such as "○" and "、". In both Thai and Chinese, the language often do not include spaces between characters and words in the same phrase or sentence. These unique characteristics require technical solutions to provide the highlighting benefits of the eReader across all supported languages.

Figures 27A, 27B, 27C, 27D:
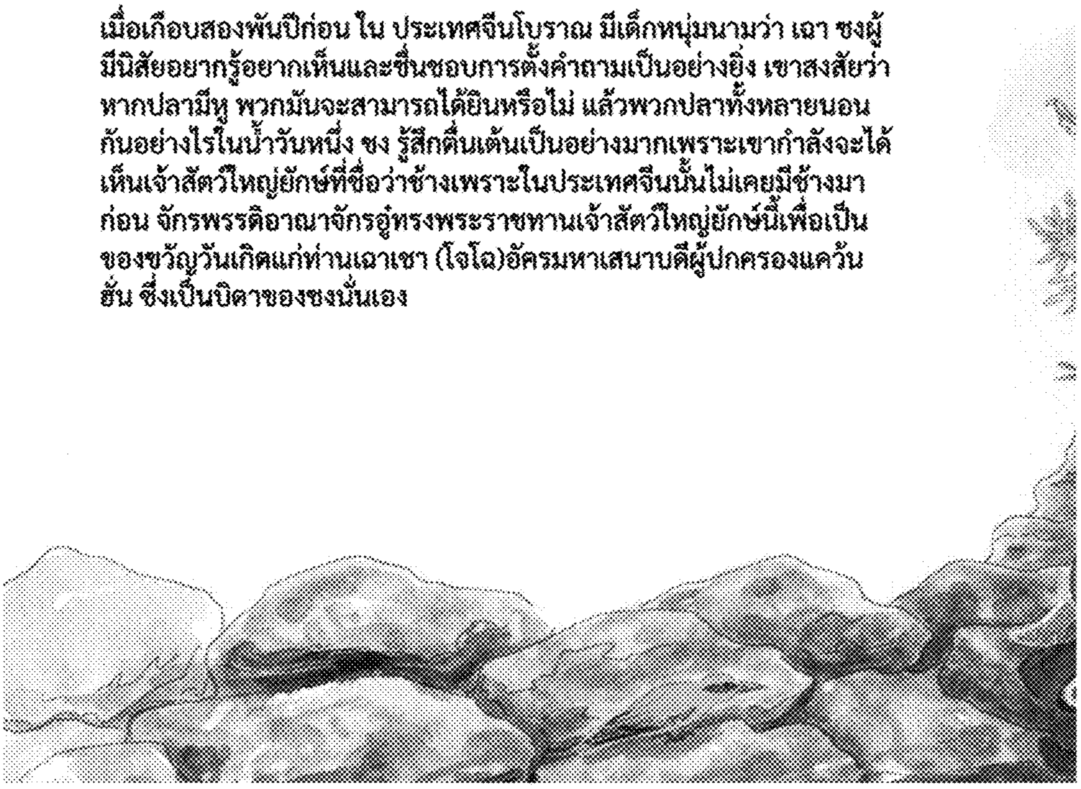
FIG. 27A illustrates a Thai text element with space indicators according to one embodiment of the present invention.
FIG. 27B illustrates a Thai text element with non-printing character indicators according to one embodiment of the present invention.
FIG. 27C illustrates a Thai text element in eReader display format according to one embodiment of the present invention.
FIG. 27D illustrates a Thai text element in paragraph context according to one embodiment of the present invention.

FIG. 27A-27D illustrates solutions for the Thai languages, wherein spaces and non-displaying characters serve similar functionality to the commas and periods when processing text in the system for highlighting. FIG. 27A illustrates a line of text that is taken from an eReader display for a book illustrated in FIG. 27D. The line translates in English to, "Nearly two thousand years ago in ancient China, there was a boy named Cao." Since highlighting in Thai requires highlighting one or more characters that are not separated by spaces, in one embodiment, the spaces 2701 are only used to determine the end of highlighting for characters at the end of a grouping, while non-printing characters are inserted to provide markers for the beginning and end of a highlighting sequence. In another embodiment, the non-printing characters serve as the sequence indicator, while spaces 2701 only serve to provide graphical breaks in the text. Examples of non-printing characters include zero-width spaces, a null character (e.g., "\0" or "\@"), which are not displayed on the eReader but allow for the system to output code with sequences of characters separated into highlighting blocks. For example, FIG. 27B illustrates locations of non-printing characters 2703, which outputs as displayed in FIG. 27C. FIG. 27D illustrates the selected line in context of the eBook page.

Notably, when the system is processing the text of the document, the textual and audial descriptors, and any associated elements and metadata, the system (e.g., via the HTML Generator) is operable to output tags for one or more words, characters, punctuation marks, phrases, sentences, sentence fragments, and/or paragraphs. For example, FIGS. 28A-28D illustrate one embodiment, wherein the HTML Generator outputs groups of Thai characters in individual tags for highlighting. The first group of characters 2801, second group of characters 2803, third group of characters 2805, and fourth group of characters 2807 are generated based on text that included non-printing characters. Thus, when the HTML Generator outputs tags and other grouping elements, the characters for a first highlight are grouped within a tag or other grouping element, the characters for a second highlight are groups within a second tag or grouping element, etc. An eReader processing the text is then operable to highlight the group of characters in accordance with the HTML Generator output, the textual descriptors, the audial descriptors, and/or any other metadata. FIGS. 28A, 28B, 28C, and 28D show sequential highlighting of each of the groups of characters (2801, 2803, 2805, 2807). Notably, while the highlighting in these figures are represented by underlines, highlighting includes any graphical indication disclosed herein or known in the art, including background color changes, text color changes, font changes, etc.

Figure 29:
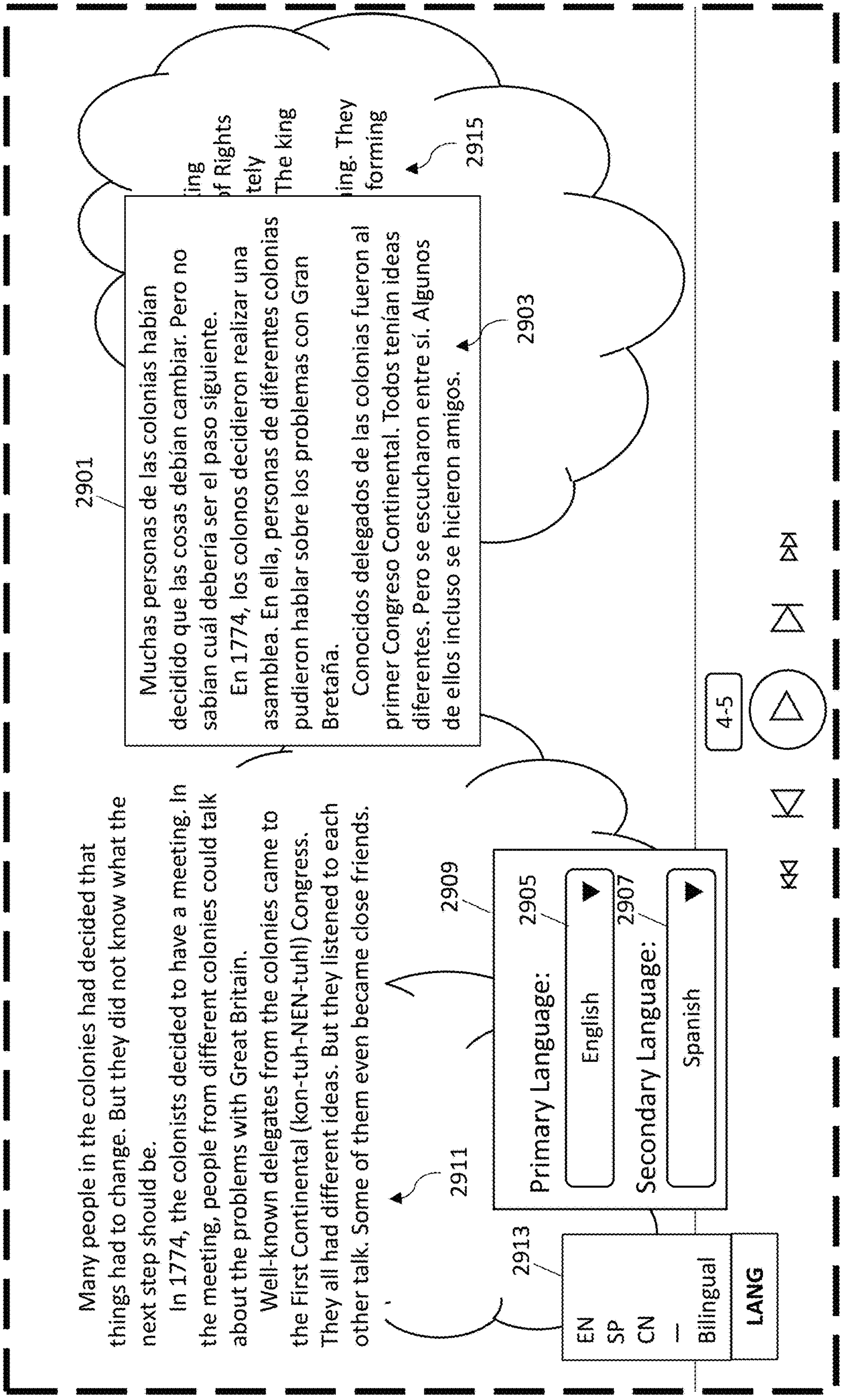
FIG. 29 illustrates an alternate language dynamic text container with primary and secondary language selection according to one embodiment of the present invention.

FIG. 29 illustrates a GUI with one embodiment of a language learning tool, wherein the eReader is operable to load and provide via the GUI an alternate language dynamic text container 2901. In one embodiment, the upon loading a page or a spread of pages, the GUI is operable to load the alternate language dynamic text container 2901 and display the alternate language text 2903 based on textual descriptors associated with the alternate language text 2903. In one embodiment, the GUI is operable to receive an indication of a primary language 2905 and a secondary language 2907 via a pop-up menu 2909 or another graphical selection mechanism. In one embodiment, a language selection menu 2913 includes a list of primary language selection options as well as a bilingual option. Upon receiving a selection of the bilingual option, the GUI is operable to display the pop-up menu 2909. The system is operable to load text associated with the primary language 2905 and display the text in a dynamic text container 2911. In one embodiment, the alternate language dynamic text container 2901 corresponds to one primary dynamic text container at a time. For example, in the illustrated embodiment, the alternate language dynamic text container 2901 includes alternate language text that corresponds to the text in the dynamic text container 2911 of the first page of the spread, and the alternate language dynamic text container is positioned over a dynamic text container 2915 of the second page of the spread. In one embodiment, the alternate language dynamic text container 2901 is positioned in an area that does not overlap the text being highlighted. For example, in one embodiment, the alternate language dynamic text container 2901 is automatically or manually positioned in a first position, wherein the first position ensures that the alternate language dynamic text container 2901 does not overlap with text being highlighted and/or read aloud. Preferably, the alternate language dynamic text container 2901 is operable to be positioned in at least one additional position following completion of the highlighting or playback of audio or video for a dynamic text container. For example, FIG. 30 illustrates another embodiment of the GUI, wherein upon completion of the highlighting and/or media playback of the first dynamic text container 2911, the alternate language dynamic text container 2901 is repositioned to a second position that does not obstruct the second dynamic text container 2915, and highlighting and/or media playback continues for the text of the second text container 2915. In one embodiment, the invention includes multiple alternate language text containers that are statically positioned, wherein each alternate language dynamic text container is made visible when text from a corresponding dynamic text container is highlighted and/or corresponding playback begins, and wherein each alternate language dynamic text container is hidden when the highlighting and/or playback finishes for the corresponding dynamic text container. In one embodiment, one or more positions are automatically or manually preset for an alternate language dynamic text container so that the alternate language text container has a position that preserves original graphic design and experience of the book as much as possible. In another embodiment, an alternate language dynamic text container is automatically positioned such that it does not overlap with any primary dynamic text containers and/or dynamic text containers that include active highlighting or playback.

In one embodiment, text in alternate language dynamic text containers are highlighted at the same time as or instead of text from a primary dynamic text container. Further, the system is operable to provide audio and/or video playback based on a preferred language selection or a primary or secondary language selection. For example, in the embodiment illustrated in FIG. 30, the second dynamic text container 2915 includes English text, while the alternate language dynamic text container 2901 includes Spanish text. The words of one text container are highlighted at the same time as other, illustrated in FIG. 30 as "a message" being highlighted at the same time as the corresponding Spanish text, "un mensaje." Playback is operable to be performed based on the primary language selection (English), the secondary language selection (Spanish), or a manually input selection. Alternatively, the text is highlighted and/or corresponding playback occurs for a first language before highlighting and/or corresponding playback occurs for a second language. In another embodiment, audio and/or video playback for a second language occurs in synchronization with highlighting for a first language. Highlighting for both languages is operable to occur based on a one-to-one equivalent of a word, character, phrase, sentence fragment, or sentence, but sometimes this is not possible due to language differences, and instead the number of words, characters, phrases, sentence fragments, or sentences highlighted for one language is different from the number of words, characters, phrases, sentence fragments, or sentences highlighted for a second language.

Figure 31A:
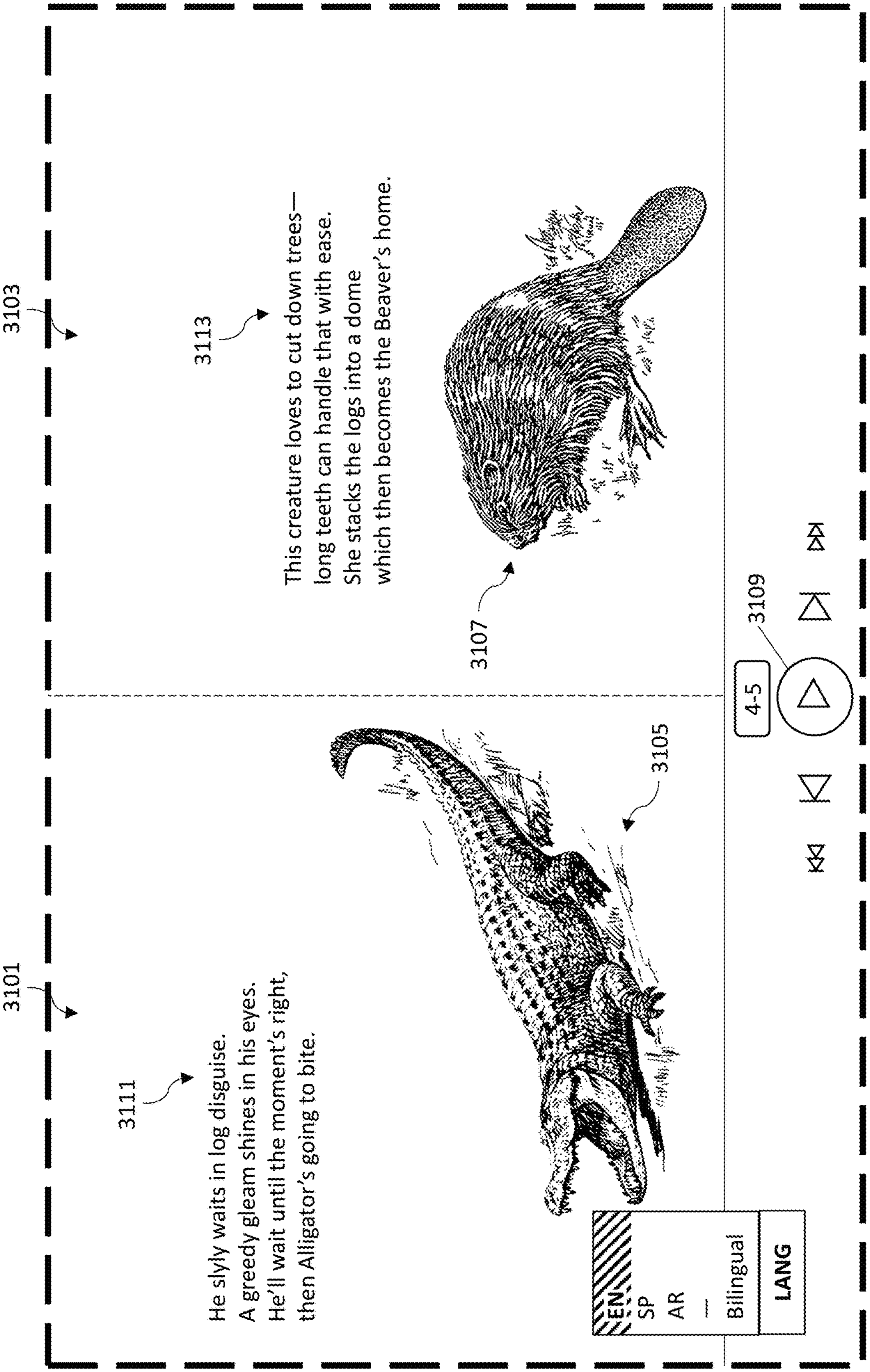
FIG. 31A illustrates a left-to-right display for an eReader according to one embodiment of the present invention.
Figure 31B:
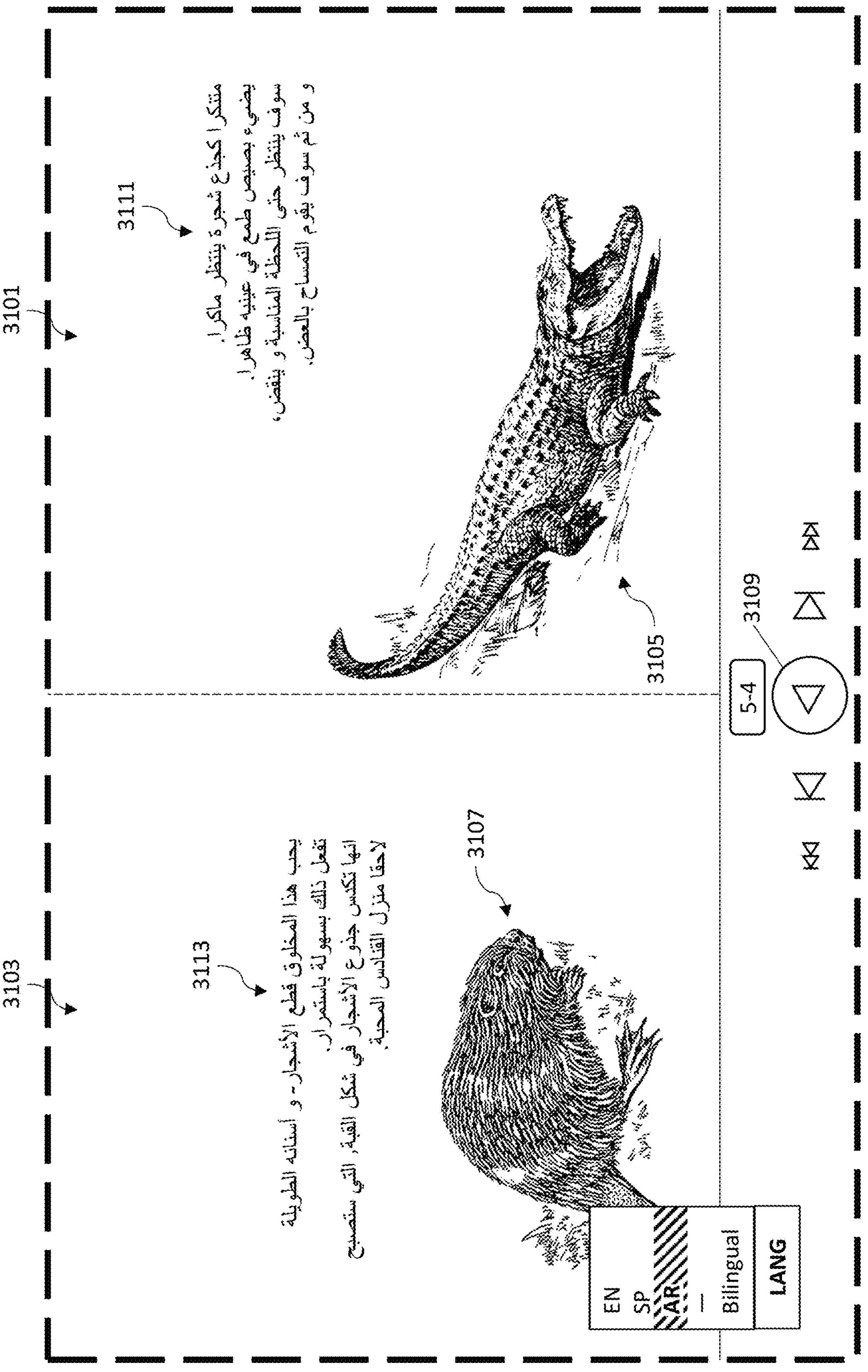
FIG. 31B illustrates a right-to-left display with mirrored graphics according to one embodiment of the present invention.
Figure 31C:
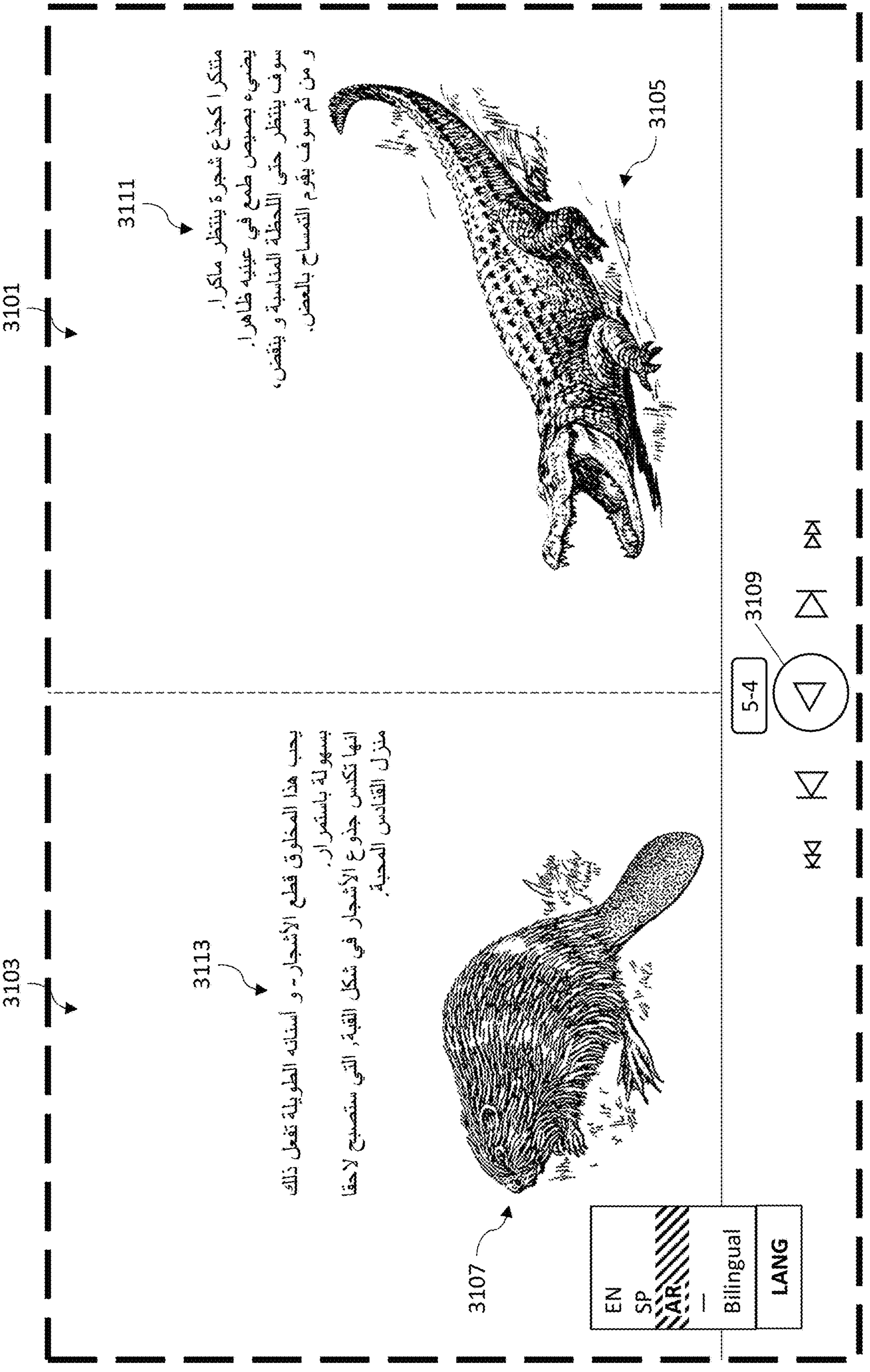
FIG. 31C illustrates a right-to-left display with rearranged right pages and left pages according to one embodiment of the present invention.

FIG. 31A and FIG. 31B illustrate GUI operations to convert left-to-right (LTR) layouts to right-to-left (RTL) layouts. Since many languages are printed and read RTL, this creates a unique challenge to preserving readability and consistency to the author and illustrator's graphic design across languages. FIG. 31A illustrates one embodiment of an English language spread with a first page 3101 and a second page 3103, wherein the first page and the second page each include graphics (3105, 3107), and wherein the first page 3101 is displayed on the left and the second page 3103 is displayed on the right. The GUI is operable to receive a language selection from the language selection menu 2913. If an RLT language is selected, such as Arabic, the GUI automatically loads and/or repositions elements based on the language selection. FIG. 31B illustrates an RTL Arabic language embodiment corresponding to the English language GUI illustrated in FIG. 31A. In the illustrated embodiment, the graphics (3105, 3107) and the play button 2109 are each mirrored as a whole, wherein the first page 3101 is displayed on the right and the second page 3103 is displayed on the left. Notably, the whole spread was mirrored such that the graphics (3105, 3107) are displayed in mirror image from the English embodiment illustrated in FIG. 31A and the dynamic text containers (3111, 3113) are translated to a mirrored position (or, in another embodiment, new dynamic text containers are generated in the mirrored positions). This allows for text and other objects on the page to not overlap the graphics when converted between LTR and RTL. For example, in children's storybooks, spreads often include an illustration that stretches across both a left page and a right page. By mirroring the illustration and the location of dynamic text containers, the chance for obstruction of the illustration by text between languages is minimized. FIG. 31C illustrates another embodiment of the RTL reading embodiment, wherein pages are repositioned instead of mirroring graphics. Some graphics may be unclear or may lose some value when mirrored. Therefore, in one embodiment, pages are repositioned without mirroring the text or graphics. In FIG. 31C, the first page 3101 is placed on the right side, and the second page 3103 is placed on the left side. However, each of the graphics (3105, 3107) maintain their positions relative to the first page 3101 or the second page 3101, respectively. In one embodiment, for a full-page illustration, the system is operable to split the image of the illustration into two parts (e.g., a first half file and a second half file), and display each image with its respective half of the spread. This separation is operable to be processed during the initial intake of the digital book (before processing through the HTML Generator), during processing through the HTML Generator, or in real-time at the GUI of the end user.

Figure 32:
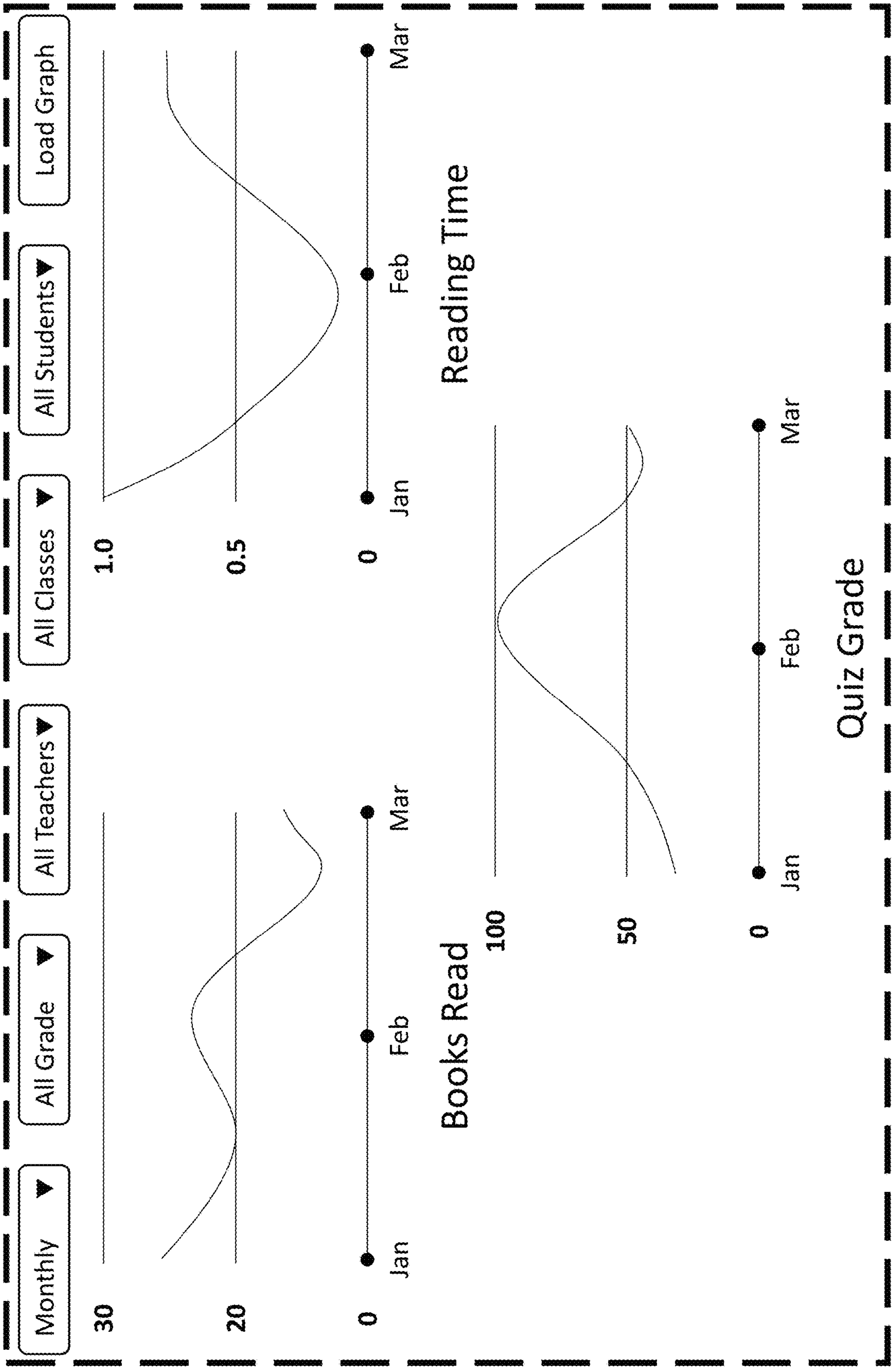
FIG. 32 illustrates a management interface with graphs according to one embodiment of the present invention.

FIG. 32 illustrates one embodiment of a management system for an organization with multiple users. For example, in one embodiment, the system provides one or more teacher user accounts that are connected to one or more student accounts. In the illustrated figure, the system is operable to track variables related to multiple connected users' interaction with the system, including number of books read, reading time, and quiz grades. The system is further operable, in one embodiment, to track and store which books were read, how long was spent on each page, languages read, and other activities and assignments related to each book, collection of books, or unrelated assignments. The GUI illustrated provides graphs for review by one or more administrator account (e.g., an account with administrative privileges over one or more teacher account or one or more student accounts). The system is operable to generate and display graphs based on nominal data, average data, or other mathematical analysis. The GUI is operable to receive inputs from the user account, including a desired filter for a time range or grouping of results, a grade level, a teacher, a class, or a student, wherein the system is operable to adjust the graphs based on the filter inputs. In one embodiment, the graphs are connected to the same data and analysis as that described with reference to FIGS. 13A-13C.

FIG. 33 illustrates one embodiment of a chart for tracking book viewing and interaction, wherein the chart provides a breakdown by teacher, grade, subject, and section. The chart provides information relating to the number of students in each class, the number of books opened per class, the number of books completed (e.g., read) by each class, and the total reading time for the books. If the book has associated activities and resources, such as a quiz, the chart is operable to retrieve and display average quiz grades, number of completed quizzes, and other analytics on the resources. In one embodiment, the system is operable to receive an assignment from at least one teacher account, wherein the assignment is then attached to student accounts in at least one class. Once the assignment is completed (for example, read an assigned book and complete an assigned quiz), the system is operable to generate and transmit a notification and/or a report to the teacher account based on the completion of the book, time spent reading the book, a quiz grade, and other variables associated with the assignment.

Figure 34:
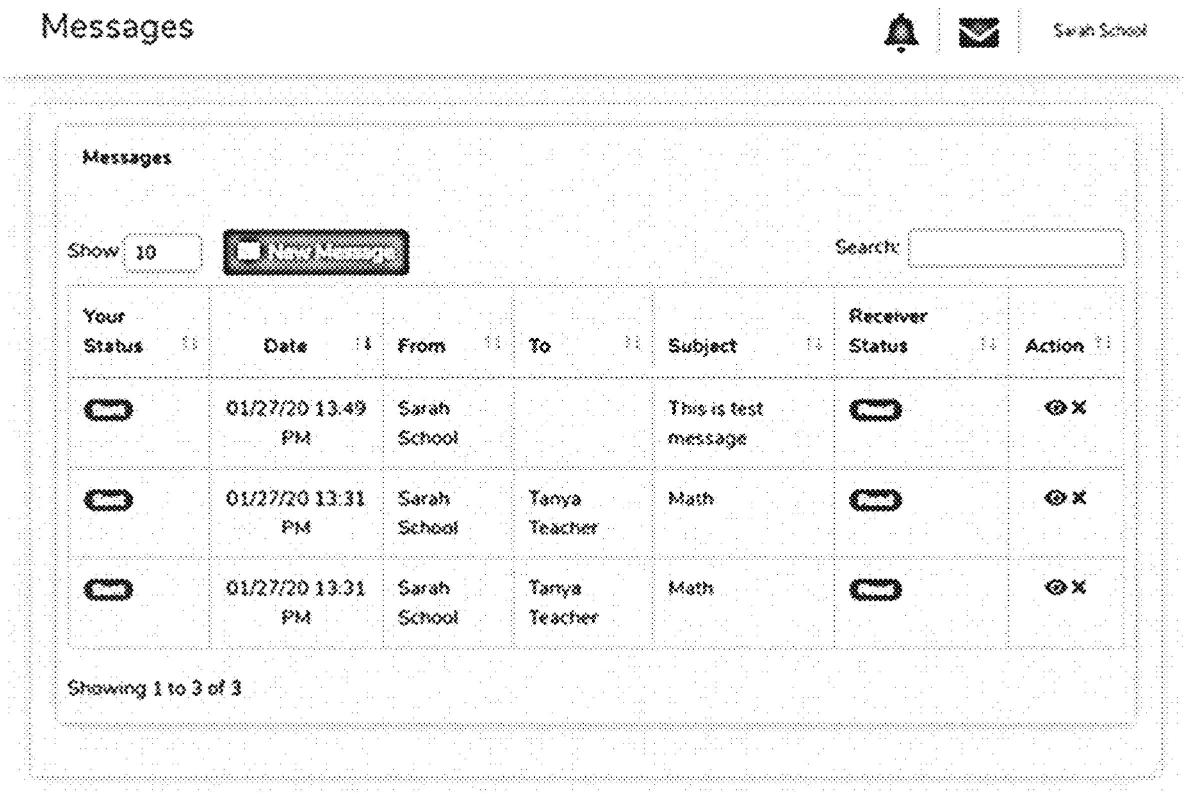
FIG. 34 illustrates a messaging system according to one embodiment of the present invention.

FIG. 34 illustrates a messaging system for accounts between administrators, teachers, students, and parents. For example, in one embodiment, the system is operable to provide a messaging system within an eReader interface or through a dedicated system, wherein student accounts are operable to send a question via the messaging system to the teacher account, and wherein the teach account is operable to compose and transmit a message to the student account. In one embodiment, the messages are echoed and/or relayed via email. In another embodiment, the messaging system is operable to track whether a message was opened by a recipient and provide a read receipt to the sender.

Figure 35:
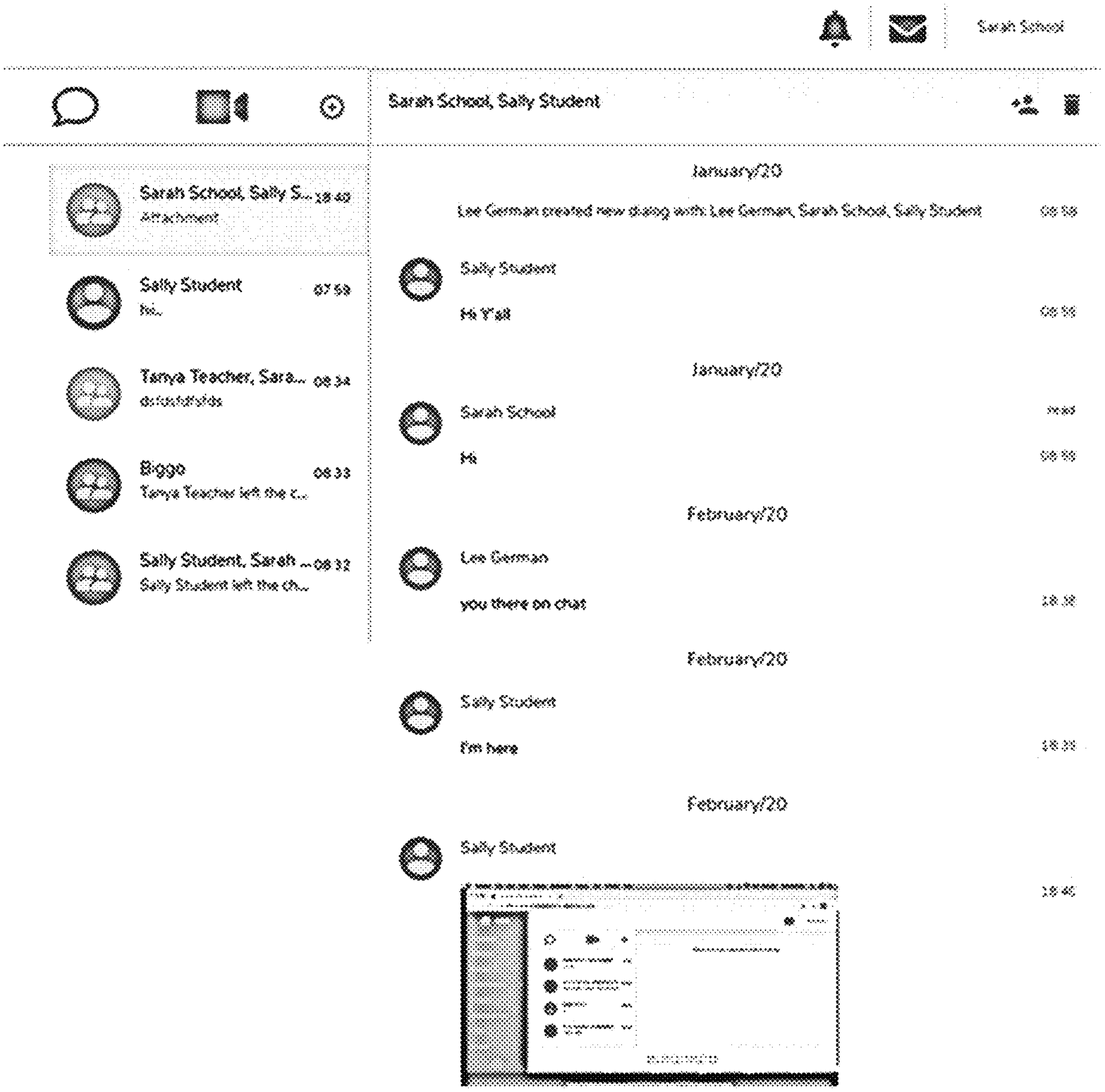
FIG. 35 illustrates a chat system according to one embodiment of the present invention.

FIG. 35 illustrates a chat platform for the system, wherein user accounts are operable to exchange messages in real-time. In one embodiment, the chat system includes audio and video calling capabilities in addition to text, media, and file exchange functionality. In another embodiment, student accounts are automatically enabled to send messages to a teacher and/or to other student accounts associated with the same class or school. While the illustrated embodiment depicts a chat system that is independent of any eReader interface, in another embodiment, the chat interface is built into the eReader GUI such the system is operable to directly send and receive messages, video, and audio via the interface directly or through a pop-up interface or other similar mechanism known in the art.

Figure 36:
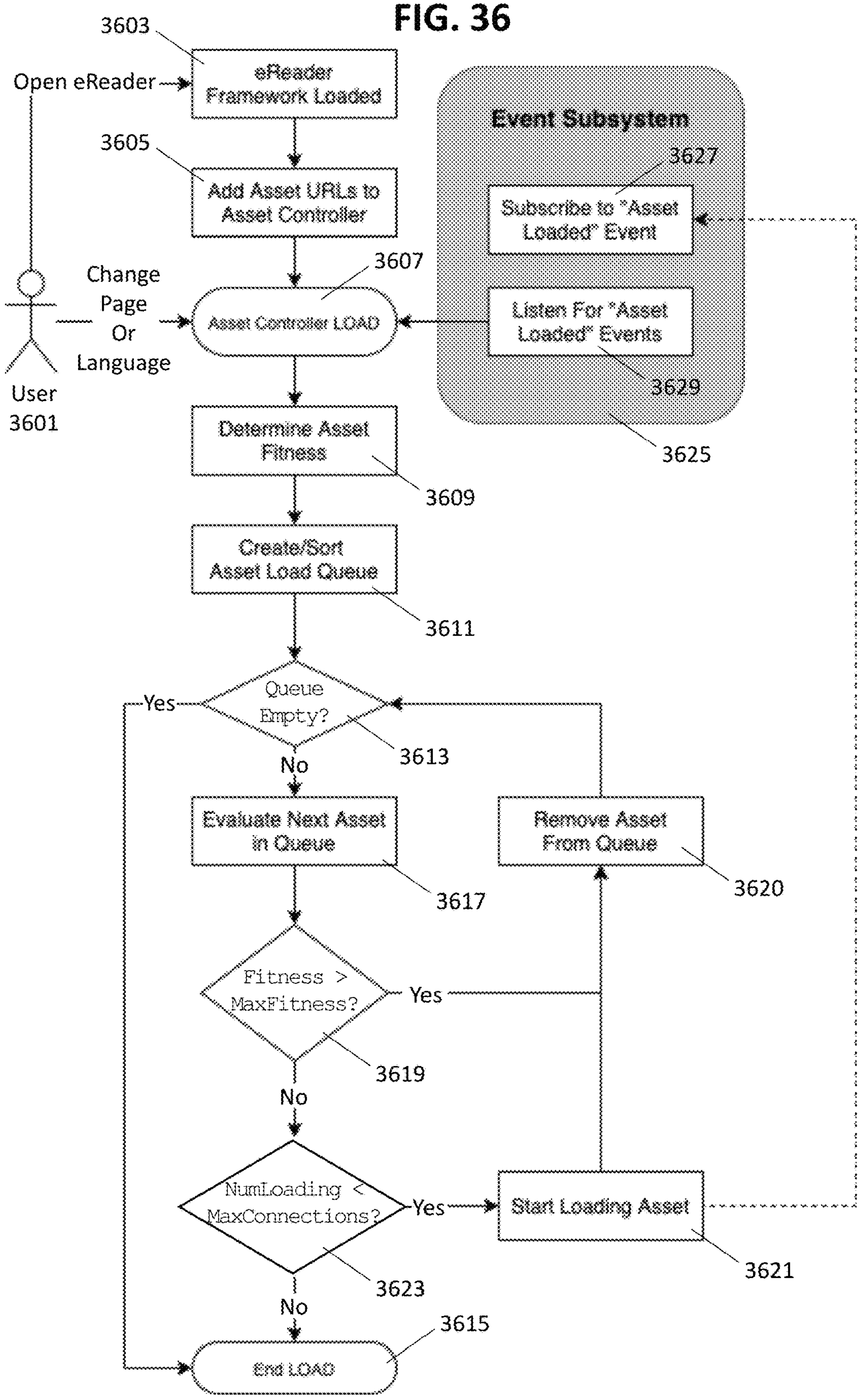
FIG. 36 illustrates a diagram of an asset controller according to one embodiment of the present invention.
Figure 37B:
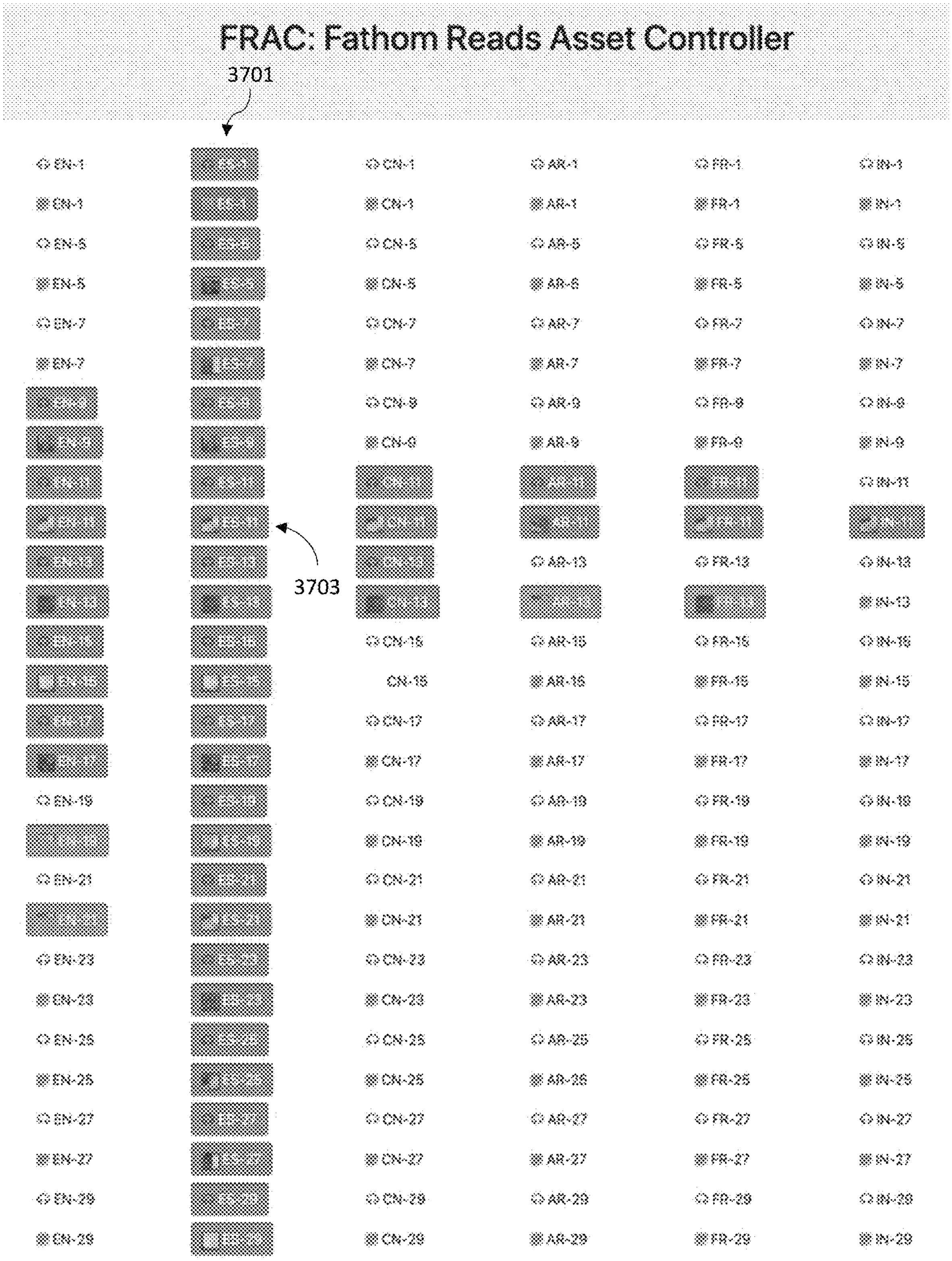
FIG. 37B illustrates an asset list with elements for one language loaded according to one embodiment of the present invention.
Figure 37C:
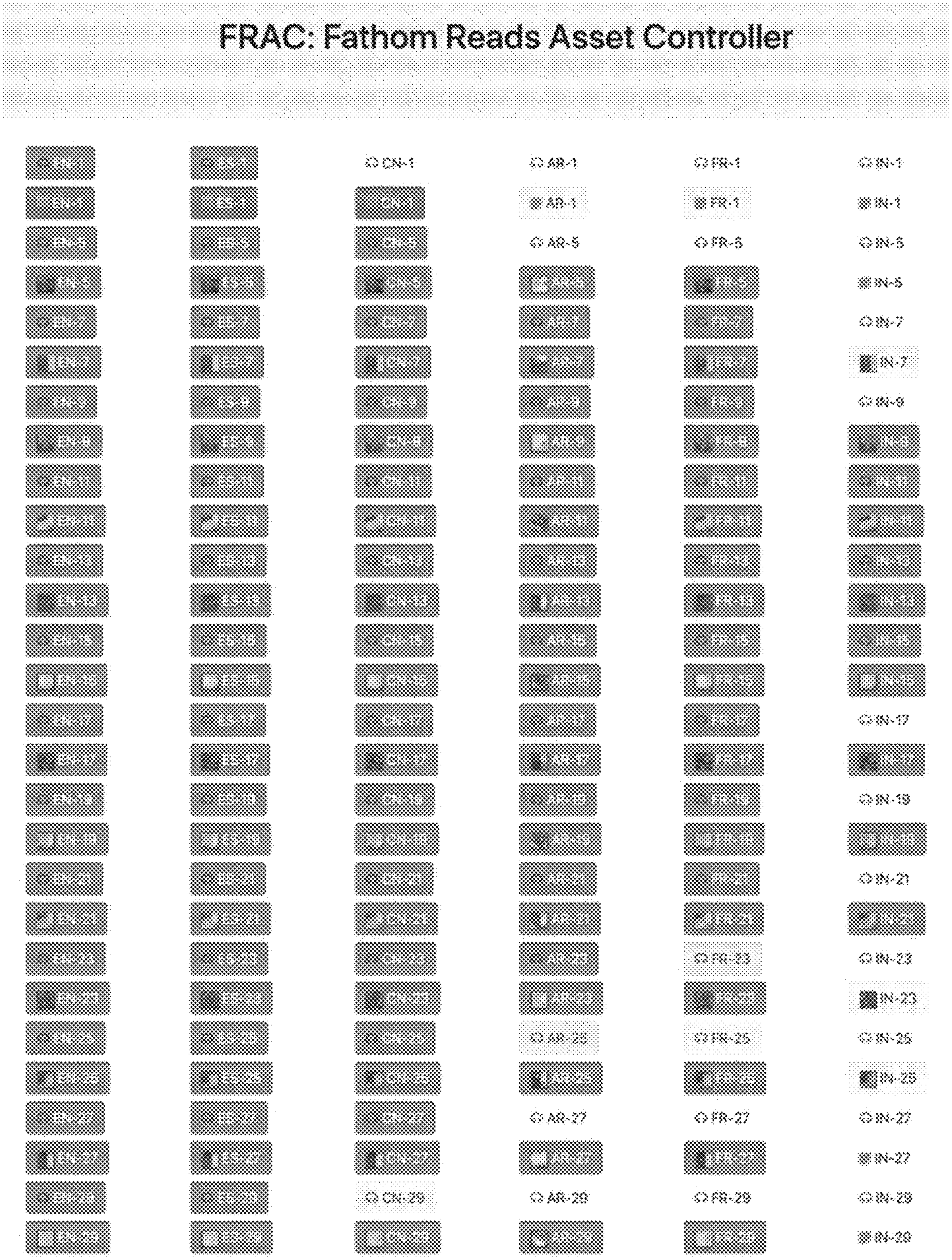
FIG. 37C illustrates an asset list with most elements loaded according to one embodiment of the present invention.
Figure 37D:
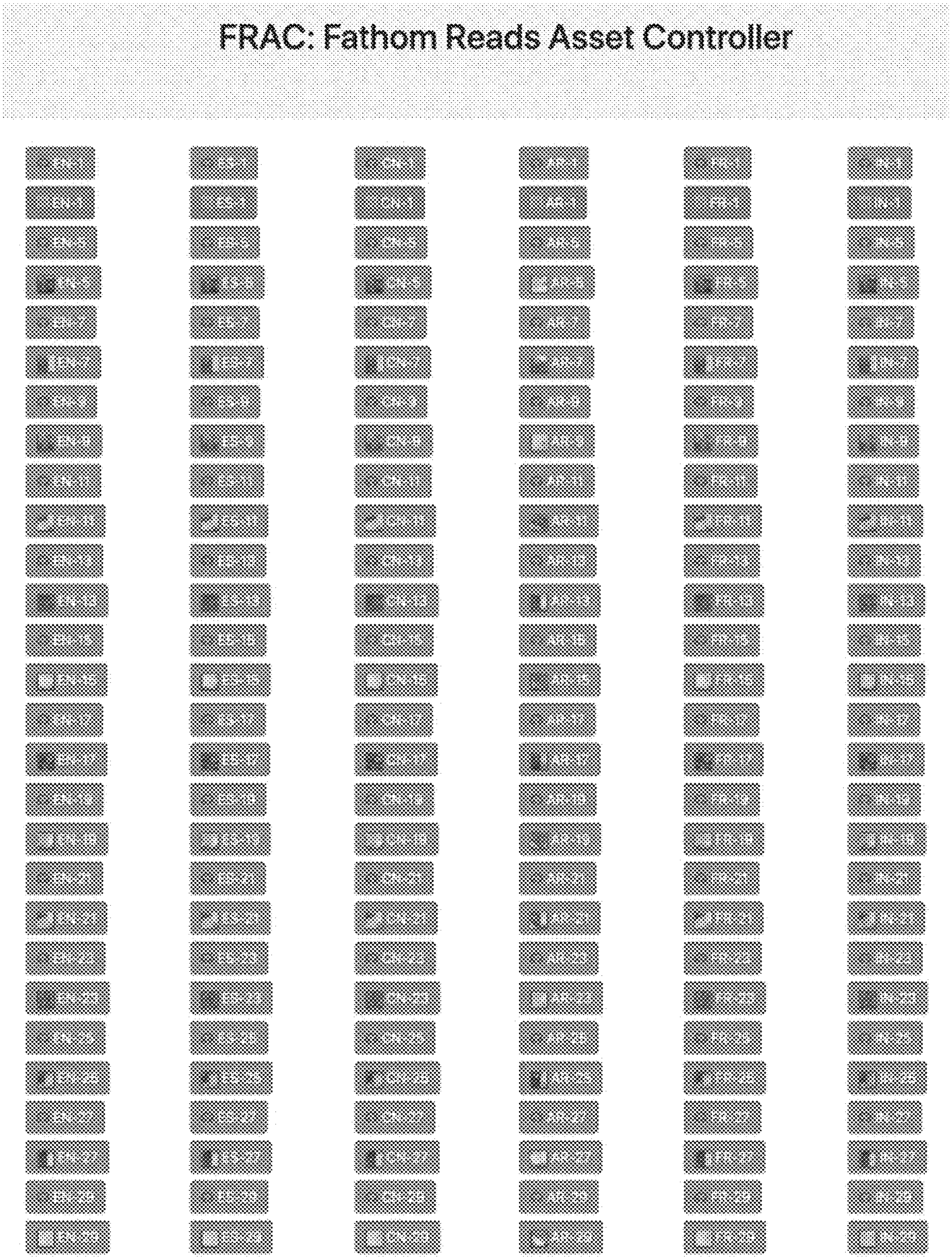
FIG. 37D illustrates an asset list with all elements loaded according to one embodiment of the present invention.

FIG. 36 illustrates one embodiment of the Fathom Reads Asset Controller (FRAC). In one embodiment, the FRAC is a JAVASCRIPT component that manages the loading of audio, images, and other type of assets for the eReader. The FRAC is designed to prioritize which assets (e.g., text elements, graphical elements, audio elements, and/or layout elements) to load. In one embodiment, assets in the eReader are associated with a specific language and page number. If a user views page 10 in French, the most critical assets to load are those assets in French near page 10. French elements on page 11 are the likely next page for the user, followed decreasingly by 12, 13, etc. In one embodiment, pages in front of a currently loaded page of a digital book are prioritized over pages behind the currently loaded page of the book (e.g., page 3 is prioritized over page 1 for a user on page 2). In another embodiment, assets for a second language on a page are prioritized over assets from other pages.

FRAC in one embodiment solves the problem wherein fetching assets from the network does not guarantee the assets are transmitted or received in the order requested. Also, having too many active network connections at the same time can saturate a network, causing network slowdowns and potentially using too much RAM on a device, resulting in a slowing of a browser or device. In one embodiment, a maximum connections limit (MaxConnections in FIG. 36) is imposed to prevent slow-down issues and also increasing the likelihood that assets will be received in the order requested.

Similarly, in some embodiments, not all assets need to be in memory for the current page of the book to be displayed. In one embodiment, thresholds are set based on the determined relative need for the asset (MaxFitness in FIG. 36), such that assets that are above a threshold are excluded from the loading entirely, until such time occurs that said assets are determined to be necessary to load. In one embodiment, the assets are also released and/or deleted from memory based on a comparison of the assets' fitness scores to a maximum fitness score, wherein previously loaded assets that have a fitness score outside of the threshold established by the maximum fitness score a removed in order to reduce memory. This management particularly benefits traditionally low-memory devices, such as mobile devices.

FRAC determines each asset's need to be loaded by calculating a "fitness" for each asset. This fitness takes into account, in one embodiment, the selected language and also the current page of the book. With each asset's fitness so calculated, the assets are sorted by their fitness, and put into a load queue. The load process then begins, fetching assets with lower (closer to zero) fitness values before higher (less fit) assets.

FIG. 36 a schematic of the FRAC process, wherein upon the system providing the eReader to a user 3601, the eReader base framework is loaded 3603, and Uniform Resource Locators (URLs) corresponding to assets for a selected eBook are added to an asset controller 3605 (e.g., based on descriptors, output from the HTML Generator, and/or other eBook metadata), and the asset controller loads the assets based on the URLs 3607. The manner by which the assets are loaded include determining an asset fitness 3609 for assets associated with the eBook and then creating and sorting an asset loading queue based on the asset fitness 3611. The system checks the queue 3613, and if the queue is empty (for example, all the assets have been loaded), the loading ends 3615. If it is not, the next asset in the queue is evaluated 3617. The fitness of the asset is compared to the max fitness 3619, and if the fitness is greater than the max fitness, then the asset loading begins 3621, and the asset is removed from the queue 3620. If the fitness is not greater than the max fitness, then the number of loading elements is compared to the maximum allowed number of loading connections 3623. If the number of loading connections is less than the maximum allowed number of loading connections, then the current asset being considered from the queue is loaded 3621. If the number of loading connections is not less than the maximum allowed number, the asset is not loaded, and preferably the asset remains within the queue for continued loops for loading the assets. The queue then continues to processes the queue until each element has been considered. Preferably, the process is reloaded after a new page is loaded in the eReader. In one embodiment, an event subsystem 3625 subscribes to an asset loaded event 3627, and the subsystem listens for an asset loaded event 3629. Upon detecting an asset being loaded, the asset controller loads the asset 3607 for use by a user within the eReader.

In one embodiment, asset fitness is determined for each asset (e.g., a textual element, a graphical element, an audio element, and/or layout elements) based upon a preset threshold algorithm. In one embodiment, the algorithm considers at least one of: current page number, total page number, selected language, available languages, most commonly used languages for a user or group of users, number of available languages, size of file, size of text, length of audio, historical reading data, presence of recorded audio or video, and/or number of graphics for a page. Max fitness, or the fitness threshold below which elements are loaded, is a manually set or automatically determined value that is, in one embodiment, based upon at least one of: a number of pages, a number of languages available, a speed of a connection from an eReader, an available memory of a device with the eReader, a current page being viewed, a total number of pages for the eBook, and/or user preferences for asset loading total memory or download speed. In one embodiment, a maximum number of connections concurrently loading an element is determined based on either a manually preset value or an automatically determined threshold corresponding to at least one of: a number of pages, a number of languages available, a speed of a connection from an eReader, an available memory of a device with the eReader, a current page being viewed, a total number of pages for the eBook, and/or user preferences for asset loading total memory or download speed.

FIGS. 37A, 37B, 37C, and 37D illustrate a loading mechanism for the FRAC, wherein elements are represented by icons and IDs, and wherein loaded elements are shaded and unloaded elements are unshaded. In one embodiment, a set of elements for a first language 3701 are loaded before elements for additional languages. For example, in FIG. 37B, Spanish elements 3701 are loaded before other languages, due to the Spanish language currently being selected and presented to an eReader. In addition, elements near a current page number 3703 (e.g., page 11) are loaded before elements of other page numbers. FIGS. 37A-37D illustrate a progression of the element loading mechanism, from no elements loaded to all elements loaded, based on a determined fitness score for each element, according to the FRAC process described above and illustrated in FIG. 36.

The above-mentioned examples are provided to serve the purpose of clarifying the aspects of the invention, and it will be apparent to one skilled in the art that they do not serve to limit the scope of the invention. The above-mentioned examples are just some of the many configurations that the mentioned components can take on. For example, in alternative embodiments, the buttons of the GUI are replaced with graphical images that represent the function the buttons serve, such as a rabbit graphic for the speed control button or a highlighter marker for the highlight button. All modifications and improvements have been deleted herein for the sake of conciseness and readability but are properly within the scope of the present invention.

The invention claimed is:

1. A method for an improved eReader interface, comprising:

receiving text and audio, wherein the text includes at least two language sets of text, and wherein the audio includes at least two language sets of audio;

deriving keyframes for the audio via force alignment of the audio to the text, wherein the keyframes indicate beginning keyframes and ending keyframes for spoken words, spoken characters, spoken sentences, or spoken sentence fragments corresponding to words, characters, sentences, or sentence fragments of the text;

receiving a selection of a language set of the at least two language sets of text as a primary language text;

displaying the primary language text across a spread of pages on a graphical user interface (GUI), the spread of pages including at least a first page and a second page displayed simultaneously;

providing highlighting preference options via the GUI, wherein the highlighting preference options include selections for word or character highlighting, sentence highlighting, and sentence fragment highlighting;

receiving a selection of one of the highlighting preference options;

automatically inserting non-printing characters between at least two words, at least two characters, at least two sentences, or at least two sentence fragments of the primary language text, wherein the non-printing characters do not increase a distance between the respective words, characters, sentences, or sentence fragments of the primary language text on the GUI, and wherein the non-printing characters are not visible via the GUI;

outputting computer-readable code that separates the primary language text into separate highlightable elements based on the non-printing characters;

initiating playback of the audio to play the audio;

while playing the audio:

determining a current portion of the primary language text based on a current instance of time; and highlighting the current portion of the primary language text according to the selected highlighting preference option and the keyframes, wherein the highlighting and the audio playing occurs based on the selected language set of the at least two language sets of text and a corresponding language set of the at least two language sets of audio;

creating an alternate language dynamic text container, wherein the alternate language dynamic text container displays an alternate language text corresponding to an alternate selected language set of the at least two language sets of text, and wherein the alternate language text corresponds to a translation of the primary language text displayed on the first page of the spread of pages;

highlighting a corresponding highlightable element of the alternate language text at the same time as each highlightable element of the primary language text is highlighted during the audio playback;

while a highlightable element of the primary language text on the first page is highlighted, automatically positioning the alternate language dynamic text container in a first position over the primary language text displayed on the second page such that the alternate language dynamic text container does not overlap with the highlighted primary language text displayed on the first page;

following completion of the highlighting and the audio playing for the primary language text displayed on the first page of the spread of pages:

continuing the highlighting and the audio playing of the primary language text displayed on the second page of the spread of pages; and automatically repositioning the alternate language dynamic text container in a second position over the primary language text displayed on the first page of the spread of pages such that the alternate language dynamic text container does not overlap with the highlighted primary language text displayed on the second page;

receiving a word selection, a character selection, a sentence selection, a graphic selection or a sentence fragment selection;

highlighting the words, the characters, the sentences, the graphic, or the sentence fragments based on the word selection, the character selection, the sentence selection, the graphic selection, or the sentence fragment selection; and playing audio corresponding to the word selection, the character selection, the sentence selection, the graphic selection, or the sentence fragment selection based on the keyframes.

2. The method of claim 1, further comprising tracking an amount of time the primary language text is displayed via the GUI and determining a number of digital books read.

3. The method of claim 1, further comprising reversing a layout of graphics and/or mirroring the graphics, wherein the selected language set is a right-to-left language set.

4. The method of claim 1, further comprising recording the audio via the GUI.

5. The method of claim 1, wherein the text includes textual descriptors and the audio includes audial descriptors, wherein the textual descriptors includes at least a page number, a word or character length, and a language for each of the words, the characters, the sentences, or the sentence fragments, and wherein the audial descriptors include at least the keyframes, a corresponding word, an audial runtime of the corresponding word, and a file size.

6. The method of claim 1, wherein the force alignment includes synthesizing text from the spoken words, the spoken characters, the spoken sentences, or the spoken sentence fragments, matching the synthesized text to the text relating to a digital book, and determining keyframes for the audio corresponding to the matched synthesized text and text relating to the digital book.

7. The method of claim 1, further comprising extracting the text from a digital book, and generating and storing textual descriptors for each of the words, the characters, the sentences, or the sentence fragments of the text, including definitions, translations, and/or a number of occurrences.

8. The method of claim 1, further comprising receiving an indication of a digital book selection, loading a digital book corresponding to the digital book selection from at least one database, and displaying the corresponding digital book.

9. The method of claim 1, further comprising displaying the primary language text in a dynamic text container.

10. The method of claim 9, wherein dimensions of the dynamic text container are preset, and wherein the dynamic text container is further configured to enable scrolling for overflow text within the dynamic text container.

11. A system for an improved eReader interface, comprising:

a memory; and a processor coupled with the memory, wherein the processor is operable to:

receive text and audio, wherein the text includes at least two language sets of text, and wherein the audio includes at least two language sets of audio;

derive keyframes for the audio via force alignment of the audio to the text, wherein the keyframes indicate beginning keyframes and ending keyframes for spoken words, spoken characters, spoken sentences, or spoken sentence fragments corresponding to words, characters, sentences, or sentence fragments of the text;

receive a selection of a language set of the at least two language sets of text as a primary language text;

display the primary language text across a spread of pages on a graphical user interface (GUI), the spread of pages including at least a first page and a second page displayed simultaneously;

provide highlighting preference options via the GUI, wherein the highlighting preference options include selections for word or character highlighting, sentence highlighting, and sentence fragment highlighting;

receive a selection of one of the highlighting preference options;

automatically insert non-printing characters between at least two words, at least two characters, at least two sentences, or at least two sentence fragments of the primary language text, wherein the non-printing characters do not increase a distance between the respective words, characters, sentences, or sentence fragments of the primary language text on the GUI, and wherein the non-printing characters are not visible via the GUI;

output computer-readable code that separates the primary language text into separate highlightable elements based on the non-printing characters;

initiate playback of the audio to play the audio;

while playing the audio:

determine a current portion of the primary language text based on a current instance of time; and highlight the current portion of the primary language text, wherein the highlighting and the audio playing occurs based on the selected language set of the at least two language sets of text and a corresponding language set of the at least two language sets of audio;

create an alternate language dynamic text container, wherein the alternate language dynamic text container displays an alternate language text corresponding to an alternate selected language set of the at least two language sets of text, and wherein the alternate language text corresponds to a translation of the primary language text displayed on the first page of the spread of pages;

highlight a corresponding highlightable element of the alternate language text at the same time as each highlightable element of the primary language text is highlighted during the audio playback;

while a highlightable element of the primary language text on the first page is highlighted, automatically position the alternate language dynamic text container in a first position over the primary language text displayed on the second page such that the alternate language dynamic text container does not overlap with the highlighted primary language text displayed on the first page;

following completion of the highlighting and the audio playing for the primary language text displayed on the first page of the spread of pages:

continue the highlighting and the audio playing of the primary language text displayed on the second page of the spread of pages; and automatically reposition the alternate language dynamic text container in a second position over the primary language text displayed on the first page of the spread of pages such that the alternate language dynamic text container does not overlap with the highlighted primary language text displayed on the second page;

receive a word selection, a character selection, a sentence selection, a graphic selection or a sentence fragment selection;

highlight the words, the characters, the sentences, the graphic, or the sentence fragments based on the word selection, the character selection, the sentence selection, the graphic selection, or the sentence fragment selection; and play audio corresponding to the word selection, the character selection, the sentence selection, the graphic selection, or the sentence fragment selection based on the keyframes.

12. The system of claim 11, wherein the processor is operable to track an amount of time the primary language text is displayed via the GUI and determine a number of digital books read.

13. The system of claim 11, wherein the processor is operable to reverse a layout of graphics and/or mirror the graphics, wherein the selected language set is a right-to-left language set.

14. The system of claim 11, wherein the processor is operable to record the audio to the memory via the GUI.

15. The system of claim 11, wherein the text includes textual descriptors and the audio includes audial descriptors, wherein the textual descriptors includes at least a page number, a word or character length, and a language for each of the words, the characters, the sentences, or the sentence fragments, and wherein the audial descriptors include at least the keyframes, a corresponding word, an audial runtime of the corresponding word, and a file size.

16. The system of claim 11, wherein the force alignment includes synthesizing text from the spoken words, the spoken characters, the spoken sentences, or the spoken sentence fragments, matching the synthesized text to the text relating to a digital book, and determining keyframes for the audio corresponding to the matched synthesized text and text relating to the digital book.

17. The system of claim 11, wherein the text is extracted from the digital book, and wherein the system is operable to generate and store textual descriptors for each of the words, characters, sentences, or sentence fragments of the text, including definitions, translations, and/or a number of occurrences.

18. The system of claim 11, further comprising receiving an indication of a digital book selection, loading a digital book corresponding to the digital book selection from at least one database, and displaying the corresponding digital book.

19. The system of claim 11, further comprising displaying the primary language text corresponding to the selected language set of the at least two language sets in a dynamic text container.

20. The system of claim 19, wherein dimensions of the dynamic text container are preset, and wherein the dynamic text container is further configured to enable scrolling for overflow text within the dynamic text container.

* * * * *